(12) United States Patent
Kamo

(10) Patent No.: US 6,775,073 B2
(45) Date of Patent: Aug. 10, 2004

(54) REAL IMAGE TYPE ZOOM FINDER

(75) Inventor: Yuji Kamo, Hino (JP)

(73) Assignee: Olympus Corporation, Tokyo (JP)

( * ) Notice: Subject to any disclaimer, the term of this patent is extended or adjusted under 35 U.S.C. 154(b) by 229 days.

(21) Appl. No.: 09/978,776

(22) Filed: Oct. 18, 2001

(65) Prior Publication Data
US 2002/0176175 A1 Nov. 28, 2002

(30) Foreign Application Priority Data
Oct. 19, 2000 (JP) ........................................ 2000-319256

(51) Int. Cl.[7] .......................... G02B 15/14; G02B 17/00
(52) U.S. Cl. ........................ 359/691; 359/678; 359/708; 359/720; 359/728; 359/729; 359/365; 359/432
(58) Field of Search ................................. 359/643, 645, 359/676, 678, 691, 708, 713–718, 720, 726, 728, 729, 364–366, 432

(56) References Cited

U.S. PATENT DOCUMENTS

| | | | | |
|---|---|---|---|---|
| 6,078,411 A | | 6/2000 | Aoki ........................... | 359/631 |
| 6,124,986 A | * | 9/2000 | Sekita et al. ................. | 359/691 |
| 6,166,859 A | * | 12/2000 | Inuzuka et al. .............. | 359/633 |
| 6,262,852 B1 | * | 7/2001 | Takahashi .................... | 359/643 |
| 6,529,330 B1 | * | 3/2003 | Sekita et al. ................. | 359/630 |
| 6,639,729 B2 | * | 10/2003 | Tanaka et al. ............... | 359/676 |

FOREIGN PATENT DOCUMENTS

| | | | | |
|---|---|---|---|---|
| JP | 10-197796 | | 7/1998 | |
| JP | 10-260357 | | 9/1998 | |
| JP | 11038473 A | * | 2/1999 | ........... G03B/13/06 |
| JP | 11-084476 | | 3/1999 | |

* cited by examiner

Primary Examiner—Evelyn A. Lester
(74) Attorney, Agent, or Firm—Pillsbury Winthrop LLP

(57) ABSTRACT

The invention relates to a compact, high-performance yet wide-field real image type zoom finder comprising a positive objective optical system Ob and a positive eyepiece optical system Ep and further including an image-inverting means for erecting an real image formed by the objective optical system. The objective optical system Ob comprises a plurality of moving groups G2 and G3, and the eyepiece optical system Ep comprises positive reflecting surfaces, at least one of which is defined by a rotationally asymmetric surface, and satisfies conditions $1.25 < d_{EP}/f_{OC} < 2.0$ and $0.5 < l_{OC}/f_{OC} < 1.3$ where $d_{EP}$ is the distance as measured along an axial chief ray from a final surface to an eye point of the eyepiece optical system, $f_{OC}$ is the focal length of the eyepiece optical system, and $l_{OC}$ is the length as calculated on an air basis and measured along an axial chief ray from an intermediate image-formation plane to the final surface of the eyepiece optical system.

74 Claims, 30 Drawing Sheets

M

REAL IMAGE TYPE ZOOM FINDER

This application claims benefit of Japanese Application No. 2000-319256 filed in Japan Oct. 19, 2000, the contents of which are incorporated by this reference.

BACKGROUND OF THE INVENTION

The present invention relates generally to a real image type zoom finder comprising an image-inversion optical system, and more specifically to a zoom finder that is used on cameras, video cameras or the like to erect the inverted image of an object formed by an objective optical system, thereby observing the image in an erected form through an image-inversion optical system.

Finder optical systems used on compact cameras, etc. are provided separately from phototaking optical systems unlike those used on single-lens reflex cameras. Such finder optical systems are generally broken down into a virtual image type finder and a real image type finder. The virtual image type finder is found to be unsuitable for use on compact cameras, because its construction renders it difficult to have a good sight of a field frame and especially because the diameter of a lens arrangement becomes large when the finder is designed in a zoom mode. At present, accordingly, the so-called real image type finder is generally used, wherein a primary real image formed by an objective optical system is erected by an image-inverting optical system for observation through an eyepiece optical system.

In recent years, there is a growing demand for compact cameras to have high zoom ratios and reduced size. However, it is still difficult to reduce the size of this real image type finder. An associated phototaking optical system, too, has a similar problem. Now, this problem is resolved to a certain degree by contriving the construction of a frame in such a way that zooming groups can be compactly received or collapsed therein when the camera is not in use. In view of design, however, it is difficult to construct finder optical systems in such a manner, and so it is particularly difficult to reduce the size of the finder optical systems.

So far, the size of the finder optical system has been reduced by contriving or designing the group arrangement of an objective optical system in such a way as to make the telephoto ratio low. However, this method of reducing the telephoto ratio is found to have some limitation in view of performance.

Another possible approach is to reduce the size of the finder optical system by modifying the construction of an eyepiece optical system. That is, the objective optical system is constructed in such a way that the size of an intermediate image is reduced while the necessary angle of view is kept, and the scaling factor of the eyepiece optical system is increased, accordingly. With this approach, the size of the finder optical system may be reduced because while the same specifications are kept, the focal lengths of the objective and eyepiece optical systems can be shortened.

However, a problem with this approach is the magnitude of an eye point. For instance, when light from the intermediate image is incident on the eyepiece optical system at an infinite entrance pupil position (=parallel light) as shown in FIG. 31, an exit pupil position, i.e., the eye point has the same distance as a focal length, as can be seen from the paraxial theory. In other words, if the focal length f of the eyepiece optical system is shortened, the eye point will in principle become short. For instance, this will in turn offer a shading problem to an observer with spectacles on, because the periphery of a screen is shaded.

Thus, the method of slimming down the finder optical system by shortening the focal length of the eyepiece optical system is practically difficult to carry out, because of another problem that the eye point becomes short.

Outside of compactness, on the other hand, there is another need of a recently growing camera user base. The primary object of compact cameras produced for mass markets is compactness, and ease of use, and so they are inferior to professional-or high amateur-grade single-lens reflex cameras in terms of some specifications. The angle of field is among these demerits. With finder optical systems for compact cameras proposed so far in the art, it is impossible to view an image under observation on an enlarged scale because the field of view is more limited than that of the single-lens reflex camera for lack of any sufficient angle of field.

One possible method for increasing this angle of field is to increase the size of an image formed by an objective optical system. However, this method is unsuitable for compact cameras, because the increased image immediately leads to an increase in the size of the whole optical system.

Another possible method is to increase the scaling factor of an eyepiece optical system by reducing the focal length thereof while the size of an intermediate image is maintained. With this arrangement, the magnification may be increased without any increase in the size of the optical system. However, this method, too, have some problems, in which there is the magnitude of an optical path length. For a real image type finder designed to form a real image once in an optical path, it is required to locate an image-inverting optical system (for instance, a prism or mirror) so as to make correction for an inverted image. If the focal length of the eyepiece optical system is merely reduced to this end, it is then difficult to locate the image-inverting optical system in an optical path, because the space for receiving it becomes unacceptably small.

Thus, some limitation is imposed on the method of making the field of view wide by reducing the focal length of the eyepiece optical system, because of the problem that the optical path length becomes short.

Thus, the needs of a variety of user bases cannot be fully addressed because of some limitations on the construction of the eyepiece optical system in real image type finders. Never until now is there any substantial attempt to make improvements in the construction of an eyepiece optical system.

Among recently proposed approaches, on the other hand, there is one proposal wherein the reflecting surface of an image-inverting optical system in a real image type finder, i.e., the reflecting surface of a prism or mirror forming part of the image-inverting optical system is formed of a curved surface to give power thereto. Since the reflecting surface of an image-inverting optical system is generally decentered with respect to an optical axis, giving power to that surface causes rotationally asymmetric decentration aberration. In principle, such decentration aberration cannot possibly be corrected only by use of a rotationally symmetric surface. According to recently proposed approaches, this decentration aberration is corrected by using a rotationally asymmetric surface to improve performance, as referred to below.

JP-A 11-242165 discloses a real image type zoom finder wherein the reflecting surface of a prism on the eyepiece side is formed of a rotationally asymmetric surface. In Example 1, 2 and 5, the eyepiece optical system is made up of a prism and a refracting lens, and in Example 3 and 4 the eyepiece optical system is made up of a prism alone. However, the refracting exit surfaces of both prisms have strong positive power.

JP-A 10-197796 shows in Numerical Example 6 that rotationally asymmetric curved surfaces are used for the refracting surface and reflecting surface of a prism on the eyepiece side of a finder optical system. However, the half angle of view on the wide-angle end is barely about 15°.

JP-A 11-84476 shows a real image type zoom finder wherein the reflecting surface of a prism on the eyepiece side is constructed of a rotationally asymmetric surface. The entrance and exit optical axes of an eyepiece optical system are parallel with each other in the same direction. Image inversion relies on a relay method for forming images twice in an optical path. Finder magnifications are 0.33, 0.34, and 0.28. Throughout the examples, single-focus systems are given.

JP-A 10-260357 shows that the reflecting surface of an eyepiece optical system is made up of a rotationally asymmetric surface, and states that the invention may be applied to cameras comprising an image pickup optical system and a finder optical system. However, the publication shows nothing specific about the construction of an objective optical system.

However, these prior optical systems have many problems as discussed below.

A problem with the JP-A 11-242165 is that the power of the eyepiece optical system is substantially allocated to the refracting lens in Example 1, 2, 5 and the refracting exit surface in Example 3, and 4, and the reflecting surface has a chief action on correction of aberrations. On account of this problem, it is still impossible to achieve the optimum arrangement for compactness and a wide field of view.

Referring to JP-A 10-197796, most compact cameras include a wide-angle arrangement (of about 25 mm to 40 mm as calculated on a 35 mm film basis, with a half angle of view of 28.4° to 40.8°) irrespective of whether they are of the single-focus type or of the zoom type. Thus, unless they have any suitable magnification at the wide-angle, they cannot then be commodity-grade systems. For instance, it is difficult to apply Example 6 of JP-A 10-197796 immediately to a finder. Further, some narrow field of view makes observation difficult.

JP-A 11-84476 fails to disclose a system designed while compactness is taken into account in terms of both the entrance optical axis direction and the image inversion method. A very low finder magnification makes the field of view too narrow for observation. In addition this system is not designed with zooming in mind.

Referring to JP-A 10-260357 or the like, the following two conditions are absolutely necessary for a real image type finder used on compact cameras, etc. The first condition provides that the entrance optical axis of an objective optical system be parallel, or nearly parallel, with the exit optical axis of an eyepiece optical system. A failure in meeting this condition makes it very difficult to handle a camera because there is a large difference between the direction of looking in at the finder and the direction of viewing an image. The second condition provides that the reflecting surface for correcting an inverted image be properly designed to erect the inverted image. A failure in satisfying this condition causes reversal of the inverted image in the horizontal or vertical direction, and so makes it very difficult to observe the image. In other words, three optical systems, i.e., the objective, image-inverting and eyepiece optical systems must be properly designed to satisfy two such conditions. JP-A 10-260357 states that the invention may be applied to a finder optical system. However, this publication sets forth nothing about any construction comprising the objective and image-inverting optical systems necessary for a real image type finder. Therefore, even though the arrangement schematically shown in JP-A 10-260357 is capable of satisfying the first and second conditions, it is not always possible to achieve compactness and a wide field of view. The publication is also silent about whether or not high performance is achieved, because the performance of the eyepiece optical system remains unrevealed.

Thus, all the prior arts with power given to the reflecting surface have no idea of how compactness and a wide field of view are achieved. Some prior arts, although having such an idea, are still less than satisfactory.

SUMMARY OF THE INVENTION

In view of such problems with the prior arts, the first object of the invention is to provide a compact yet high-performance real image type zoom finder, and the second object of the invention is to provide a wide-field yet high-performance real image type zoom finder. The third of the invention is to provide a real image type zoom finder in which some contrivance is added to how to turn back an finder optical path, thereby satisfying the requirements for high zoom ratios and compactness at the same time.

According to the first aspect of the invention, these objects are achieved by the provision of a real image type zoom finder comprising, in order from an object side thereof, a positive objective optical system and a positive eyepiece optical system and further including an image inverting means for erecting a real image formed through the objective optical system, wherein:

said objective optical system comprises a plurality of moving groups, and said eyepiece optical system comprises positive reflecting surfaces at least one of which is defined by a rotationally asymmetric surface and satisfies the following conditions:

$$1.25 < d_{EP}/f_{OC} < 2.0 \quad (1)$$

$$0.5 < l_{OC}/f_{OC} < 1.3 \quad (2)$$

where $d_{EP}$ is a distance as measured along an axial chief ray from the final surface to the eye point of the eyepiece optical system, $f_{OC}$ is the focal length of the eyepiece optical system, and $l_{OC}$ is a length as calculated on an air basis and measured along an axial chief ray from an intermediate image-formation plane to the final surface of the eyepiece optical system.

Preferably in this case, the zoom finder should meet the following condition:

$$0.2 < f_W/f_{OC} < 1.0 \quad (3)$$

Here $f_W$ is the focal length of the objective optical system at the wide-angle end, and $f_{OC}$ is the focal length of the eyepiece optical system.

Why such an arrangement is used in the first aspect of the invention is now explained together with its action.

Referring to the arrangement of the finder optical system contrived to achieve the first object of the invention, an account is given of how to overcome the problems with the prior art method and reduce the focal length of the eyepiece optical system, thereby achieving compactness.

In general, a real image type finder comprises an image-inverting optical system between an intermediate image-formation plane and an eyepiece optical system. This is an optimum arrangement because if the eyepiece optical system has a certain long focal length, it is then possible to obtain a long eye point as well as a space large enough to locate the image-inverting optical system therein. However, if the focal length is short, this provides an unfavorable arrangement because of a short eye point and because the space for receiving the image-inverting optical system is likely to become small.

This is because it is impossible to provide any large movement of the principal point of the eyepiece optical system. In most cases, the eyepiece optical system is generally composed of one lens rather than two or more lenses, because some optical path length with respect to the principal point position must be provided for the image-inverting optical system (on the object side), and the eye point (on the pupil side), respectively. With such an arrangement, it is difficult to move the principal point position largely from the position wherein the eyepiece optical system is located. Thus, the focal length changes largely depending on the size of the space wherein the eye point or the image-inverting optical system is located.

According to the invention, therefore, the image-inverting optical system is constructed of reflecting surfaces having power. In other words, the image-inverting optical system located on the pupil side with respect to the intermediate image-formation surface is designed in such a way that it also functions as an eyepiece optical system, thereby making it possible to move the principal point position of the eyepiece optical system. It is thus necessary to allocate positive power to at least one reflecting surface. Accordingly, even if there is a large change in the focal length, the eye point or the space with the image-inverting optical system located therein is less likely to change.

It is then noted that the simple application of power to a decentered reflecting surface gives rise to rotationally asymmetric decentration aberration. This decentration aberration cannot be corrected by an aspheric surface of rotational asymmetry or the like, and so must be corrected using a surface of rotational symmetry. It is thus possible to make correction for the decentration aberration and, hence, ensure good enough performance.

It is also noted that unless the eyepiece optical system is at the same time designed in such a way as to have a certain or longer eye point, it is then impossible to accomplish the object of the invention. It is consequently desired to satisfy the following condition:

$$1.25 < d_{EP}/f_{OC} < 2.0 \tag{1}$$

Here $d_{EP}$ is the distance as measured along an axial chief ray from the final surface to the eye point (i.e., exit pupil) of the eyepiece optical system, and $f_{OC}$ is the focal length of the eyepiece optical system.

It is noted that in some cases, the use of a rotationally asymmetric surface renders it impossible to provide any strict definition of focal length. For this reason, the focal length f used herein is defined by $$f = h/\alpha$$

Here h is the minuscule height of a ray that is parallel with an axial chief ray and entered into an optical system from its object side, and $\alpha$ is the angle (in radian) of a ray that emerges from the optical system and makes with the axial chief ray.

Exceeding the upper limit of 2.0 to condition (1) causes a deterioration in optical performance, and falling below the lower limit of 1.25 causes the eye point to become too short for observation.

More preferably, the eyepiece optical system of the invention should meet the following condition:

$$1.35 < d_{EP}/f_{OC} < 1.8 \tag{1-1}$$

Unless, at this time, there is ample space for receiving the image-inverting optical system, it is then impossible to attain the object of the invention. It is consequently desired to meet the following condition:

$$0.5 < l_{OC}/f_{OC} < 1.3 \tag{2}$$

Here $l_{OC}$ is the length as calculated on an air basis and along an axial chief ray from an intermediate image-formation plane to the final surface of the eyepiece optical system, and $f_{OC}$ is the focal length of the eyepiece optical system.

Exceeding the upper limit of 1.3 to condition (2) runs counter to making the optical system compact, because the space for receiving the image-inverting optical system becomes too much. Falling below the lower limit of 0.5 renders it impossible for the eyepiece optical system to ensure the necessary number of reflections with the result that excessive loads are imposed on designing the objective optical system.

More preferably, it is preferable to meet the following condition:

$$0.6 < l_{OC}/f_{OC} < 1.2 \tag{2-1}$$

For the eyepiece optical system, it is thus required to satisfy two such conditions.

Reference is now given to the construction or arrangement necessary for the objective optical system. The zooming action is preferably allocated to the objective optical system, and so it is required to move at least two groups. Thus, if the zooming action is allocated to the objective optical system, it is then possible to easily construct the optical system with a long back focus for instance, because it has at least two lens groups. This in turn makes it possible to locate more reflecting surfaces on the objective optical system side, so that the eyepiece optical system can be designed under a relatively reduced load. On the other hand, a single-focus optical system may be constructed of one lens. However, such a one-lens optical system has its back focus depending on its focal length, as explained in conjunction with the eyepiece optical system. It is consequently difficult to locate more reflecting surfaces on the objective optical system side, and so it is necessary to allocate an image-inverting action to the eyepiece optical system side. If the objective optical system is constructed using an increased number of lenses, it is then possible to construct the optical system with a long back focus. However, this costs much relative to the single-focus specification. It is thus preferable to construct the objective optical system in a zoom mode.

The size of the image under observation is dependent on the focal lengths of the objective, and eyepiece optical systems. To meet the requirements for compactness and magnification capable of easy observation, accordingly, it is required to determine that size properly. In other words, it is preferable to satisfy the following condition:

$$0.2 < f_W/f_{OC} < 1.0 \tag{3}$$

Here $f_W$ is the focal length of the objective optical system at the wide-angle end, and $f_{OC}$ is the focal length of the eyepiece optical system.

Exceeding the upper limit of 1.0 to condition (3) causes an increase in the size of the optical system, and falling below the lower limit of 0.2 makes the field of view too narrow for observation.

More preferably, condition (3) should be reduced down to $$0.3 < f_W/f_{OC} < 0.7 \tag{3-1}$$

According to the second aspect of the invention, there is provided a real image type zoom finder comprising, in order from an object side thereof, a positive objective optical system and a positive eyepiece optical system and further including an image-inverting means for erecting a real image formed by the objective optical system with only one image-formation action, wherein:

said objective optical system comprises a plurality of moving groups, and said eyepiece optical system comprises positive reflecting surfaces, at least one of which is defined by a rotationally asymmetric surface and satisfies the following conditions:

$$0.25 < Ih/f_{OC} < 1.0 \tag{4}$$

$$0.3 < f_W/f_{OC} < 1.2 \tag{5}$$

where Ih is a half of the diagonal length of a field stop located near an intermediate image-formation plane, $f_W$ is the focal length of the objective optical system at the wide-angle end, and $f_{OC}$ is the focal length of the eyepiece optical system.

Why such an arrangement is used in the second aspect of the invention is now explained with its action.

The second aspect of the invention is provided to accomplish the second object of the invention. As referred to in conjunction with the prior art, making the field of view wide is achieved by two methods, one comprising increasing the height of an intermediate image (i.e., a half of the diagonal length of the field stop located near the intermediate image-formation plane), and another comprising increasing the magnification of eyepiece. The invention relies upon the method of increasing the magnification of eyepiece for the purpose of ensuring compactness.

The magnification of eyepiece may be increased by making the focal length of the eyepiece optical system short. Then, however, a problem arises in connection with the construction of the image-inverting optical system. As the focal length becomes short, the principal point comes close to the intermediate image-formation plane. Accordingly, it is difficult to locate in the resulting space the image-inverting optical system, generally reflecting surfaces. Even when more lenses are used to shift the principal point, it is impossible to obtain effects as expected, practically because the lenses take up some large space by themselves.

On the other hand, no reflecting surfaces can be located on the eyepiece optical system side. Accordingly, images may be inverted by increasing the number of reflecting surfaces located on the objective optical system side. However, this places some considerable load on designing the objective optical system, and so is not preferable.

Therefore in the invention, powers are given to the reflecting surfaces in the image-inverting optical system located in the eyepiece optical system. More specifically, the role of an eyepiece optical system is allocated to the image-inverting optical system located on the pupil side with respect to the intermediate image-formation plane, so that the principal point position of the eyepiece optical system can be shifted. It is thus necessary to allocate positive power to at least one reflecting surface, thereby making it easy to ensure the necessary number of reflecting surfaces even when the focal length is made short.

It is then noted that the simple application of power to a decentered reflecting surface gives rise to rotationally asymmetric decentration aberration. This decentration aberration cannot be corrected by an aspheric surface of rotational asymmetry or the like, and so must be corrected using a surface of rotational symmetry. It is thus possible to make correction for the decentration aberration and, hence, ensure good enough performance.

To make the field of view wide according to the invention, it is then required to satisfy the following condition:

$$0.25 < Ih/f_{OC} < 1.0 \tag{4}$$

Here Ih is a half of the diagonal length of a field stop located near the intermediate image-formation plane, and $f_{OC}$ is the focal length of the eyepiece optical system.

It is noted that in some cases, the use of a rotationally asymmetric surface renders it impossible to provide any strict definition of focal length. For this reason, the focal length f used herein is defined by $$f = h/\alpha$$

Here h is the minuscule height of a ray that is parallel with an axial chief ray and entered into an optical system from its object side, and $\alpha$ is the angle (in radian) of a ray that emerges from the optical system and makes with the axial chief ray.

When the upper limit of 1.0 to condition (4) is exceeded, it is impossible to ensure consistent performance as far as the periphery of the screen although it is possible to make the field of view wide. When the lower limit of 0.25 is not reached, the observation screen becomes too small to make the field of view wide.

More preferably, condition (4) should be reduced down to $$0.27 < Ih/f_{OC} < 0.75 \tag{4-1}$$

Reference is now given to the construction or arrangement necessary for the objective optical system. The zooming action is preferably allocated to the objective optical system, and so it is required to move at least two lens groups. Thus, if the zooming action is allocated to the objective optical system, it is then possible to easily construct the optical system with a long back focus for instance, because it has at least two lens groups. This in turn makes it possible to locate more reflecting surfaces on the objective optical system side, so that the eyepiece optical system can be designed under a relatively reduced load. On the other hand, a single-focus optical system may be constructed of one lens. However, such a one-lens optical system has its back focus depending on its focal length, as explained in conjunction with the eyepiece optical system. It is consequently difficult to locate more reflecting surfaces on the objective optical system side, and so it is necessary to allocate an image-inverting action to the eyepiece optical system side. If the objective optical system is constructed using an increased number of lenses, it is then possible to construct the optical system with a long back focus. However, this costs much relative to the single-focus specification. It is thus preferable to construct the objective optical system in a zoom mode.

Increasing the height of the intermediate image may lead to a wide field of view, but does not lead to compactness. A too-large-size optical system is not preferable for use with a compact camera or the like. The size of the intermediate image is dependent on the focal length of the objective optical system with respect to the eyepiece optical system, and so must be determined properly. That is, the following condition should preferably be satisfied:

$$0.3 < f_W/f_{OC} < 1.2 \quad (5)$$

Here $f_W$ is the focal length of the objective optical system at the wide-angle end, and $f_{OC}$ is the focal length of the eyepiece optical system.

Exceeding the upper limit of 1.2 to condition (5) causes the intermediate image to become too large to reduce the size of the optical system, and falling below the lower limit of 0.3 renders it impossible to make the field of view wide.

More preferably, condition (5) should be reduced down to $$0.45 < f_W/f_{OC} < 1.0 \quad (5\text{-}1)$$

According to the third aspect of the invention, there is provided a real image type zoom finder comprising, in order from an object side thereof, a positive objective optical system and a positive eyepiece optical system and further including an image-inverting means for erecting a real image formed by the objective optical system, wherein:

said objective optical system comprises a plurality of moving groups, and said objective optical system further comprises, in order from an object side thereof, a reflecting surface having negative power and a reflecting surface having positive power on an eyepiece optical system side with respect to an intermediate image-formation plane, with at least one of said reflecting surfaces being defined by a rotationally asymmetric surface.

Why such an arrangement is used in the third aspect of the invention is now explained with its action.

Reference is here made to the power profile of the reflecting surfaces necessary for the accomplishment of the first and second objects of the invention.

With the image-inverting optical system located on the eyepiece optical system side, i.e., by imparting powers to the reflecting surfaces, it is possible to achieve a smooth shift of the principal point as already explained. This makes it possible to shift the principal point into the image-inverting optical system even when the focal length of the eyepiece optical system is shortened for the purpose of accomplishing the objects of the invention, so that high performance can be achieved with no application of any load on optical performance.

However, the eye point—which has nothing to do with the principal point—is a distance from the exit surface to the pupil of the eyepiece optical system; that is, any excessive shift of the principal point position into the image-inverting optical system is unfavorable. It is thus required to impart proper powers to the reflecting surfaces in such a way as to ensure the eye point easily.

Therefore in the invention, the reflecting surfaces located on the eyepiece optical system side with respect to the intermediate image-formation plane are defined by a reflecting surface having negative power and a reflecting surface having positive power as viewed from the object side of the system.

With such an arrangement, it is easy to ensure the eye point, because the principal point is shifted toward the pupil side even with a short focal length.

It is then noted that the simple application of power to a decentered reflecting surface gives rise to rotationally asymmetric decentration aberration; that is, at least one reflecting surface should be defined by a rotationally asymmetric surface. It is thus possible to make correction for the decentration aberration and, hence, ensure good enough performance.

According to the fourth aspect of the invention, there is provided a real image type zoom finder comprising, in order from an object side thereof, a positive objective optical system and a positive eyepiece optical system and further including an image-inverting means for erecting a real image formed by the objective optical system, wherein:

said objective optical system comprises a plurality of moving groups, and said eyepiece optical system comprises, in ray propagation order from an object side thereof, a first transmitting surface, a first reflecting surface, a second reflecting surface and a second transmitting surface, wherein said first transmitting surface is provided separately from said first and second reflecting surfaces, said second transmitting surface is defined by a surface common to said first reflecting surface, said first reflecting surface has negative power, said second reflecting surface has positive power, and at least said second reflecting surface is defined by a rotationally asymmetric surface.

Why such an arrangement is used in the fourth aspect of the invention is now explained with its action.

Here the construction of a prism best suited for the purpose of accomplishing the first and second objects of the invention is explained.

If a prism is designed in such a way that a light ray is entered in a surface through which the light ray has been transmitted and at which the light ray undergoes total reflection, the transmitting and reflecting surfaces can then be made of the same surfaces. For this prism, it is unnecessary to construct each surface in such a way that an effective portion of a transmitting surface is separated from an effective portion of a reflecting surface. Accordingly, it is possible to reduce the size of the prism or make an optical path short. However, when this surface is used as a reflecting surface, it is impossible to impart too large power thereto, because decentration aberration is likely to occur because of the need of an angle of total reflection, i.e., a relatively large angle of reflection.

On the other hand, the eyepiece optical system is generally incapable of transmitting an image unless it is positioned in agreement with the pupil position of the objective optical system. For this reason, it is preferable that the entrance surface comprises a field lens of relatively strong power or a refracting surface having the same effect.

The exit surface of the eyepiece optical system has an increased effective range because an ambient ray bundle becomes larger thereat than in the vicinity of the entrance surface thereof.

As already explained, it is difficult to locate too many reflecting surfaces in the eyepiece optical system, because the focal length of the eyepiece optical system is kept short.

Therefore in the invention, the eyepiece optical system is composed of, in a ray propagation order from an object side thereof, a first transmitting surface, a first reflecting surface, a second reflecting surface and a second transmitting surface wherein the first transmitting surface is provided independently of the first and second reflecting surfaces and the second transmitting surface is defined by a surface common to the first reflecting surface. This arrangement allows relatively strong power to be imparted to the first transmitting surface that is the entrance surface, so that the field lens effect can be fully available. Even when the effective portion of the second transmitting surface that is the exit surface is increased, the prism is so less likely to increase in size that compactness can be achieved.

As already mentioned, the first and second reflecting surfaces are defined by a reflecting surface of negative power and a reflecting surface of positive power, so that it is easy to ensure the eye point.

It is then noted that the simple application of power to a decentered reflecting surface gives rise to rotationally asymmetric decentration aberration; that is, at least the second reflecting surface having the strongest power should be defined by a rotationally asymmetric surface. It is thus possible to make correction for the decentration aberration and, hence, ensure good enough performance.

Preferably for observation of the erected image, at least four reflecting surfaces should be provided on the object side with respect to the intermediate image plane and the intermediate image plane should be made up of a surface image. More preferably for slimming down the finder itself, at least two of the four reflecting surfaces are used to form a ridged roof reflecting surface on an optical path.

According to the fifth aspect of the invention, there is provided a real image type zoom finder comprising, in order from an object side thereof, a positive objective optical system and a positive eyepiece optical system and further including an image-inverting means for erecting a real image formed by the objective optical system, wherein:

said real image type zoom finder includes a plurality of moving groups and at least three reflecting surfaces on an objective optical system side with respect to an intermediate image-formation plane, and said real image type zoom finder includes positive reflecting surfaces on an eyepiece optical system with respect to the intermediate image-formation plane, at least one of which reflecting surfaces is defined by a rotationally asymmetric surface.

Why such an arrangement is used in the fifth aspect of the invention is now explained with its action.

Here the construction of the objective optical system best suited for the purpose of accomplishing the first and second objects of the invention is explained.

By imparting positive power to at least one of the reflecting surfaces located on the eyepiece optical system side, the objects of the invention can be attained as already mentioned.

When power is imparted to a reflecting surface, on the other hand, its angle of reflection is also dependent on performance. In other words, it is very important to determine the angle of reflection, because as the angle of reflection becomes large, the amount of decentration aberration produced becomes large. As referred to in conjunction with the prior art, however, a real image type finder for use with compact cameras or the like is designed on condition that an entrance optical axis for an objective optical system should be parallel, or nearly parallel, with an exit optical axis for an eyepiece optical system. To meet that condition, there is often no other choice but to increase the angle of reflection on the eyepiece optical system side. To this end, the location of this reflecting surface is of vital importance. The use of too many reflecting surfaces may make it easy to determine the angle of reflections at the reflecting surfaces on the eyepiece side; however, it is not preferable because the image under observation becomes dark due to an increased quantity-of-light loss. In addition, it is impossible to locate too many reflecting surfaces in the eyepiece optical system because it is designed in such a way that its focal length is set at a relatively short length.

Therefore in the invention, at least three reflecting surfaces are located on the object side with respect to the intermediate image-formation plane. By locating this number of reflecting surfaces on the objective optical system side, the angle of light rays incident on the reflecting surfaces on the eyepiece optical system side can be so properly determined that the performance of the eyepiece optical system can be improved.

According to the sixth aspect of the invention, there is provided a real image type zoom finder comprising, in order from an object side thereof, a positive objective optical system and a positive eyepiece optical system and further including an image-inverting means for erecting a real image formed by the objective optical system, wherein:

said objective optical system comprises at least one fixed group and a plurality of moving groups, and said eyepiece optical system comprises positive reflecting surfaces, at least one of which is defined by a rotationally asymmetric surface.

Why such an arrangement is used in the sixth aspect of the invention is now explained with its action.

Here the construction of the second objective optical system best suited for the purpose of accomplishing the first and second objects of the invention is explained.

By imparting positive power to at least one of the reflecting surfaces located on the eyepiece optical system side, the objects of the invention can be attained as already mentioned.

When the focal length of the eyepiece optical system is shortened, a ray bundle incident on the objective optical system becomes thick (changes from solid lines to dotted lines), as shown in FIG. 32. The cause for this is that the aperture of the optical system becomes large because while the exit pupil (human eye) is kept constant, the focal length of the eyepiece optical system is reduced. For this reason, the F-number of the objective optical system becomes small. In other words, unless the objective optical system is properly designed, it is then impossible to achieve high performance.

For setting up a zoom system, at least two groups are needed. However, this zoom system has a reduced F-number and, hence, less-than-satisfactory performance. For this reason, the objective optical system according to the invention is made up of three groups.

Since the eyepiece optical system is constructed with a reduced focal length, the scaling factor of an intermediate image formed by the objective optical system is high. For this reason, when the lens on the objective optical system is decentered due to production errors, the deterioration of performance is more marked, offering a problem. The lens cannot smoothly be moved without any mechanical clearance for cams, and so more or less decentration of the moving groups occurs unavoidably. In other words, the increase in the number of moving groups runs counter to performance. Accordingly, it is required to reduce the number of moving groups and, instead, provide at least one fixed group.

According to the seventh aspect of the invention, there is provided a real image type zoom finder comprising, in order from an object side thereof, a positive objective optical system and a positive eyepiece optical system and further including an image-inverting means for erecting a real image formed by the objective optical system, wherein:

said objective optical system comprises a plurality of moving groups and at least five aspheric surfaces, and said eyepiece optical system comprises positive reflecting surfaces, at least one of which is defined by a rotationally asymmetric surface.

Preferably in this case, the objective optical system should be composed of at most 20 aspheric surfaces.

Preferably, at least one of such aspheric surfaces should satisfy the following condition:

$$0.02 < |(n'-n) \cdot (1/r - 1/r_{ASP}) \cdot f_{OC}| < 1 \tag{6}$$

Here n'0 is the refractive index of a medium on the refraction side, n is the refractive index of a medium on the entrance side (n'=−n for a reflecting surface), r is a paraxial radius of curvature on an optical axis, $r_{ASP}$ is a radius of curvature that undergoes the largest change in an effective diameter among the radii of curvature of a peripheral portion, and $f_{OC}$ is the focal length of the eyepiece optical system. It is here noted that $r_{ASP}$ is indicative of the radius of curvature with an aspheric effect taken into consideration. Let f(y) represent a defining equation for an aspheric surface. Then, $r_{ASP}$ is defined by $$r_{ASP}=y·(1+f'(y)^2)^{1/2}/f'(y)$$

Here y is a height from the optical axis, and f'(y) is the first differential of f(y).

More preferably, the eyepiece optical system should comprise at least one aspheric surface capable of meeting the following condition (7) and at least one surface capable of satisfying the following condition (8):

$$0.02<(n'-n)·(1/r-1/r_{ASP})·f_{OC}<1 \qquad (7)$$

$$-1<(n'-n)·(1/r-1/r_{ASP})·f_{OC}<-0.02 \qquad (8)$$

Why such an arrangement is used in the seventh aspect of the invention is now explained with its action.

Here the construction of the third objective optical system best suited for the purpose of accomplishing the first and second objects of the invention is explained.

With the method according to the sixth aspect of the invention, it is possible to overcome the deterioration of performance which is found when the aperture is increased by increasing the number of lens groups. Instead of using this method, the deterioration-of-performance problem found when the F-number of the objective optical system become small may be overcome without recourse to too many lens groups.

The use of too many lens groups is unfavorable for compactness because the length of the lens arrangement becomes unavoidably long. In addition, the use of too many parts leads to another problem that since production errors occur due to a number of factors, it is difficult to ensure performance in view of production.

Therefore in the invention, at least five aspheric surfaces are provided in the objective optical system. Such an arrangement makes it possible to reduce the amount of aberrations produced without recourse to too many lens groups and achieve high performance. It is noted that the term "aspheric surface" used herein includes either a rotationally symmetric aspheric surface or a rotationally asymmetric aspheric surface. The aspheric surface may be used for either a refracting surface or a reflecting surface.

More preferably, seven aspheric surfaces should be used so as to achieve higher performance in a more effective manner.

The use of too many aspheric surfaces is unfavorable in view of processing cost and assembly. For this reason, it is preferable to use twenty aspheric surfaces at most. More preferably, fifteen or less aspheric surfaces should be used.

Preferably in this case, at least one of such aspheric surfaces should satisfy the following condition:

$$0.02<|(n'-n)·(1/r-1/r_{ASP})·f_{OC}|<1 \qquad (6)$$

Here n' is the refractive index of a medium on the refraction side, n is the refractive index of a medium on the entrance side (n'=−n for a reflecting surface), r is a paraxial radius of curvature on an optical axis, $r_{ASP}$ is a radius of curvature that undergoes the largest change in an effective diameter among the radii of curvature of a peripheral portion, and $f_{OC}$ is the focal length of the eyepiece optical system. It is here noted that $r_{ASP}$ is indicative of the radius of curvature with an aspheric effect taken into consideration. Let f(y) represent a defining equation for an aspheric surface. Then, $r_{ASP}$ is defined by $$r_{ASP}=y·(1+f'(y)^2)^{1/2}/f'(y)$$

Here y is a height from the optical axis, and f'(y) is the first differential of f(y).

This equation may be derived from an equation with respect to a circle with the center lying on an optical axis and an equation with respect to the normal to a surface at a height y. When the upper limit of 1 to condition (6) is exceeded, the aspheric effect becomes too strong for processing, and when the lower limit of 0.02 is not reached, the aspheric effect becomes too slender to achieve high performance in an effective manner.

In this respect, it is more preferable to meet the following condition:

$$0.1<|(n'-n)·(1/r-1/r_{ASP})·f_{OC}|<0.5 \qquad (6-1)$$

It is also preferable to use two types of aspheric surfaces, one having positive power becoming weak toward its periphery and another having negative power becoming weak toward its periphery, because aberrations are easily placed in a well-balanced state, thereby achieving high performance. Preferably in this case, the following conditions should be satisfied:

$$0.02<(n'-n)·(1/r-1/r_{ASP})·f_{OC}<1 \qquad (7)$$

$$-1<(n'-n)·(1/r-1/r_{ASP})·f_{OC}<-0.02 \qquad (8)$$

When the upper limit of 1 to condition (7) is exceeded and the lower limit of −1 to condition (8) is not reached, the aspheric effect becomes too strong for processing, and when the lower limit of 0.02 to condition (7) is not reached and the upper limit of −0.02 to condition (8) is exceeded, the aspheric effect becomes too slender to achieve high performance in an effective manner.

More preferably, conditions (7) and (8) should be reduced down to $$0.1<(n'-n)·(1/r-1/r_{ASP})·f_{OC}<0.5 \qquad (7-1)$$

$$-0.5<(n'-n)·(1/r-1/r_{ASP})·f_{OC}<-0.1 \qquad (8-1)$$

A detailed account is now given of the real image type zoom finders according to the first through seventh aspects of the invention, by which the objects of the invention can be achieved more effectively.

First of all, the prism used for the image-inverting optical system is explained.

A reflecting surface arrangement is primarily broken down into two types, one using a prism and another using a mirror. These arrangements vary largely in properties, albeit being optical systems using reflecting surfaces. Here consider a reflecting surface with curvature (a radius of curvature r) imparted thereto. A paraxial power calculating formula teaches that the power of that surface is −2n/r for a prism filled inside with a medium having a refracting index n greater than 1, and −2/r for a mirror; even at the same curvature, their power differs. Thus, the prism can have the same power at a curvature of 1/n as compared with the mirror; that is, the prism is superior to the mirror in terms of the amount of aberrations produced at the reflecting surface. In addition to a reflecting surface, a prism comprises by itself two refracting surfaces, i.e., an entrance refracting surface and an exit refracting surface, and so is superior to a mirror having only one reflecting surface by itself in terms of correction of aberrations. Moreover, the prism is filled with a medium having a refractive index greater than 1, and so can take up a longer optical path as compared with the mirror located in the air, so that it is relatively easy to ensure a reflecting surface even when the focal length thereof is short.

On the other hand, a reflecting surface is more likely to suffer from performance deterioration due to decentration errors than a refracting surface, and so must be assembled with high accuracy. However, when a plurality of reflecting surfaces are arranged to construct an optical system, it is favorable to use a prism wherein reflecting surfaces can be integrated together and fixed at relative positions, because any performance deterioration due to assembly can be prevented.

Thus, the prism is superior in many respects to the mirror. Accordingly, it is desired to construct the image-inverting optical system using a prism.

Throughout the first to fifth aspects of the invention, it is preferable that the objective optical system comprises at least three groups, as explained with reference to the sixth aspect of the invention.

Preferably in this case, too, the objective optical system comprises at least one fixed group.

Throughout the first to sixth aspects of the invention, it is preferable that the moving group in the objective optical system is a refracting optical system with no reflecting surface.

Generally, when a surface is tilted with respect to an optical axis, its effective range becomes necessarily large as compared with the case of vertical incidence. It is noted that when the effective portion of a decentered reflecting surface is designed in such a way that the effective portion of an entrance surface does not overlap that of an exit surface, the spacing between the entrance and the reflecting surface or the reflecting and the exit surface must be made wide. Thus, a refracting optical system is clearly smaller than a reflecting optical system on a one-element basis.

Generally, the reflecting surface is more likely to suffer from performance deterioration due to errors than the refracting surface. Since the moving group cannot be moved without any mechanical clearance, more or less decentration of the moving group occurs unavoidably.

In consideration of size and performance, it is thus preferable to use a refracting optical system for the moving group in the objective optical system.

Throughout the first to sixth aspect of the invention, it is preferable that the objective optical system comprises at least five aspheric surfaces.

By incorporating at least five aspheric surfaces in the objective optical system, compactness and high performance can be achieved as explained with reference to the seventh aspect of the invention. More preferably, at least seven aspheric surfaces should be used to achieve ever higher performance.

Throughout the first to sixth aspects of the invention, it is preferable to use twenty aspheric surfaces at most.

As explained in conjunction with the seventh aspect of the invention, the use of too many aspheric surfaces is unfavorable in view of processing cost and assembly. It is thus preferable to use twenty or less, especially fifteen or less aspheric surfaces.

When the aforesaid objective optical system comprises at least five aspheric surfaces, at least one of such aspheric surfaces should preferably satisfy the following condition:

$$0.02 < |(n'-n) \cdot (1/r - 1/r_{ASP}) \cdot f_{OC}| < 1 \qquad (6)$$

Here n' is the refractive index of a medium on the refraction side, n is the refractive index of a medium on the entrance side (n'=−n for a reflecting surface), r is a paraxial radius of curvature on an optical axis, $r_{ASP}$ is a radius of curvature that undergoes the largest change in an effective diameter among the radii of curvature of a peripheral portion, and $f_{OC}$ is the focal length of the eyepiece optical system. It is here noted that $r_{ASP}$ is indicative of the radius of curvature with an aspheric effect taken into consideration. Let f(y) represent a defining equation for an aspheric surface. Then, $r_{ASP}$ is defined by $$r_{ASP} = y \cdot (1 + f'(y)^2)^{1/2} / f'(y)$$

Here y is a height from the optical axis, and f'(y) is the first differential of f(y).

As already explained in conjunction with the seventh aspect of the invention, at least one aspheric surface should preferably satisfy condition (6). When the upper limit of 1 to condition (6) is exceeded, the aspheric effect becomes too strong for processing, and when the lower limit of 0.02 is not reached, the aspheric effect becomes too slender to achieve high performance in an effective manner.

More preferably, the following condition should be met:

$$0.1 < |(n'-n) \cdot (1/r - 1/r_{ASP}) \cdot f_{OC}| < 0.5 \qquad (6\text{-}1)$$

When the aforesaid objective optical system comprises at least five aspheric surfaces, it should preferably comprise at least one aspheric surface satisfying condition (7) and at least one aspheric surface satisfying condition (8):

$$0.02 < (n'-n) \cdot (1/r - 1/r_{ASP}) \cdot f_{OC} < 1 \qquad (7)$$

$$-1 < (n'-n) \cdot (1/r - 1/r_{ASP}) \cdot f_{OC} < 0.02 \qquad (8)$$

Here n' is the refractive index of a medium on the refraction side, n is the refractive index of a medium on the entrance side (n'=−n for a reflecting surface), r is a paraxial radius of curvature on an optical axis, $r_{ASP}$ is a radius of curvature that undergoes the largest change in an effective diameter among the radii of curvature of a peripheral portion, and $f_{OC}$ is the focal length of the eyepiece optical system. It is here noted that $r_{ASP}$ is indicative of the radius of curvature with an aspheric effect taken into consideration. Let f(y) represent a defining equation for an aspheric surface. Then, $r_{ASP}$ is defined by $$r_{ASP} = y \cdot (1 + f'(y)^2)^{1/2} / f'(y)$$

Here y is a height from the optical axis, and f'(y) is the first differential of f(y).

As already explained in conjunction with the seventh aspect of the invention, it preferable to use two types of aspheric surfaces, one having positive power becoming weak toward its periphery and another having negative power becoming weak toward its periphery, because aberrations are easily placed in a well-balanced state, thereby achieving high performance. Preferably in this case, conditions (7) and (8) should be satisfied.

When the upper limit of 1 to condition (7) is exceeded and the lower limit of −1 to condition (8) is not reached, the aspheric effect becomes too strong for processing, and when the lower limit of 0.02 to condition (7) is not reached and the upper limit of −0.02 to condition (8) is exceeded, the aspheric effect becomes too slender to achieve high performance in an effective manner.

More preferably, conditions (7) and (8) should be reduced down to $$0.1<(n'-n)\cdot(1/r-1/r_{ASP})\cdot f_{OC}<0.5 \quad (7\text{-}1)$$

$$-0.5<(n'-n)\cdot(1/r-1/r_{ASP})\cdot f_{OC}<-0.1 \quad (8\text{-}1)$$

Throughout the first to sixth aspects of the invention, the objective optical system should preferably comprise a generally negative group comprising at least one positive unit and two negative units.

Preferably in this case, the positive unit should be located on the pupil side of the negative group.

In the objective optical system, the image-inverting optical system must be located on the pupil side, and so there must be a power construction enough for a long back focus. To ensure the long back focus, it is preferable to use a −+ construction as viewed from the object side. If the size of a virtual image formed by this negative group is scaled by zooming, it is then possible to ensure the zooming effect and a long back focus.

As already explained in conjunction with the sixth aspect of the invention, the objective optical system must comprise at least three groups. To obtain a generally negative power construction, it is preferable to increase the number of negative units and allocate power thereto, thereby reducing the amount of aberrations produced. In addition, it is required to locate the positive unit, thereby making correction for remaining aberrations by its diverging action. In consideration of correction of aberrations, it is thus preferable to construct the negative group of at least two negative units and one positive group.

Preferably in this case, the negative units should be all composed of refracting lenses with no reflecting surfaces.

As explained in conjunction with the case wherein the moving group in the aforesaid objective optical system is constructed of a refracting optical system with no reflecting surface, even when a reflecting surface is provided, the element itself is not always reduced in size. For the purpose of compactness, it is thus preferable that the negative group is all composed of refracting lenses with no reflecting surfaces.

When the aforesaid objective optical system comprises a generally negative group comprising at least one positive unit and two negative units, the negative group should preferably satisfy the following condition:

$$0.1 < f_W/f_{neg}/1.5 \quad (9)$$

where $f_W$ is the focal length of the objective optical system at the wide-angle end, and $f_{neg}$ is the focal length of the aforesaid negative group at the wide-angle end.

When the lower limit of 0.1 to condition (9) is not reached, the negative power becomes too weak resulting in an increase in the size of the optical system, and when the upper limit of 1.5 is exceeded, the negative power becomes too strong resulting in performance deterioration.

More preferably, condition (9) should be reduced down to $$0.3 < f_W/f_{neg}/1.2 \quad (9\text{-}1)$$

When the aforesaid objective optical system comprises a generally negative group comprising at least one positive unit and at least two negative units, it is preferable that among the negative units, a unit having the strongest positive power and a unit having the strongest negative power satisfy the following condition:

$$0.2 < |fN/fP| < 1.5 \quad (10)$$

where fP is the focal length of the unit having the strongest positive power among the negative units, and fN is the focal length of the unit having the strongest negative power among the negative units.

When the upper limit of 1.5 to condition (10) is exceeded, the power of the negative unit becomes too weak to achieve compactness or the positive power becomes too strong resulting in performance deterioration. When the lower limit of 0.2 is not reached, the negative power becomes too strong resulting in performance deterioration or the positive power becomes too weak to make correction for aberrations, for instance, distortion by the converging effect.

More preferably, condition (10) should be reduced down to $$0.35 < |fN/fP| < 1.0 \quad (10\text{-}1)$$

To reduce the performance deterioration due to production errors, it is preferable to fix at least one unit during zooming, as already explained with reference to the sixth aspect of the invention.

Throughout the first to sixth aspects of the invention, the objective optical system should preferably comprises a generally positive group comprising at least two positive units and one negative unit.

As already explained in conjunction with the sixth aspect of the invention, the objective optical system must comprise at least three groups. To obtain a generally positive power construction, it is preferable to increase the number of positive units and allocate power thereto, thereby reducing the amount of aberrations produced. In addition, it is required to locate the negative unit, thereby making correction for remaining aberrations by its diverging action. In consideration of correction of aberrations, it is thus preferable to construct the positive at least two positive units and one negative group.

Preferably in this case, the positive units should be all composed of refracting lenses with no reflecting surfaces.

As explained in conjunction with the case wherein the moving group in the aforesaid objective optical system is constructed of a refracting optical system with no reflecting surface, even when a reflecting surface is provided, the element itself is not always reduced in size. For the purpose of compactness, it is thus preferable that the positive group is all composed of refracting lenses with no reflecting surfaces.

When the aforesaid objective optical system comprises a generally positive group comprising at least two positive units and one negative unit, the focal length of the positive group should preferably satisfy the following condition:

$$0.7 < f_W/f_{pos} < 2.5 \quad (11)$$

where $f_W$ is the focal length of the objective optical system at the wide-angle end, and $f_{pos}$ is the focal length of the aforesaid positive group at the wide-angle end.

When the upper limit of 2.5 to this condition is exceeded, the positive power becomes too weak, resulting in an increase in the size of the optical system, when the lower limit of 0.7 is not reached, the positive power becomes too strong, resulting in performance deterioration.

More preferably, condition (11) should be reduced down to $$1.2 < f_W/f_{neg}/2.1 \quad (11\text{-}1)$$

It is also preferable that the positive unit having the strongest positive power among the positive units and the negative unit having the strongest power satisfy the following condition:

$$1.0 < |fP/fN| < 2.0 \quad (12)$$

where fP is the focal length of the positive unit having the strongest positive power among the positive units, and fN is the focal length of the negative unit having the strongest power among the positive units.

When the upper limit of 2.0 to this condition is exceeded, the power of the positive unit becomes too weak to achieve compactness or the negative power becomes too strong resulting in performance deterioration. When the lower limit of 1.0 is not reached, the positive power becomes too strong resulting in performance deterioration or the negative power becomes too weak to make correction for aberrations, for instance, distortion by the converging effect.

More preferably, condition (12) should be reduced down to $$1.2<|fP/fN|<1.8 \tag{12-1}$$

To reduce the performance deterioration due to production errors, it is preferable to fix at least one unit during zooming, as already explained with reference to the sixth aspect of the invention.

Throughout the first to sixth aspects of the invention, the objective optical system should preferably comprise, in order from an object side thereof, a negative first group, a positive second group and a positive third group.

Preferably in this case, the negative first group should be a fixed group.

The objective optical system must have a back focus enough for the location of the image-inverting optical system. Preferably to this end, part of the objective optical system on the object side with respect to the image-inverting optical system should be constructed in such a power profile as to easily obtain that back focus.

When the positive group is located on the object side with respect to the image-inverting optical system, it should preferably be of a retrofocus type or a −+ power profile as viewed from the object side, because the principal point can be shifted toward the intermediate image-formation plane side so that the back focus can be easily obtained. In consideration of performance, on the other hand, the objective optical system should preferably be comprised of at least three groups, as already explained in conjunction with the sixth aspect of the invention.

Thus, the objective optical system comprises, in order from an object side thereof, at least a negative first group, a positive second group and a positive third group. With such an arrangement, the positive power of the retrofocus type can be divided into two, so that the back focus can be obtained and, at the same time, the amount of aberrations produced can be reduced, resulting in the achievement of high performance.

Throughout the first to sixth aspects of the invention, the objective optical system should preferably comprise, in order from an object side thereof, a positive first group, a negative second group and a negative third group.

The case where a negative group is located on the object side with respect to the image-inverting optical system is now explained. Apart from the negative group, the objective optical system must have a positive group located in such a way as to form a real image. For this reason, the negative group must be constructed while its optical relation to the positive group is taken into consideration.

When positive power is located on the pupil side of that negative group, that positive power must be located properly with respect to the position of a virtual image formed at that negative group in such a way as to obtain a high transverse magnification, because the objective optical system otherwise becomes disadvantageously large. In other words, it is required to shift the principal point of the negative group toward the intermediate image-formation side in such a way that the distance from the position of the virtual image formed at the negative group to the position of the principal point of the positive group becomes relatively short.

When the objective optical system has a generally negative power, the principal point may be shifted toward the intermediate image-formation plane side by imparting thereto a +− power profile as viewed from the object side. In consideration of performance, however, the objective optical system should preferably be comprised of at least three groups, as already explained with reference to the sixth aspect of the invention.

Thus, the objective optical system comprises, in order from an object side thereof, at least a positive first group, a negative second group and a negative third group. With such an arrangement, the negative power can be divided into two, so that compactness can be achieved, and the amount of aberrations produced can be reduced resulting in the achievement of high performance.

Throughout the first to sixth aspects of the invention, the objective optical system should preferably comprise, in order from an object side thereof, a negative first group, a positive second group and a negative third group.

Analyses of a three-group lens arrangement in view of aberrations teach that there are some limits on the optimum power profile. One is a +−+ power profile greatly popular for single-focus optical systems, and another is a −+− power profile. When a positive group is used as the first group, on the other hand, the diameter of the lens arrangement becomes too large and is often unfavorable for the achievement of compactness.

Therefore, the objective optical system is comprised of, in order from an object side thereof, at least a negative first group, a positive second group and a negative third group. With the thus constructed objective optical system, it is possible to make satisfactory correction for aberrations and, hence, achieve high performance.

To reduce performance deterioration due to production errors, it is then preferable to fix the negative first group during zooming, as already explained in conjunction with the sixth aspect of the invention.

As already explained in conjunction with the case where the generally generative group comprising at least one positive unit and two negative units is provided in the objective optical system, it is acceptable to make the composite focal length of the first to third groups negative.

Throughout the first to sixth aspects of the invention, the image-inverting optical system located on the pupil side with respect to the intermediate image-formation plane should preferably comprise at least one reflecting surface that has positive power and satisfies the following condition:

$$0.015<|2n\cdot\tan\theta\cdot Ih/r|<1.5 \tag{13}$$

Here r is the radius of curvature of the reflecting surface as measured at a point where an axial chief ray passes, n is the refractive index of a medium on the entrance and exit sides, θ is the angle of reflection, and Ih is a half of the diagonal length of a field stop located near the intermediate image-formation plane.

Giving too strong power to the reflecting surface is not preferable, because decentration aberration remains undercorrected even when a rotationally asymmetric surface is used therefor.

It is thus preferable for at least one reflecting surface of positive power to satisfy condition (13). When the upper limit of 1.5 to this condition is exceeded, the power of the reflecting surface becomes too weak to achieve compactness, etc. according to the invention. When the lower limit of 0.015 is not reached, the power of the reflecting surface becomes too strong to perfectly correct decentration aberration.

More preferably, the reflecting surface should meet the following condition:

$$0.05 < |2n \cdot \tan \theta \cdot Ih/r| < 0.8 \tag{13-1}$$

In the first, second, fifth, and sixth aspect of the invention, it is desired that the image-inverting optical system located on the image side with the intermediate image-formation plane should comprise at least one positive reflecting surface and at least one negative reflecting surface.

The provision of reflecting surfaces of the same sign renders it impossible to make correction for Petzval sum, resulting in a field tilt. When reflecting surfaces having the same converging (or diverging) action are provided, it is difficult to keep them in balance, often resulting in under-correction of aberrations.

When the focal length is reduced as in the third aspect of the invention, the principal point is often shifted too deep in the image-inverting optical system.

It is thus desired that the image-inverting optical system located on the image side with respect to the intermediate image-formation plane should be made up of at least one positive reflecting surface and at least one negative reflecting surface.

In the first, second, third, fifth, and sixth aspect of the invention, two reflecting surfaces should preferably be provided on the image side with respect to the intermediate image-formation plane.

Only one reflection places some limitation on correction of aberrations, and so fails to achieve high performance. Three or more reflections require large space for receiving reflecting surfaces, and so fail to achieve compactness. Two reflections make it possible to make a well-balanced tradeoff between performance and size.

Throughout the first to sixth aspects of the invention, at least one surface in the image-inverting optical system should preferably be defined by a total reflecting surface.

For a real image type finder, reflecting surfaces must be disposed in such a way as to invert an image. When the reflecting surfaces are coated with metals (e.g., Al or Au), however, the resulting reflectivity cannot reach 100% or can be of the order of 85% at most. In general, however, at least four reflections are needed for image inversion. As a result, the transmittance goes down to 52% ($0.85^4 = 0.52$), where an image under observation becomes dark. On the other hand, total reflection ensures a reflectivity of 100% at which there is no quantity-of-light loss.

It is thus preferred that at least one in the image-inverting optical system should be defined by a total reflecting surface, thereby reducing quantity-of-light losses.

Throughout the first to sixth aspects of the invention, the angle of reflection for at least one of the reflecting surfaces should preferably meet the following condition:

$$5° < \theta < 45° \tag{14}$$

Here $\theta$ is the angle of reflection of an axial chief ray.

When power is given to a reflecting surface, it is generally found that as the angle of reflection increases, the amount of decentration aberration produced increases. When the angle of reflection is too small, on the other hand, the reflecting surface is likely to overlap the effective portion of other optical surface, and so it is difficult to build up an optical system. For this reason, it is preferable that the angle of reflection for the surface having the strongest power among the reflecting surfaces should satisfy condition (14), provided that $\theta$ is a smaller angle among the angles that the normal to the surface may make with a light ray. That is, the angle $\theta$ must be 0° to less than 90°.

When the upper limit of 45° to this condition is exceeded, the amount of decentration aberration produced becomes large even when a powered rotationally asymmetric surface is used. When the lower limit of 5° is not reached, the reflecting surface is likely to overlap the effective portion of other optical surface.

More preferably, the following condition should be met:

$$15° < \theta < 30° \tag{14-1}$$

Throughout the first to sixth aspects of the invention, it is also desired that the image-inverting optical system located on the object side with respect to the intermediate image-formation plane be made up of a prism whose entrance refracting surface is defined by a rotationally asymmetric surface.

When the objective optical system is constructed using a rotationally symmetric optical system, it is noted that unless the position of the entrance pupil of an eyepiece optical system is of rotational symmetry, the pupil cannot then be transmitted. In general, since a ray bundle becomes small on the entrance refracting surface side, the position of the entrance pupil can be adjusted without having any influence on other aberrations. Therefore, if the entrance refracting surface is constructed using a rotationally asymmetric surface, it is then possible to make effective correction for the asymmetry of the entrance pupil position.

Throughout the first to sixth aspects of the invention, it is desired that the image-inverting optical system located on the pupil side with respect to the intermediate image-formation plane be made up of a prism whose exit refracting surface is defined by a rotationally asymmetric surface.

With the image-inverting optical system on the eyepiece optical system side, it is generally possible to make better correction for aberrations on the exits refracting surface side, because on that side axial rays have a high height. Therefore, if the entrance refracting surface is defined by a rotationally asymmetric surface, it is then possible to make effective correction for decentration aberration.

Throughout the first, second, third, fifth and sixth aspects of the invention, it is desired that the image-inverting optical system located on the pupil side with respect to the intermediate image-formation plane be made up of a prism whose entrance refracting surface is defined by a surface independent of a reflecting surface.

As already explained in conjunction with the fourth aspect of the invention, the entrance surface of the image-inverting optical system on the eyepiece optical system side requires a field lens of relatively strong power, and so the entrance refracting surface must be defined by a surface independent of a reflecting surface.

Through the first, second, third, fifth and sixth aspects of the invention, it is desired that the image-inverting optical system located on the pupil side with respect to the intermediate image-formation plane be made up of a prism whose exit refracting surface is defined by a surface common to a reflecting surface.

As already explained in conjunction with the fourth aspect of the invention, at the exit surface of the image-inverting optical system on the eyepiece optical system, an ambient ray bundle is larger and the effective range of the surface is wider as compared with the vicinity of the entrance surface.

This is the reason the exit refracting surface should preferably be defined by a surface common to the reflecting surface.

Throughout the first to sixth aspects of the invention, it is desired that the eyepiece optical system be composed solely of a prism having positive reflecting surfaces, at least one of which is defined by a rotationally asymmetric surface.

When the focal length of the eyepiece optical system is reduced by giving power to the reflecting surface of the image-inverting optical system, the principal point is shifted into the image-inverting optical system. When an optical system is located on the pupil side of that principal point, the distance between the principal point and the exit surface becomes long and so it is difficult to ensure the eye point. It is thus desired that the eyepiece optical system be composed solely of a prism having positive reflecting surfaces, at least one of which is defined by a rotationally asymmetric surface.

Throughout the first to sixth aspects of the invention, the image-inverting optical system should preferably comprise a roof surface with a total of six reflections.

When the image-inverting optical system has too many reflections, quantity-of-light losses due to the reflecting surfaces increase. On the other hand, too little reflections render it difficult to meet two such conditions as explained in conjunction with the PROBLEM TO BE SOLVED BY THE INVENTION. Since giving power to the reflecting surface causes the magnitude of the angle of reflection to have influences on performance, the reflecting surfaces should be properly provided. On the other hand, the roof surface is effective for compactness, because its own volume is worthy of two reflections. Thus, the total number of reflections in the image-inverting optical system is set at six, two of which are allocated to the roof surface. With such an arrangement, it is possible to achieve compactness and high performance at the same time.

Throughout the first to sixth aspects of the invention, it is desired that the position of the entrance pupil of the eyepiece optical system be corrected in a rotationally symmetric manner.

A real image type finder is designed such that an aerial image formed by an objective optical system is observed through an eyepiece optical system. To guide this aerial image to the eyepiece optical system, the exit pupil of the objective optical system must be joined to the entrance pupil of the eyepiece optical system while their positions are in perfect agreement with each other, quite unlike a finder for single-lens reflex cameras where an image formed on a diffusing plate is observed through an eyepiece optical system or an eyepiece optical system for use with image displays such as LEDs (these optical systems are not for observing an aerial image, and so this condition is not any absolute one). In the finder optical system of the invention, too, this must be taken into account.

Here consider the case where the objective optical system is constructed using a rotationally symmetric optical system. When the entrance pupil of the eyepiece optical system is still at an asymmetric position, the pupils of both optical systems cannot be joined to each other. This means that a part of the image cannot be observed due to shading. Accordingly, it is preferable that the position of the entrance pupil of the eyepiece optical system be corrected in a rotationally symmetric manner.

Throughout the first to sixth aspects of the invention, it is desired that an axial chief ray incident on the objective optical system be parallel, or nearly parallel, with an axial chief ray emerging from the eyepiece optical system.

Preferably in this case, the angle that the incident axial chief ray makes with the emerging axial chief ray should satisfy the following condition:

$$0° \leq \phi < 20° \tag{15}$$

Here $\phi$ is the angle that the incident axial chief ray makes with the emerging axial chief ray.

For a real image type finder except a special case such as a waist-level finder, it is desired that the direction of incidence of light rays be parallel with the direction of emergence of light rays, as already explained in conjunction with the PROBLEM TO BE SOLVED BY THE INVENTION. In the case of a finder for use with compact cameras or the like, however, the taking range is slightly different from the viewing range, because it is provided separately from a taking optical system. To correct this, it is acceptable to tilt the direction of incidence of light on the finder. In this case, the direction of incidence on and emergence from the finder is slightly off parallel. Condition (15) should be satisfied to this end.

When the upper limit of 20° to this condition is exceeded, the taking range deviates too largely from the viewing range. At the lower limit of 0°, the incident axial chief ray is kept parallel with the emerging axial chief ray.

More preferably, the following condition should be satisfied:

$$0° \leq \phi < 10° \tag{15-1}$$

Throughout the first to sixth aspects of the invention, it is desired that the angle that an axial chief ray incident on the objective optical system makes with an axial chief ray incident on the intermediate image-formation plane satisfy the following conditions:

$$15° < \alpha < 75°, \ 105° < \alpha \leq 180° \tag{16}$$

Here $\alpha$ is the angle that an axial chief ray incident on the objective optical system makes with an axial chief ray incident on the intermediate image-formation plane.

If the location of the intermediate image-formation plane is taken into consideration, it is then possible to achieve compactness effectively. When the direction of the axis of light incident on the intermediate image-formation plane is the same as, and parallel with, that of the entrance optical axis, the whole optical system size becomes large in the direction of the entrance optical axis direction (the thickness direction of a camera), because the eyepiece optical system is joined to the pupil side of the objective optical system. On the other hand, when the direction of the axis of light incident on the intermediate image-formation plane is vertical to that of the entrance optical axis, the whole optical system size is less likely to become large in the thickness direction even when the eyepiece optical system is joined to the objective optical system, but becomes large in the direction vertical thereto. Thus, unless the intermediate image-formation plane is properly positioned, the whole optical system size becomes large in one direction no matter what measure is taken and so cannot be optimized. It is then preferable to tilt the intermediate image-formation plane with respect to the entrance optical axis or in the opposite direction with respect to the entrance optical axis, thereby placing it in a well-balanced state. To this end, it is preferable to meet condition (16). It is noted that a should be a smaller angle among the angles made by the respective axial chief rays. In other words, the possible range for a is in the range of 0° to 180°, in which 0° indicates that the respective optical axes are in the same and parallel directions and 180° indicates that the respective optical axes are in the parallel yet opposite directions.

More preferably, the following conditions should be satisfied:

$$30° < \alpha < 60°, \ 120° < \alpha \leq 180° \quad (16\text{-}1)$$

Throughout the first to sixth aspects of the invention, it is desired for the focal length of the eyepiece optical system to meet the following condition:

$$9 \text{ mm} < f_{OC} < 19 \text{ mm} \quad (17)$$

Here $f_{OC}$ is the focal length of the eyepiece optical system.

Why the focal length of the eyepiece optical system is reduced has been explained. As mentioned just above, it is preferable for the focal length of the eyepiece optical system to meet condition (17). It is noted that in some cases, the use of a rotationally asymmetric surface renders it impossible to provide any strict definition of focal length. For this reason, the focal length f used herein is defined by $$f = h/\alpha$$

Here h is the minuscule height of a ray that is parallel with an axial chief ray and entered into an optical system from its object side, and $\alpha$ is the angle (in radian) of a ray that emerges from the optical system and makes with the axial chief ray.

When the upper limit of 19 mm to this condition is exceeded, the focal length of the eyepiece optical system becomes too long for the full-achievement of the objects of the invention, and when the lower limit of 9 mm is not reached, the power becomes too strong to ensure any high performance.

More preferably, the following condition should be satisfied:

$$12 \text{ mm} < f_{OC} < 17 \text{ mm} \quad (17\text{-}1)$$

Throughout the first to sixth aspects of the invention, it is desired that an image should be formed through only one image-formation action of the objective optical system.

Available for image inversion is a relay optical system wherein an image inverted by image formation is again formed and then inverted. However, this requires two image-formation cycles, which unavoidably lead to an increased optical path. Provision of reflecting surfaces as typified by a prism wherein an optical path is turned back makes it possible to achieve compactness to a certain degree, but there is some limitation on volume reductions. Thus, one image-formation action is desired.

Throughout the first to sixth aspects of the invention, diopter may be controlled by moving a prism located on the pupil side with respect to the intermediate image-formation plane.

Throughout the first to sixth aspects of the invention, diopter may also be controlled by moving a refracting lens located on the pupil side with respect to the intermediate image-formation plane.

Throughout the first to sixth aspects of the invention, diopter may further be controlled by moving a refracting lens located on the object side with respect to the intermediate image-formation plane.

The real image type finder of the invention may be provided with a diopter control mechanism. For effective diopter control at the eyepiece optical system, it is preferable to move the image-inverting optical system located on the pupil side with respect to the intermediate image-formation plane, because main power is given thereto and the amount of movement is reduced. In view of performance, a prism integrated with the reflecting surfaces of the image-inverting optical system is more advantageous because of no decentration of the reflecting surfaces due to movement.

Alternatively, diopter may be controlled by movement of a refracting lens located on the eyepiece optical system side. It is noted that the refractive lens may be of either the co-axial type or the decentration optical type. Still alternatively, diopter may be controlled on the objective optical system side. In this case, it is acceptable to make correction for diopter by movement of a refracting lens located on the object side with respect to the intermediate image-formation plane, and to move one or two or more refracting lenses at the same time. Moreover, it is acceptable to move the groups fixed or movable during zooming for the purpose of diopter control.

Throughout the first to sixth aspects of the invention, it is preferable for the spacing from the exit surface of the objective optical system to the intermediate image-formation plane or the spacing from the intermediate image-formation plane to the entrance surface of the eyepiece optical system to satisfy the following condition:

$$2 < (d \cdot 1000)/f_{OC}^2 < 50 \quad (18)$$

where $f_{OC}$ is the focal length of the eyepiece optical system, and d is a distance as measured along an axial chief ray from the exit surface of the objective optical system to the intermediate image-formation plane or from the intermediate image-formation plane to the entrance surface of the eyepiece optical system with the proviso that 1000 must be 1,000 mm.

In the invention, the focal length of the eyepiece optical system is reduced to increase the scaling factor, and so dust or the like present near the intermediate image-formation plane can possibly come in sight on an enlarged scale. It is thus preferable to make it difficult for dust deposited on the exit optical surface on the objective optical system side or the entrance optical surface on the eyepiece optical system to come in sight due to a large diopter shifting. It is thus preferable to meet condition (18). When the upper limit of 50 to this condition is exceeded, the whole optical system size becomes large, and when the lower limit of 2 is not reached, dust is likely to come in sight.

More preferably, the following condition should be satisfied:

$$3 < (d \cdot 1000)/f_{OC}^2 < 25 \quad (18\text{-}1)$$

Throughout the second to sixth aspects of the invention, it is preferable to satisfy the following condition:

$$1.25 < d_{EP}/f_{OC} < 2.0 \quad (1)$$

where $d_{EP}$ is a distance measured along an axial chief ray from the final surface to the eye point of the eyepiece optical system, and $f_{OC}$ is the focal length of the eyepiece optical system.

Throughout the second to sixth aspects of the invention, too, it is preferable to satisfy condition (1), as explained in conjunction with the first aspect of the invention. It is noted that in some cases, the use of a rotationally asymmetric surface renders it impossible to provide any strict definition of focal length. For this reason, the focal length f used herein is defined by $$f = h/\alpha$$

Here h is the minute height of a ray that is parallel with an axial chief ray and entered into an optical system from its object side, and $\alpha$ is the angle (in radian) of a ray that emerges from the optical system and makes with the axial chief ray.

When the upper limit of 2.0 to this condition is exceeded, optical performance deteriorates, and when the lower limit of 1.25 is not reached, the eye point becomes too short for observation. More preferably, the following condition should be satisfied:

$$1.35 < d_{EP}/f_{OC} < 1.8 \quad (1\text{-}1)$$

Throughout the second to sixth aspects of the invention, it is preferable to satisfy the following condition:

$$0.5 < l_{OC}/f_{OC} < 1.3 \quad (2)$$

Here $l_{OC}$ is the length as calculated on an air basis and along an axial chief ray from the intermediate image-formation plane to the final surface of the eyepiece optical system, and $f_{OC}$ is the focal length of the eyepiece optical system.

Throughout the second to sixth aspects of the invention, too, it is preferable to satisfy condition (2). Exceeding the upper limit of 1.3 to causes a deterioration in optical performance, and falling below the lower limit of 0.5 renders it impossible for the eyepiece optical system to ensure the necessary number of reflections with the result that excessive loads are imposed on designing the objective optical system.

More preferably, it is preferable to meet the following condition:

$$0.6 < l_{OC}/f_{OC} < 1.2 \quad (2\text{-}1)$$

Throughout the first and third to sixth aspects of the invention, it is preferable to satisfy the following condition:

$$0.1 < Ih/f_{OC} < 0.7 \quad (19)$$

Here Ih is a half of the diagonal length of the field stop located near the intermediate image-formation plane, and $f_{OC}$ is the focal length of the eyepiece optical system.

Throughout the first and third to sixth aspects of the invention, too, the finder must have a proper angle of field so as to be usable as a camera finder. It is thus preferable to meet condition (19). It is noted that in some cases, the use of a rotationally asymmetric surface renders it impossible to provide any strict definition of focal length. For this reason, the focal length f used herein is defined by $$f = h/\alpha$$

Here h is the minute height of a ray that is parallel with an axial chief ray and entered into an optical system from its object side, and $\alpha$ is the angle (in radian) of a ray that emerges from the optical system and makes with the axial chief ray.

When the upper limit of 0.7 to this condition is exceeded, the optical system size becomes large and when the lower limit of 0.1 is not reached, the field screen becomes too short for observation.

More preferably, the following condition should be satisfied:

$$0.15 < Ih/f_{OC} < 1.0 \quad (19\text{-}1)$$

Throughout the second to sixth aspects of the invention, it is preferable to meet the following condition:

$$0.25 < Ih/f_{OC} < 1.0 \quad (4)$$

Here Ih is a half of the diagonal length of the field stop located near the intermediate image-formation plane, and $f_{OC}$ is the focal length of the eyepiece optical system.

Throughout the first and third to sixth aspects of the invention, too, it is preferable to satisfy condition (4) as already explained in conjunction with the second aspect of the invention. It is noted that in some cases, the use of a rotationally asymmetric surface renders it impossible to provide any strict definition of focal length. For this reason, the focal length f used herein is defined by $$f = h/\alpha$$

Here h is the minute height of a ray that is parallel with an axial chief ray and entered into an optical system from its object side, and $\alpha$ is the angle (in radian) of a ray that emerges from the optical system and makes with the axial chief ray.

When the upper limit of 1.0 to this condition is exceeded, a wide field of view may be obtained but it is impossible to ensure performance as far as the periphery of the screen, and when the lower limit 0.25 is not reached, the viewing screen size becomes too small to achieve any wide field of view.

More preferably in this respect, the following condition should be satisfied:

$$0.27 < Ih/f_{OC} < 0.75 \quad (4\text{-}2)$$

Throughout the third to sixth aspects of the invention, it is preferable to satisfy the following condition (3):

$$0.2 < f_W/f_{OC} < 1.0 \quad (3)$$

Here $f_W$ is the focal length of the objective optical system at the wide-angle end, and $f_{OC}$ is the focal length of the eyepiece optical system.

For the third to sixth aspects of the invention, too, the finder must have a proper finder magnification so as to be used as a camera finder, as already explained with reference to the "PRIOR ART" and "PROBLEM TO BE SOLVED BY THE INVENTION". To this end it is preferable to meet condition (3). When the upper limit of 1.0 to condition (3) is exceeded, the optical system size becomes large, and when the lower limit of 0.2 is not reached, the field of view becomes too narrow for observation.

More preferably in this respect, the following condition should be satisfied:

$$0.3 < f_W/f_{OC} < 0.7 \quad (3\text{-}1)$$

Throughout the third to sixth aspects of the invention, it is preferable to satisfy the following condition:

$$0.3 < f_W/f_{OC} < 1.2 \quad (5)$$

Here $f_W$ is the focal length of the objective optical system at the wide-angle end, and $f_{OC}$ is the focal length of the eyepiece optical system.

For the third to sixth aspects of the invention, too, it is preferable to satisfy condition (5) so as to make the field of view wide, as already explained in conjunction with the second aspect of the invention. When the upper limit of 1.2 to this condition is exceeded, the intermediate image size becomes too large, resulting in an increase in the optical system size, and when the lower limit of 0.3 is not reached, it is impossible to achieve any wide field of view.

More preferably in this case, the following condition should be satisfied:

$$0.45 < f_W/f_{OC} < 1.0 \quad (5\text{-}1)$$

It is preferable to use a prism for the eyepiece optical system in the real image type zoom finder and configure the prism in conformity with the range of transmission of a ray bundle in the long-side and short-side directions of the field stop. To reduce the size of the eyepiece optical system while ensuring the quantity of light all over the field of view, the prism should preferably be configured in such a way that the maximum value of the length of an optical surface in the direction vertical to only one symmetric surface in the whole prism is smaller than the length of a chord of a crossing line of an optical surface intersecting that symmetric surface.

Alternatively, it is preferable to use a prism for the eyepiece optical system in the real image type zoom finder irrespective of the presence or absence of a symmetric surface. Preferably in this case, the prism should be configured in such a way that, as shown in FIG. 33, the maximum value Ex of the length of an optical surface S in the direction vertical to a reference plane P is smaller than the length of a chord of a crossing line of the optical surface S intersecting the reference plane P. Here the reference plane P is defined by a plane including a chief ray L1 incident on the optical surface S of the prism (i.e., a light ray passing through the center of an exit pupil and the center of a field stop) and a chief ray L2 passing through the optical system S (i.e., that shown as reflected in FIG. 33).

More specifically, it is preferable that the eyepiece optical system comprises a prism, the first transmitting surface of which satisfies the following condition:

$$0.3 < Ex1/Ey1 < 1 \tag{20}$$

Here Ex1 is the maximum value of the length of the first transmitting surface in the direction vertical to the reference plane, and Ey1 is the length of a chord of a line where the first transmitting surface intersects the reference plane with the proviso that the reference plane is defined by a plane including a chief ray incident on the first transmitting surface and a chief ray emerging from the first transmitting surface.

More preferably in this case, the following condition should be satisfied:

$$0.5 < Ex1/Ey1 < 0.9 \tag{20-1}$$

Alternatively, the eyepiece optical system should comprise a prism, the first reflecting surface of which satisfies the following condition:

$$0.3 < Ex2/Ey2 < 1 \tag{21}$$

Here Ex2 is the maximum value of the length of the first reflecting surface in the direction vertical to the reference plane, and Ey2 is the length of a chord of a line where the first reflecting surface intersects the reference plane with the proviso that the reference plane is defined by a plane including a chief ray incident on the first reflecting surface and a chief ray emerging from the first reflecting surface.

More preferably in this case, the following condition should be satisfied:

$$0.5 < Ex2/Ey2 < 0.9 \tag{21-1}$$

Still alternatively, the eyepiece optical system should comprise a prism, the second transmitting surface of which satisfies the following condition:

$$0.1 < Ex3/Ey3 < 0.8 \tag{22}$$

Here Ex3 is the maximum value of the length of the second transmitting surface in the direction vertical to the reference plane, and Ey3 is the length of a chord of a line where the second transmitting surface intersects the reference plane with the proviso that the reference plane is defined by a plane including a chief ray incident on the first reflecting surface and a chief ray emerging from the second transmitting surface.

More preferably in this case, the following condition should be satisfied:

$$0.3 < Ex3/Ey3 < 0.7 \tag{22-1}$$

When the real image type zoom finder of the invention is used for finders of cameras using films or electronic image pickup devices, some limitation should preferably be imposed on the size itself of the prism used for the eyepiece optical system, thereby achieving reductions in the whole size of the camera and satisfactory observation (an eye relief or an angle of view) in a well-balanced state.

More specifically, the eyepiece optical system should preferably comprise a prism, the first transmitting surface of which satisfies:

$$1 \text{ mm} < Ex1 < 15 \text{ mm} \tag{23}$$

More preferably, $$2 \text{ mm} < Ex1 < 10 \text{ mm} \tag{23-1}$$

Even more preferably, $$2.5 \text{ mm} < Ex1 < 6.5 \text{ mm} \tag{23-2}$$

The eyepiece optical system should also preferably comprise a prism, the first transmitting surface of which satisfies:

$$1 \text{ mm} < Ey1 < 30 \text{ mm} \tag{24}$$

More preferably, $$3 \text{ mm} < Ey1 < 15 \text{ mm} \tag{24-1}$$

Even more preferably, $$4 \text{ mm} < Ey1 < 9 \text{ mm} \tag{24-2}$$

Further, the eyepiece optical system should preferably comprise a prism, the first reflecting surface of which satisfies:

$$2 \text{ mm} < Ex2 < 25 \text{ mm} \tag{25}$$

More preferably, $$5 \text{ mm} < Ex2 < 15 \text{ mm} \tag{25-1}$$

Even more preferably, $$7 \text{ mm} < Ex2 < 12 \text{ mm} \tag{25-2}$$

Further, the eyepiece optical system should preferably comprise a prism, the first reflecting surface of which satisfies:

$$2 \text{ mm} < Ey2 < 30 \text{ mm} \tag{26}$$

More preferably, $$7 \text{ mm} < Ey2 < 25 \text{ mm} \tag{26-1}$$

Even more preferably, $$9 \text{ mm} < Ey2 < 17 \text{ mm} \tag{26-2}$$

Further, the eyepiece optical system should preferably comprise a prism, the second transmitting surface of which satisfies:

$$2\ mm<Ex3<25\ mm \quad (27)$$

More preferably, $$5\ mm<Ex3<15\ mm \quad (27\text{-}1)$$

Even more preferably, $$6\ mm<Ex3<10\ mm \quad (27\text{-}2)$$

Further, the eyepiece optical system should preferably comprise a prism, the second transmitting surface of which satisfies:

$$5\ mm<Ey3<40\ mm \quad (28)$$

More preferably, $$10\ mm<Ey3<30\ mm \quad (28\text{-}1)$$

Even more preferably, $$13\ mm<Ey3<20\ mm \quad (28\text{-}2)$$

Furthermore, the prism used in the eyepiece optical system should preferably be defined by a plane symmetric prism, the symmetric surface of which is configured in such a way as to conform to the aforesaid reference plane, so that aberrations can be easily corrected on account of their symmetry with respect to the symmetric surface. This is also favorable in view of production.

It is noted that the use of rotationally asymmetric reflecting or refracting surfaces in the eyepiece optical system gives rise to rotationally asymmetric distortion. To make correction for distortion due to decentration, it is preferable to use as many decentration optical surfaces as possible. However, the use of too many reflecting surfaces is not preferable for the eyepiece optical system in the real image type finder, because the eye point becomes too long.

Preferably in such a real image type finder as contemplated herein, the eyepiece optical system comprises positive reflecting surfaces which are each defined by a rotationally asymmetric surface and at least one of which is a symmetric surface. The whole eyepiece optical system is configured in such a way as to be plane symmetric with respect to that symmetric surface. A field stop located near the intermediate image-formation formed by the objective optical system is configured in such a way as to be symmetric with respect to that symmetric surface alone and have a transmitting portion configured in such a way as to reduce rotationally asymmetric distortion produced through the eyepiece optical system.

When the eyepiece optical system is constructed using a few (e.g., three or less) decentration optical surfaces, rotationally asymmetric distortion often occurs. Even so, it is possible to observe an image with no annoying distortion at boundaries around the field of view, because the field frame near the intermediate image makes such distortion unobtrusive.

It is appreciated that the present invention includes an image pickup system comprising such a real image type zoom finder separately from an phototaking optical system, wherein an axial chief ray nearly parallel with an axial chief ray incident on the phototaking optical system is entered into the real image type zoom finder.

To accomplish the third object of the invention, there is provided a real image type zoom finder comprising, in order from an object side thereof, a positive objective optical system and a positive eyepiece optical system and further including an image-inverting means comprising a plurality of reflecting surfaces for erecting a real image formed by the objective optical system, wherein:

said objective optical system comprises a plurality of moving lens groups and one prism acting as an image-inverting means, said one prism comprises, in ray propagation order from an object side thereof, an entrance surface, a first reflecting surface, a second reflecting surface, a third reflecting surface and an exit surface wherein any of said first reflecting surface, second reflecting surface and third reflecting surface is defined by a roof surface provided that when an axial chief ray is projected onto a plane defined by three points on an axial chief ray at said entrance surface, said first reflecting surface and said second reflecting surface, said axial chief ray takes an optical path which, on the basis of the direction of propagation of a light ray, turns in the same direction at the first and second reflecting surfaces and turns in a direction different from said direction at the third reflecting surface.

First of all, the optical path is defined. When an optical path is turned back by a plurality of reflecting surfaces, it is not always found on the same two-dimensional plane; sometimes, it takes a three-dimensional form that does not lie on the same plane. Thus, the prism used herein, too, often has a three-dimensional optical path. Hereinafter, the optical path is thus defined on a two-dimensional basis capable of including a three-dimensional optical path.

In other words, the optical path is defined by an axial chief ray projected onto a reference plane defined by three points on an axial chief ray on the entrance surface, first reflecting surface and second reflecting surface as viewed in ray propagation order from the object side. This definition allows even a three-dimensional optical path to be included in the invention.

With the thus defined optical path arrangement, the optical path is turned in the same direction at the first and second reflecting surfaces to make use of a part of the image-inverting function and turn back the optical path, whereby the thickness of the finder is reduced. Then, the optical path is turned in a direction different from this direction, so that it can be guided off the objective optical path, thereby lifting up restrictions on the location of the eyepiece optical system. In addition, the first to third reflection surfaces can be integrated in a prism form, so that the finder can be easily assembled.

If a field stop defining the range of the field of view is located just after the exit surface of the aforesaid prism, it is then possible to reduce light rays that, albeit being unnecessary for observation, are guided to the eyeball.

Here it is preferable that the angle that the direction of incidence of an axial chief ray on the first reflecting surface makes with the direction of incident of an axial chief ray on the third reflecting surface is larger than a right angle and the angle that the direction of incidence of an axial chief ray on the first reflecting surface makes with the direction of incidence of an axial chief ray on the exit surface is smaller than a right angle.

This makes it possible to reduce a size increase of the finder in its transverse direction, i.e., in the transverse direction of a camera while reducing an increase in the thickness of the turned-back optical path.

It is also preferable that the aforesaid second reflecting surface and the exit surface are defined by the same surface.

In order to make the aforesaid angle that the direction of incidence of the axial chief ray on the first reflecting surface makes with the direction of incidence of the axial chief ray on the exit surface smaller than a right angle, the second reflecting surface and exit surface can be defined by the same surface. It is thus possible to lift up restrictions on the location of the optical path.

It is further preferable to define the aforesaid entrance surface by a curved surface.

It is thus possible to allocate a lens to the entrance surface of the prism, thereby imparting higher performance to the finder.

Preferably, the image-inverting optical system located on the eyepiece optical system side should comprise one prism, wherein:

said one prism comprises, in ray propagation order from an object side thereof, an entrance surface, a first reflecting surface, a second reflecting surface, and an exit surface provided that when an axial chief ray is projected onto a plane defined by three points on an axial chief ray at said entrance surface, said first reflecting surface and said second reflecting surface, said axial chief ray takes an optical path which, on the basis of the direction of propagation of a light ray, turns in different directions at the first and second reflecting surfaces, and the second reflecting surface and exit surface are defined by the same surface.

It is thus possible to reduce the thickness of the finder and, hence, achieve compactness.

Still other objects and advantages of the invention in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
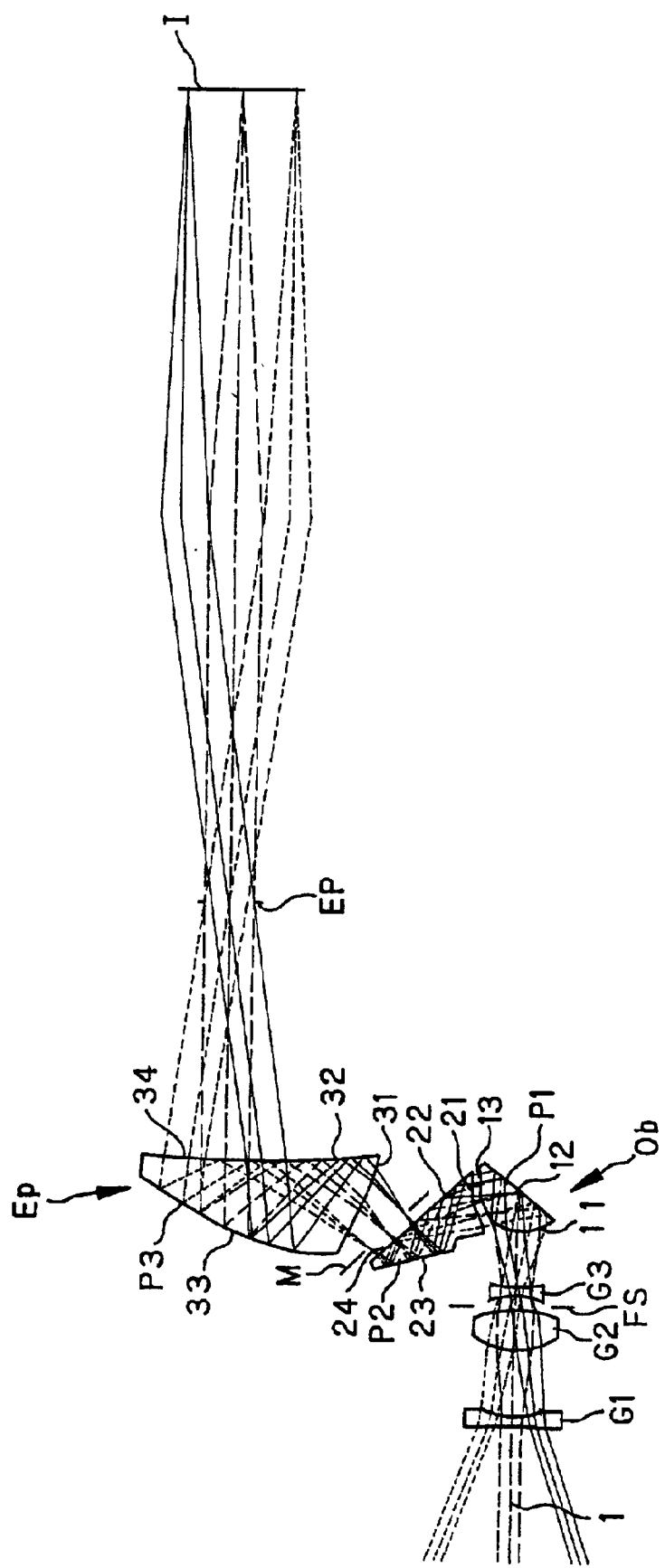
FIG. 1 is a Y-Z sectional view at the wide-angle end of the real image type zoom finder according to Example 1 of the invention.

Given below are Numerical Examples 1 to 4 of the real image type zoom finder according to the invention. The constituting parameters for each example will be given later.

As can be seen from the numerical data given later, specific surfaces in the optical system (surface No. 8 and surface No. 15 (Example 1), surface No. 7 and surface No. 15 (Example 2), surface No. 7 and surface No. 13 (Example 3), and surface No. 9 and surface No. 15 (Example 4)) are used as reference surfaces (designated 1 and 2, respectively. The origins of the decentration optical systems subsequent to that optical system are defined by the centers of these reference surfaces. It is here noted that the center of a surface is defined by a position where an axial chief ray leaving an object center (not shown) and passing through the center of a stop crosses that surface.

Regarding the coordinate system determined with respect to these origins, assume that the Z-axis direction is defined by a direction along an axial chief ray, the Y-Z plane is defined by a plane where the axial chief ray is turned back, and the X axis is defined in a direction perpendicular to the Z axis within the Y-Z plane. The positive direction of the Z axis is given by the direction along the axial chief ray, the positive direction of the X axis is given by the direction from the front to the back of the paper for FIGS. 1 to 3 and FIGS. 5 to 13, and the positive Y axis direction is given by an axis that forms with the X and Z axes a right-handed orthogonal coordinate system.

In Examples 1 to 4, each surface is decentered within the aforesaid Y-Z plane, and only one symmetric surface for each rotationally asymmetric surface is given by the Y-Z plane.

Given for a decentered surface are the amount of decentration of the apex of that surface from the center of the origin of the thus determined coordinate system (x, y and z in the X, Y and Z-axis directions) and the angles ($\alpha$, $\beta$, $\gamma$) of tilt of the center axis (the Z axis in the following formula (A) for a free-form surface and the Z axis in the following formula (D) for an aspheric surface) with respect to the X axis, the Y axis, and the Z axis, respectively. It is here noted that the positive $\alpha$ and $\beta$ mean counterclockwise rotation with respect to the positive directions of the respective axes, and the positive $\gamma$ means clockwise rotation with respect to the positive direction of the Z axis.

Regarding the optical action surfaces forming the optical system of each example, when a specific surface and the subsequent surface forms a coaxial optical system, a spacing is given. Besides, the refractive indices of media and Abbe's numbers are given as usual.

The shape of the free-form surface used herein is defined by the following formula (A), and so the axis of the free-form surface is given by the Z axis for that defining formula.

$$Z = C_2 X + C_3 Y + C_4 X^2 + C_5 XY + C_6$$
$$Y^2 + C_7 X^3 + C_8 X^2 Y + C_9 XY^2$$
$$+ C_{10} Y^3 + C_{11} X^4 + C_{12} X^3 Y + C_{13}$$
$$X^2 Y^2 + C_{14} XY^3 + C_{15} Y^4$$
$$+ C_{16} X^5 + C_{17} X^4 Y + C_{18} X^3 Y^2$$
$$+ C_{19} X^2 Y^3 + C_{20} XY^4 + C_{21} Y^5$$
$$+ C_{22} X^6 + C_{23} X^5 Y + C_{24} X^4 Y^2$$
$$+ C_{25} X^3 Y^3 + C_{26} X^2 Y^4 + C_{27}$$
$$XY^5 + C_{28} Y^6 + C_{29} X^7 + C_{30} X^6$$
$$Y + C_{31} X^5 Y^2 + C_{32} X^4 Y^3 + C_{33} X^3$$
$$Y^4 + C_{34} X^2 Y^5 + C_{35} XY^6 + C_{36} Y^7 \tag{A}$$

Here $C_j$ (j is an integer of 2 or greater) is a coefficient.

In general, the aforesaid free-form surface has no symmetric surface at both the X-Z plane and the Y-Z plane. However, by reducing all the odd-numbered terms for X to zero, that free-form surface can have only one symmetric surface parallel with the Y-Z plane. For instance, this may be achieved by reducing to zero the coefficients for the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . .

By reducing all the odd-numbered terms for Y to zero, the free-form surface can have only one symmetric surface parallel with the X-Z plane. For instance, this may be achieved by reducing to zero the coefficients for the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . .

Among the defining formulas for other free-form surface, there is Zernike polynomial given by the following formula (B). The shape of this surface is given by the following formula. The axis for Zernike polynomial is given by the Z axis for the defining formula. The rotationally asymmetric surface is defined by polar coordinates for the height of the Z axis with respect to the X-Y plane provided that R is the distance from the Z axis within the X-Y plane and A is the azimuth angle round the Z axis, as expressed by the angle of rotation measured from the X-axis.

$$x = R \times \cos(A)$$
$$y = R \times \sin(A)$$
$$Z = D_2 + D_3 R\cos(A) + D_4 R$$
$$\sin(A) + D_5 R^2 \cos(2A) + D_6$$
$$(R^2 - 1) + D_7 R^2$$
$$\sin(2A) + D_8 R^3 \cos(3A) + D_9$$
$$(3R^3 - 2R) \cos(A) + D_{10}$$
$$(3R^3 - 2R) \sin(A) + D_{11} R^3$$
$$\sin(3A) + D_{12} R^4 \cos(4A) + D_{13}$$
$$(4R^4 - 3R^2) \cos(2A) + D_{14}$$
$$(6R^4 - 6R^2 + 1) + D_{15}$$
$$(4R^4 - 3R^2) \sin(2A) + D_{16} R^4$$
$$\sin(4A) + D_{17} R^5 \cos(5A) + D_{18}$$
$$(5R^5 - 4R^3) \cos(3A) + D_{19}$$
$$(10R^5 - 12R^3 + 3R) \cos(A) + D_{20}$$
$$(10R^5 - 12R^3 + 3R) \sin(A) + D_{21}$$
$$(5R^5 - 4R^3) \sin(3A) + D_{22} R^5$$
$$\sin(5A) + D_{23} R^6 \cos(6A) + D_{24}$$
$$(6R^6 - 5R^4) \cos(4A) + D_{25}$$
$$(15R^6 - 20R^4 + 6R^2)$$
$$\cos(2A) + D_{26}(20R^6 - 30R^4 + 12R^2 - 1)$$

$+D_{27}(15R^6-20R^4+6R^2)$ $\sin(2A)+D_{28}(6R^6-5R^4)\sin$ $(4A)+D_{29}R^6\sin(6A)$ (B)

It is noted that when this free-form surface is designed in the form of an optical system symmetric in the X-axis direction, $D_4$, $D_5$, $D_6$, $D_{10}$, $D_{11}$, $D_{12}$, $D_{13}$, $D_{14}$, $D_{20}$, $D_{21}$, $D_{22}$, . . . are used.

Among other defining formula for the free-form surface, there is the following one (C):

$Z=\Sigma\Sigma C_{nm}XY$

When expanded with respect to k=7 (the seventh term) as an example, this may be expressed by the following formula:

$Z=C_2+C_3Y+C_4|X|$ $+C_5Y^2+C_6Y|X|+C_7X^2+$ $C_8Y^3+C_9Y^2|X|+C_{10}YX^2+$ $C_{11}|X^3|+C_{12}Y^4+C_{13}Y^3|$ $X|+C_{14}Y^2X^2+C_{15}Y|X^3|+$ $C_{16}X^4+C_{17}Y^5+C_{18}Y^4|X|$ $+C_{19}Y^3X^2+C_{20}Y^2|X^3|$ $+C_{21}YX^4+C_{22}|X^5|+C_{23}Y^6$ $+C_{24}Y^5|X|+C_{25}Y^4X^2+C_{26}$ $Y^3|X^3|+C_{27}Y^2X^4+C_{28}Y|$ $X^5|+C_{29}X^6+C_{30}Y^7+C_{31}$ $Y^6|X|+C_{32}Y^5X^2+C_{33}Y^4$ $|X^3|+C_{34}Y^3X^4+C_{35}Y^2$ $|X^5|+C_{36}YX^6+C_{37}|X^7|$ (C)

While the shapes of the surfaces used in the examples of the invention are expressed by the free-form surfaces using the formula (A), it is understood that similar actions and effects are obtainable even by use of the aforesaid formulas (B) and (C). While the surfaces are symmetric with respect to the X direction alone in Examples 1 to 4, it is understood that they are asymmetric in the X direction. While the apexes of the respective surfaces are provided on the same plane (Y-Z plane), it is understood that they may be located away from that plane.

The aspheric surface used herein is a rotationally asymmetric surface given by the following defining formula:

$Z=(y^2/R)/[1+\{1-(1+K)y^2/R^2\}^{1/2}]+Ay^4+By^6+Cy^8+Dy^{10}+$ (D)

Here Z is the optical axis (axial chief ray) that is positive in the direction of propagation of light, y is the direction vertical to the optical axis, R is a paraxial radius of curvature, K is a conical coefficient, and A, B, C, D, . . . are the fourth, sixth, eighth and tenth aspheric coefficients.

It is here noted that the term with respect to aspheric surfaces about which no data are given is zero. For the index of refraction, d-line (of 587.56 nm wavelength) refractive indices are given. Length is given in mm.

Throughout Examples 1 to 4, virtual images are formed at a position $-0.5$ m$^{-1}$ away from the pupil plane (2,000 nm on the object side). In consideration of lens data, however, assume an image-formation system wherein an ideal lens having a focal length of 31.62 mm is positioned at a point 31.62 mm ($=\sqrt{1,000}$ mm) away from the pupil plane.

Throughout the examples, the prisms and refracting lenses are all formed of plastic materials; however, it is understood that they may be formed of glass materials. Especially when the plastic materials are used, it is preferable to use materials of low hygroscopicity because performance deterioration due to environmental changes can be mitigated. For instance, Zeonex made by Nippon Zeon Co., Ltd. or the like may be used.

Of the refracting lenses used in the objective and eyepiece optical systems, spherical surfaces may be replaced by rotationally symmetric aspheric surfaces. Likewise, spherical or aspheric surfaces may be replaced by rotationally asymmetric free-form surfaces.

To cut off flare rays, it is acceptable to locate flare stops before the entrance surface of the prism, after the exit surface of the prism, and before or after the moving and fixed lens groups. The flare rays may be cut off by use of a frame or another member.

The focal length in the case of using rotationally asymmetric surfaces has already been defined, and calculated in the longitudinal direction. However, it is then noted that spherical aberrations may be affected. It is thus acceptable to make use of the focal length as measured in the transverse direction. However, this calculation is affected by distortion, and so it is preferable to make use of calculation methods less likely to be affected by aberrations. Hereinafter, the second focal length f in the invention should be defined by $f=\Delta Ih/\Delta\beta$ where $\Delta\beta$ is a minuscule angle (in radian) at which a ray is entered from the object side with respect to an axial chief ray, and $\Delta Ih$ is the height of an image formed by the optical system.

Example 1

Figure 2:
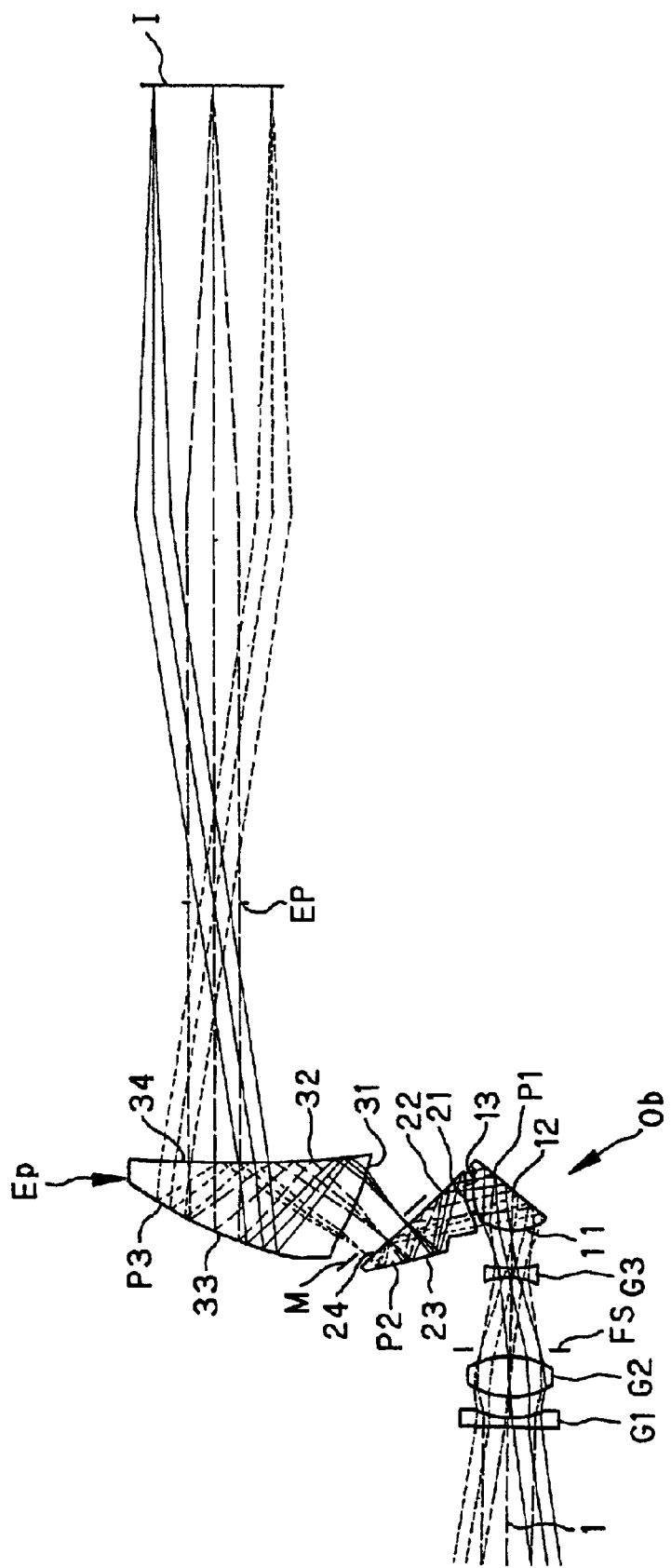
FIG. 2 is a Y-Z sectional view in the standard state of the real image type zoom finder according to Example 1 of the invention.
Figure 3:
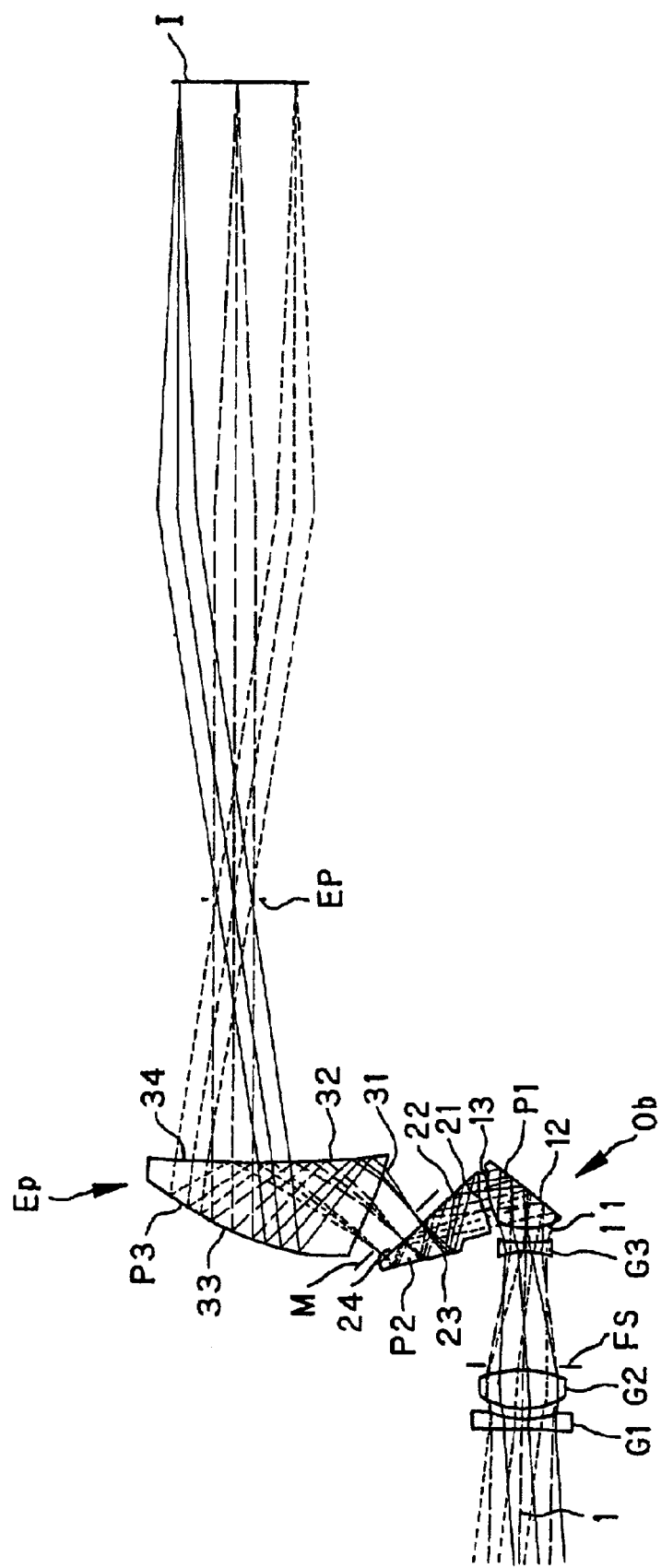
FIG. 3 is a Y-Z sectional view at the telephoto end of the real image type zoom finder according to Example 1 of the invention.
Figure 4:
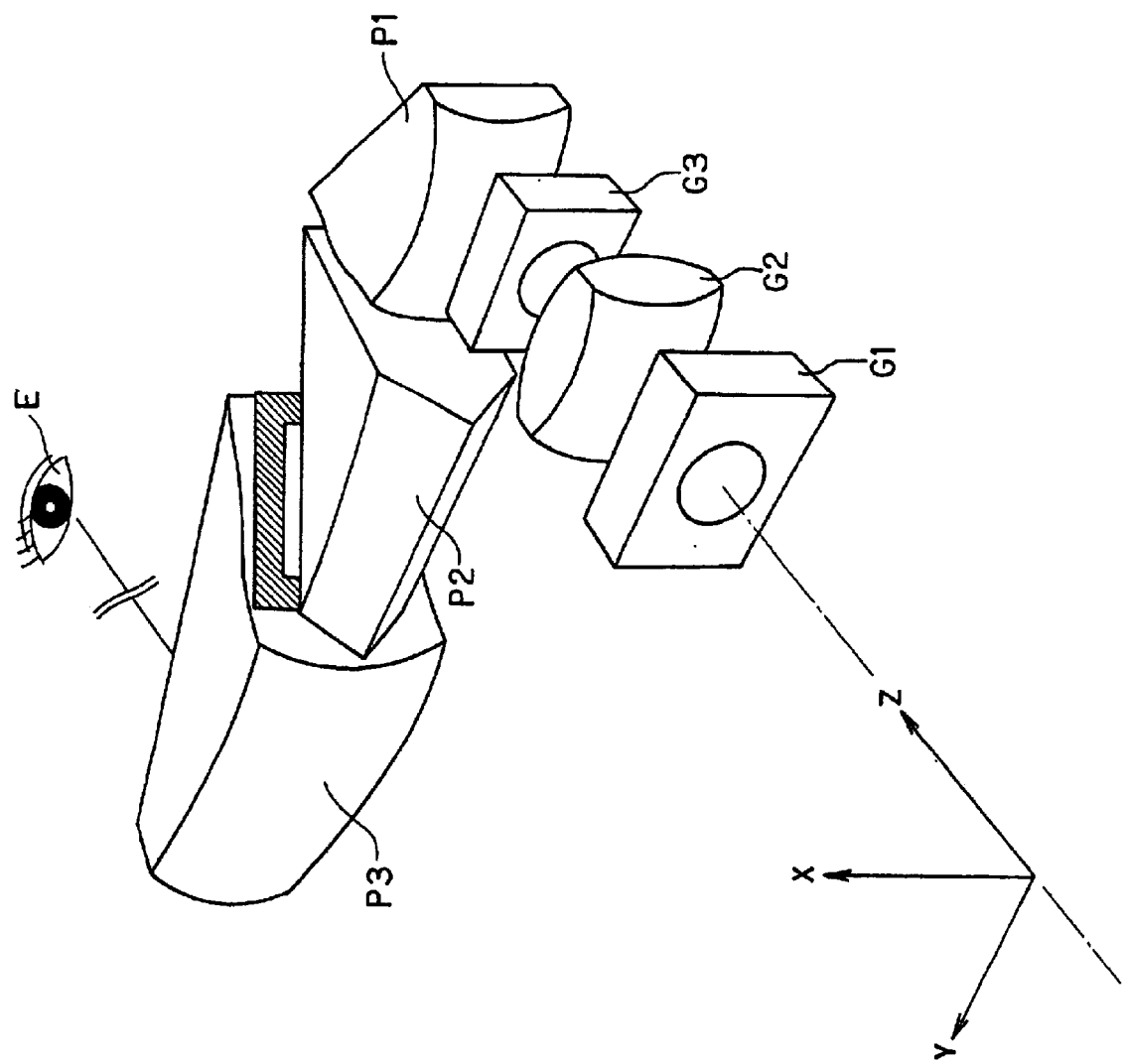
FIG. 4 is a perspective view in schematic of the optical system according to Example 1 of the invention.

Y-Z sectional views of the real image type zoom finder according to Example 1 including an axial chief ray 1 are given in FIGS. 1 to 3 showing the zoom finder at the wide-angle end, in the standard state and at the telephoto end, respectively. FIG. 4 is a perspective view illustrative in schematic of the optical system according to Example 1.

In Example 1, the X-direction half angle of view is 13.74° ~5.79° ~3.66°, the Y-direction half angle of view is 19.82° ~8.51° ~5.39°, the pupil diameter is φ4 mm, the intermediate image size is 2.78×4.10 mm (the diagonal size of the field mask is 4.95 mm and the maximum image height (a half of the diagonal length) is 2.48 mm), and the finder magnification is 0.41~0.99~1.56. When calculated as the focal length of a rotationally symmetric optical system, the objective optical system has a focal length of 5.68~13.70~21.69 mm and the eyepiece optical system has a focal length of 13.9 mm.

The real image type zoom finder of Example 1 is made up of, in ray propagation order from its object side, a first lens group G1 of the fixed type consisting of a double-concave negative lens having a rotationally symmetric aspheric surface on its image side, a second lens group G2 of the moving type consisting of a double-convex positive lens having rotationally symmetric aspheric surfaces on both its sides, a flare stop FS capable of moving with the second lens group G2, a third lens group G3 of the moving type consisting of a negative meniscus lens convex on its pupil side and having rotationally symmetric aspheric surfaces on both its sides, an objective optical system Ob composed of a first prism P1 consisting of a first transmitting surface 11 of positive power, a second reflecting surface 12 and a second transmitting surface 13 of positive power and a second prism P2 consisting of a first transmitting surface 21 of negative power, a first reflecting surface 22, a second reflecting surface 23 formed of a roof surface and a second transmitting surface 24, a field mask M for defining the range of the field of view, and an eyepiece optical system Ep composed of a third prism P3 consisting of a first transmitting surface 31 having a positive and negative action, a first reflecting surface 32 of negative power, a second reflecting surface 33 of positive power and a second transmitting surface 34 of negative power and having a generally positive power. Throughout FIGS. 1 to 3, EP represents an exit pupil (corresponding to a stop in the numerical data). The second transmitting surface 24 and the first reflecting surface 22 in the second prism P2, and the second transmitting surface 34 and the first reflecting surface 32 in the third prism P3 are composed of surfaces having the same optical action comprising a combined transmitting and reflecting action. The first transmitting surface 31, the first reflecting surface 32 (=the second transmitting surface 34), and the second reflecting surface 33 in the third prism P3 is composed of a free-form surface.

In this example, the first reflecting surface 12 in the first prism P1, the first reflecting surface 22 (=the second transmitting surface 24) in the second prism P2, and the second reflecting surface 23 formed of a roof surface in the second prism P2 is provided in a plane form. However, it is noted that they may be each formed of an aspheric or free-form surface. The first transmitting surface 11 and the second transmitting surface 13 in the first prism P1, and the first transmitting surface 21 in the second prism P2 are all formed of rotationally symmetric aspheric surfaces; however, they may be each formed of a free-form surface. A roof surface may be used for the first reflecting surface 12 in the first prism P1.

Regarding the numerical data given later, it is noted that the amount of decentration is given on the basis of a reference surface 1 for the 9th to 15th surfaces, and a reference surface 2 for 16th to 20th surfaces, and an image plane I is nearly vertical (1.41°) to the Z axis.

Example 2

Figure 5:
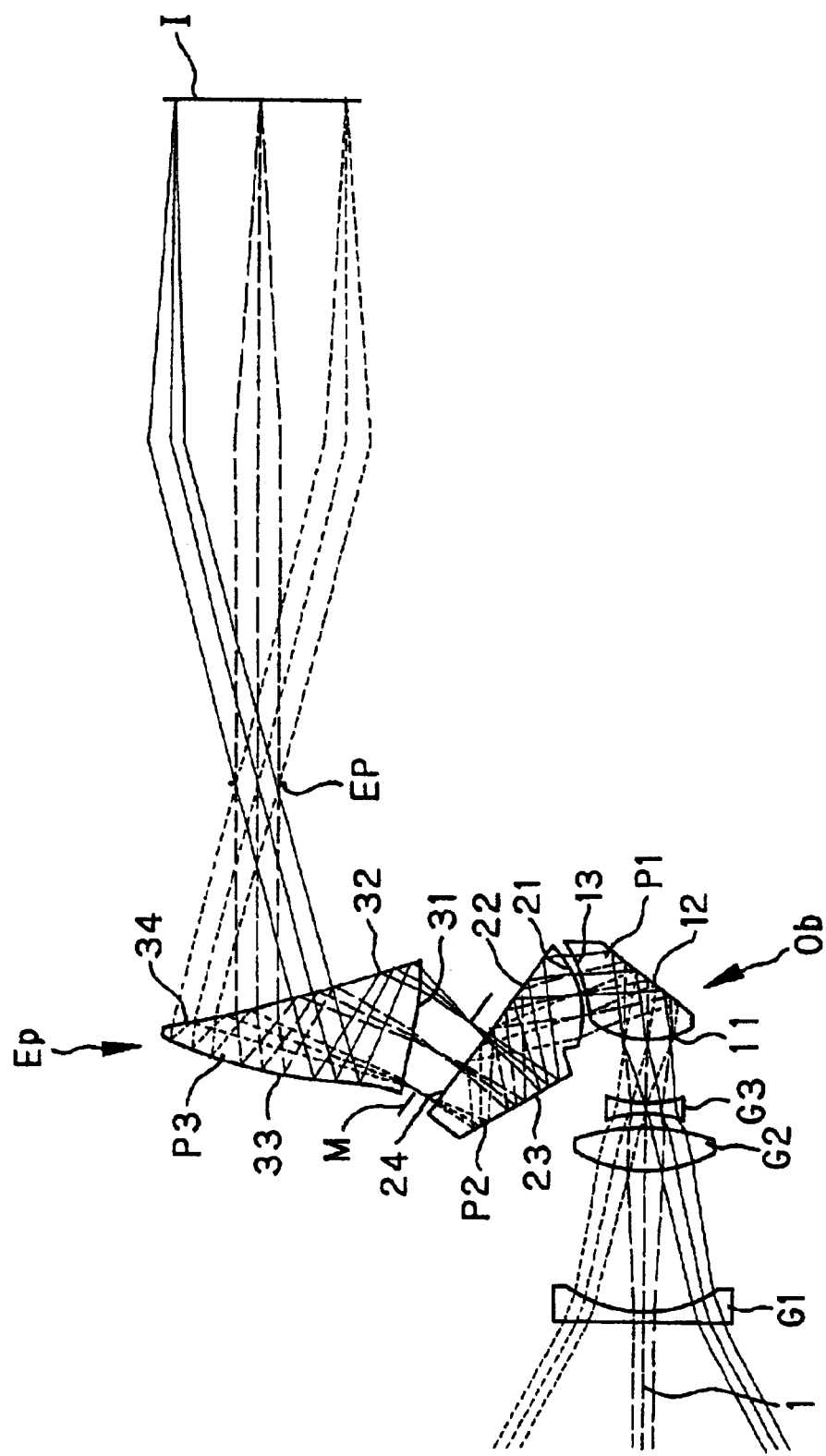
FIG. 5 is a Y-Z sectional view at the wide-angle end of the real image type zoom finder according to Example 2 of the invention.
Figure 6:
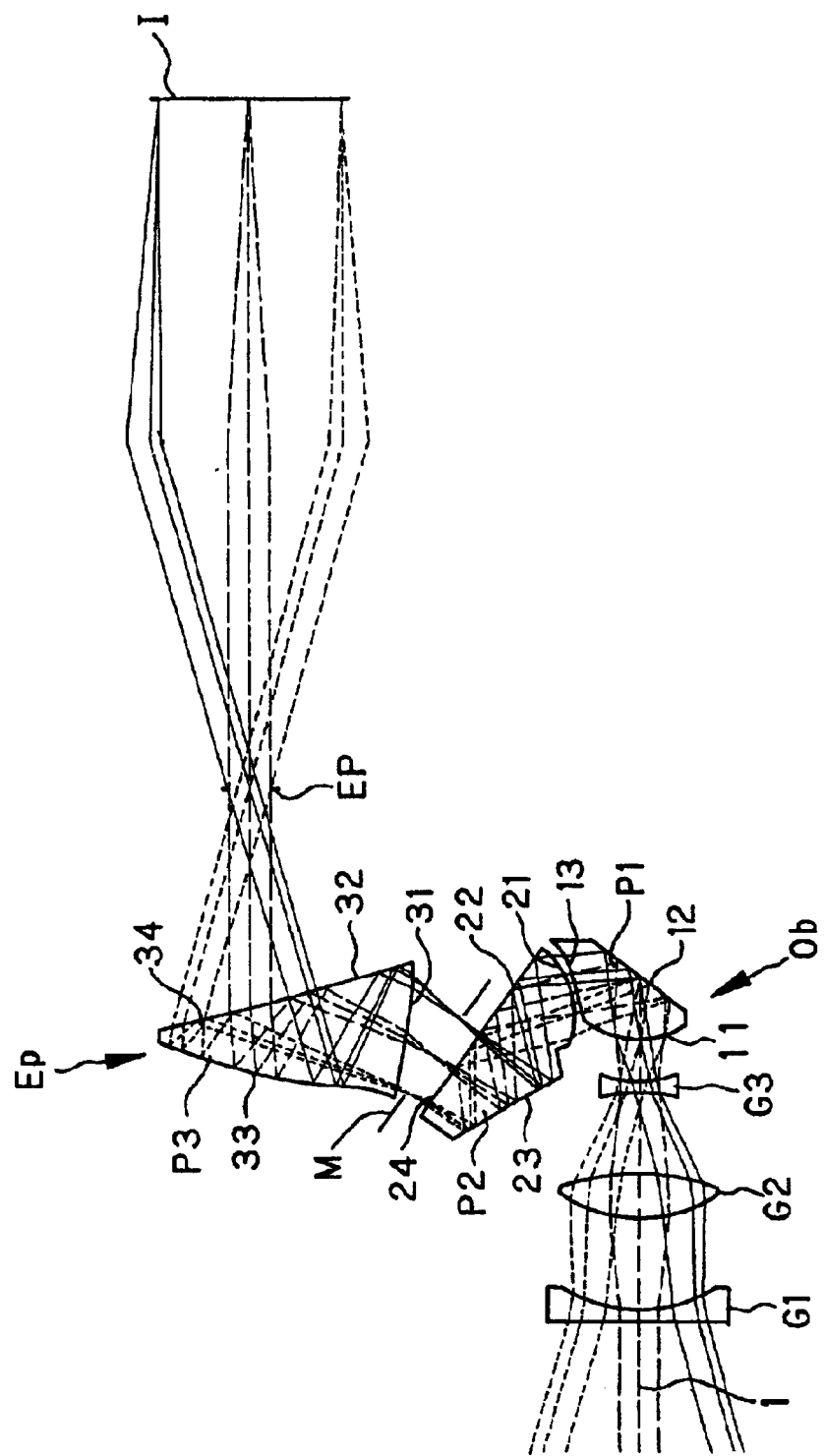
FIG. 6 is a Y-Z sectional view in the standard state of the real image type zoom finder according to Example 2 of the invention.
Figure 7:
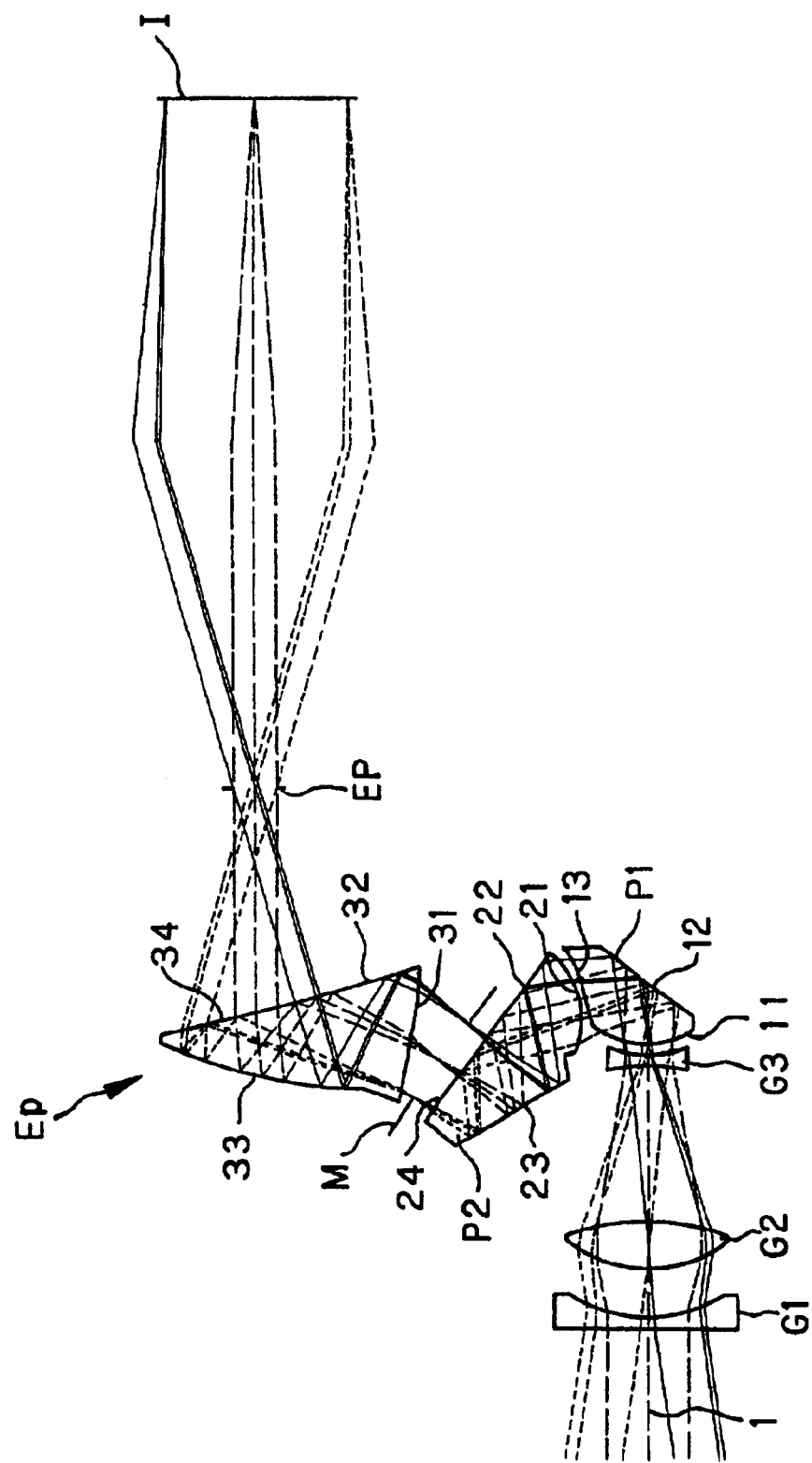
FIG. 7 is a Y-Z sectional view at the telephoto end of the real image type zoom finder according to Example 2 of the invention.

Y-Z sectional views of the real image type zoom finder according to Example 2 including an axial chief ray 1 are given in FIGS. 5 to 7 showing the zoom finder at the wide-angle end, in the standard state and at the telephoto end, respectively.

In Example 2, the X-direction half angle of view is 19.14° ~10.37° ~5.12°, the Y-direction half angle of view is 27.81° ~15.55° ~7.75°, the pupil diameter is φ4 mm, the intermediate image size is 5.58×8.48 mm (the diagonal size of the field mask is 10.15 mm and the maximum image height (a half of the diagonal length) is 5.08 mm), and the finder magnification is 0.49~0.93~1.90. When calculated as the focal length of a rotationally symmetric optical system, the objective optical system has a focal length of 8.04~15.24~31.14 mm and the eyepiece optical system has a focal length of 16.4 mm.

The real image type zoom finder of Example 2 is made up of, in ray propagation order from its object side, a first lens group G1 of the fixed type consisting of a negative meniscus lens having a rotationally symmetric aspheric surface on its image side and convex on its object side, a second lens group G2 of the moving type consisting of a double-convex positive lens having rotationally symmetric aspheric surfaces on both its sides, a third lens group G3 of the moving type consisting of a double-concave negative lens having rotationally symmetric aspheric surfaces on both its sides, an objective optical system Ob composed of a first prism P1 consisting of a first transmitting surface 11 of positive power, a first reflecting surface 12 and a second transmitting surface 13 of negative power and a second prism P2 consisting of a first transmitting surface 21 of positive power, a first reflecting surface 22, a second reflecting surface 23 formed of a roof surface and a second transmitting surface 24, a field mask M for defining the range of the field of view, and an eyepiece optical system Ep composed of a third prism P3 consisting of a first transmitting surface 31 having a positive and negative action, a first reflecting surface 32 of negative power, a second reflecting surface 33 of positive power and a second transmitting surface 34 of negative power and having a generally positive power. Throughout FIGS. 5 to 7, EP represents an exit pupil (corresponding to a stop in the numerical data). The second transmitting surface 24 and the first reflecting surface 22 in the second prism P2, and the second transmitting surface 34 and the first reflecting surface 32 in the third prism P3 are composed of surfaces having the same optical action comprising a combined transmitting and reflecting action. The first transmitting surface 31, the first reflecting surface 32 (=the second transmitting surface 34), and the second reflecting surface 33 in the third prism P3 is composed of a free-form surface.

In this example, the first reflecting surface 12 in the first prism P1, the first reflecting surface 22 (=the second transmitting surface 24) in the second prism P2, and the second reflecting surface 23 formed of a roof surface in the second prism P2 is provided in a plane form. However, it is noted that they may be each formed of an aspheric or free-form surface. The first transmitting surface 11 in the first prism P1 is formed of a rotationally symmetric aspheric surface; however, it may be formed of a free-form surface. The second transmitting surface 13 in the first prism P1, and the first transmitting surface 21 in the second prism P2 is formed of a rotationally symmetric aspheric surface; however, they may be each formed of a free-form surface.

Regarding the numerical data given later, it is noted that the amount of decentration is given on the basis of a reference surface 1 for the 9th to 14th surfaces, and a reference surface 2 for 16th to 20th surfaces, and an image plane I is nearly vertical (0.44°) to the Z axis.

Example 3

Figure 8:
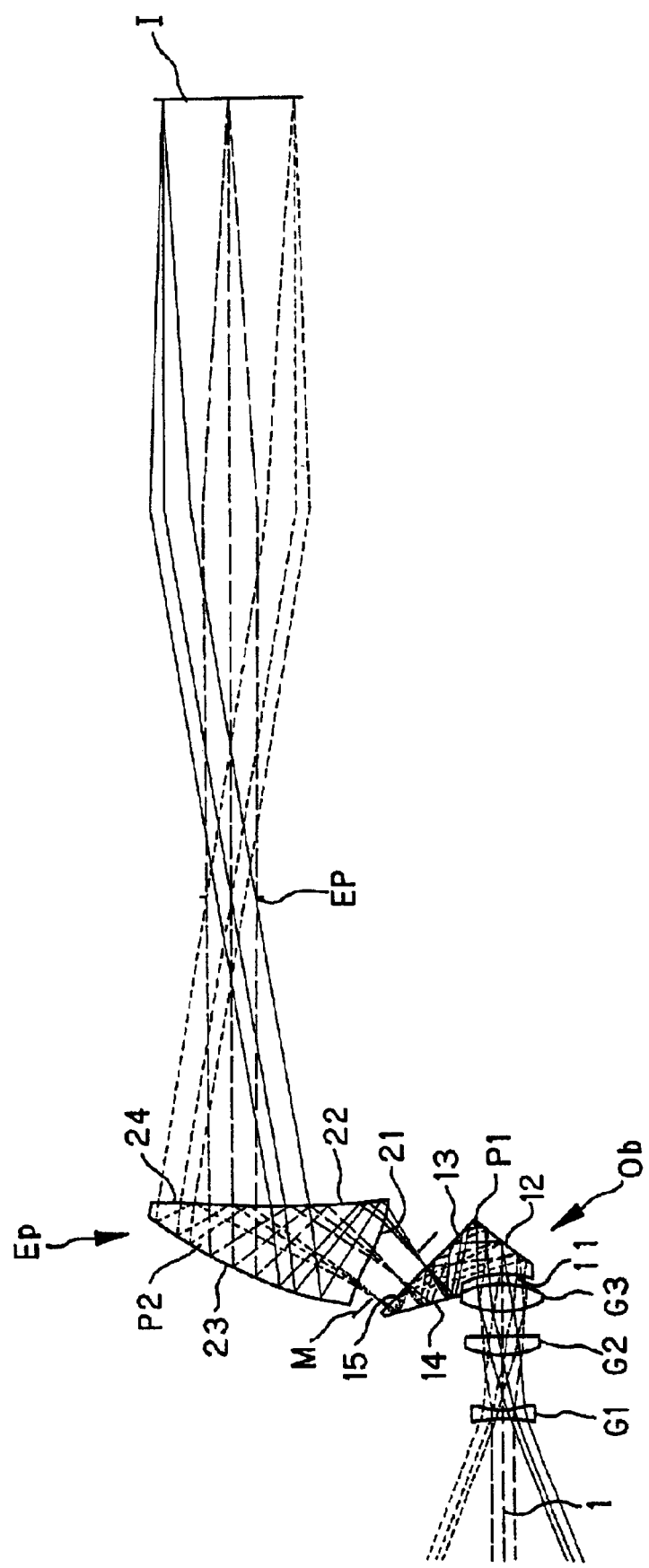
FIG. 8 is a Y-Z sectional view at the wide-angle end of the real image type zoom finder according to Example 3 of the invention.
Figure 9:
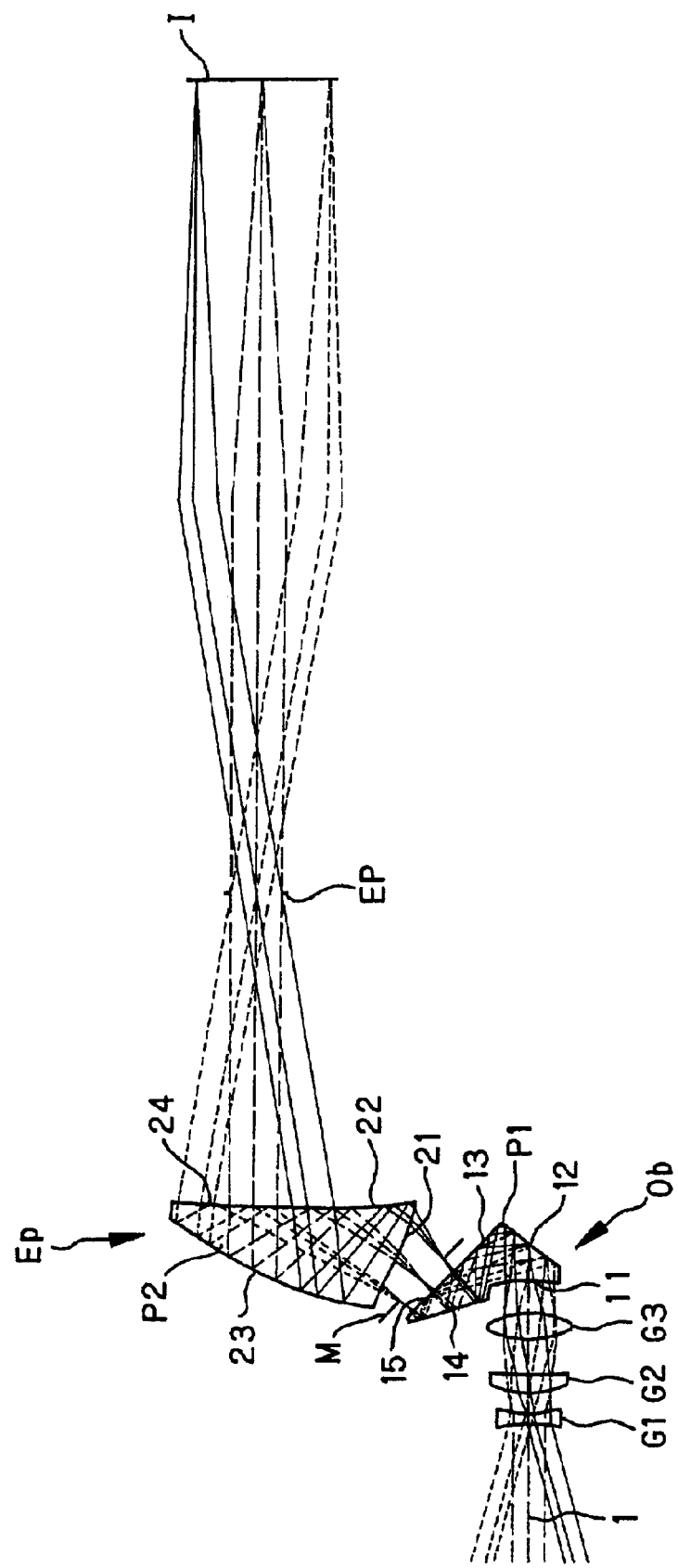
FIG. 9 is a Y-Z sectional view in the standard state of the real image type zoom finder according to Example 3 of the invention.
Figure 10:
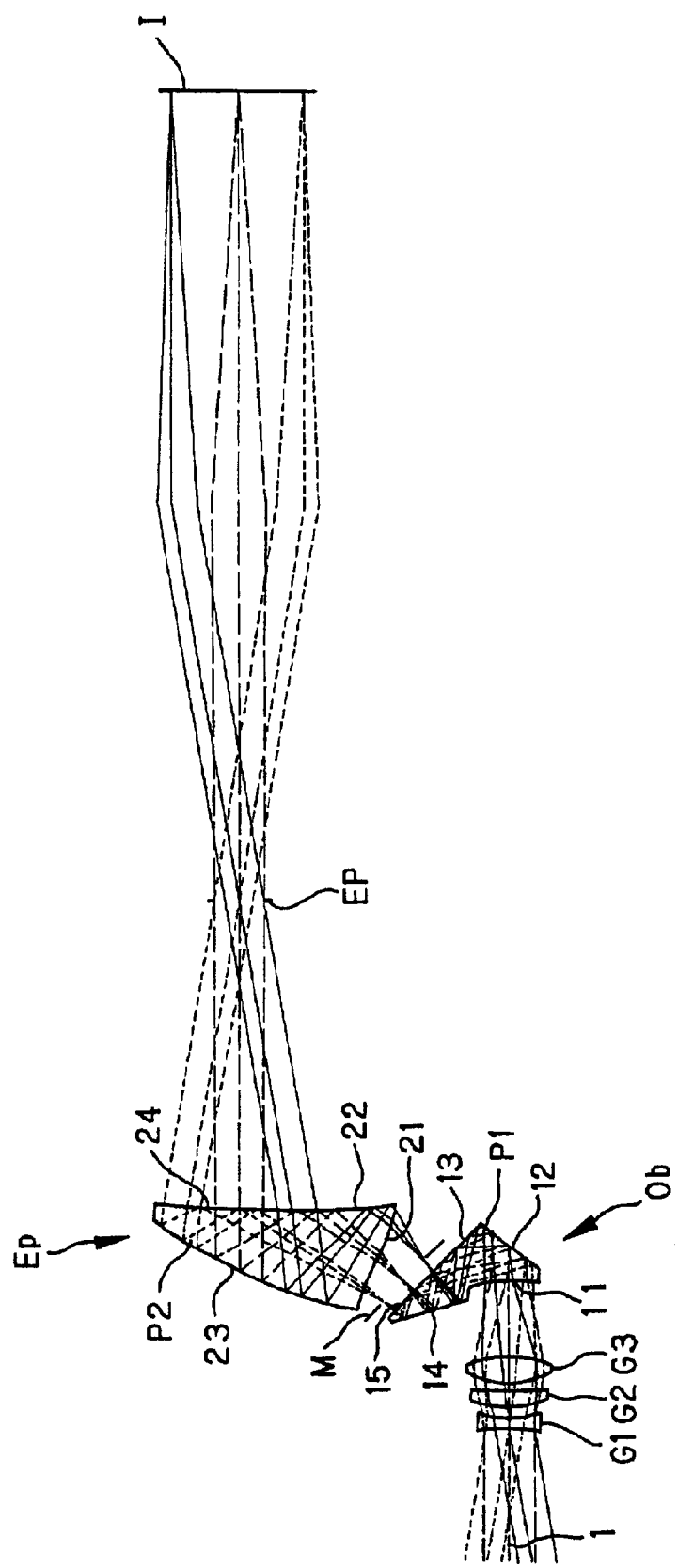
FIG. 10 is a Y-Z sectional view at the telephoto end of the real image type zoom finder according to Example 3 of the invention.

Y-Z sectional views of the real image type zoom finder according to Example 3 including an axial chief ray 1 are given in FIGS. 8 to 10 showing the zoom finder at the wide-angle end, in the standard state and at the telephoto end, respectively.

In Example 3, the X-direction half angle of view is 12.40° ~8.78° ~5.38°, the Y-direction half angle of view is 21.98° ~15.38° ~9.38°, the pupil diameter is φ4 mm, the intermediate image size is 2.30×4.86 mm (the diagonal size is 4.95 mm and the maximum image height is 2.69 mm), and the finder magnification is 0.43~0.61~0.99. When calculated as the focal length of a rotationally symmetric optical system, the objective optical system has a focal length of 6.08~8.55~13.83 mm and the eyepiece optical system has a focal length of 14.03 mm.

The real image type zoom finder of Example 3 is made up of, in ray propagation order from its object side, a first lens group G1 of the fixed type consisting of a double-concave negative lens having a rotationally symmetric aspheric surface on its pupil side, a second lens group G2 of the moving type consisting of a positive meniscus lens having a rotationally symmetric aspheric surface on its object side and convex on its object side, a third lens group G3 of the moving type consisting of a double-convex positive lens having rotationally symmetric aspheric surfaces on both its sides, an objective optical system Ob composed of a first prism P1 consisting of a first transmitting surface 11 of negative power, a first reflecting surface 12, a second reflecting surface 13, a third reflecting surface 14 formed of a roof surface and a second transmitting surface 15, a field mask M for defining the range of the field of view, and an eyepiece optical system Ep composed of a second prism P2 consisting of a first transmitting surface 21 having a positive and negative action, a first reflecting surface 22 of negative power, a second reflecting surface 23 of positive power and a second transmitting surface 24 of negative power and having a generally positive power. Throughout FIGS. 8 to 10, EP represents an exit pupil (corresponding to a stop in the numerical data). It is noted that the second transmitting surface 15 and the second reflecting surface 13 in the first prism P1, the second transmitting surface 24 and the first reflecting surface 22 in the second prism P2 are formed of surfaces having the same optical action comprising a combined transmitting and reflecting action, and the first transmitting surface 21, the reflecting surface 22 (=the second transmitting surface 24), and the second reflecting surface 23 in the second prism P2 is made up of a free-form surface.

In this example, the first reflecting surface 12 in the first prism P1, the second reflecting surface 13 (=the second transmitting surface 15) in the first prism P1, and the third reflecting surface 14 formed of a roof surface in the second prism P2 is provided in a plane form. However, it is noted that they may be each formed of an aspheric or free-form surface. The first transmitting surface 11 in the first prism P1 is formed of a rotationally symmetric aspheric surface; however, it may be formed of a free-form surface.

Regarding the numerical data given later, it is noted that the amount of decentration is given on the basis of a reference surface 1 for the 8th to 12th surfaces, and a reference surface 2 for 14th to 18th surfaces, and an image plane I is vertical to the Z axis.

Example 4

Figure 11:
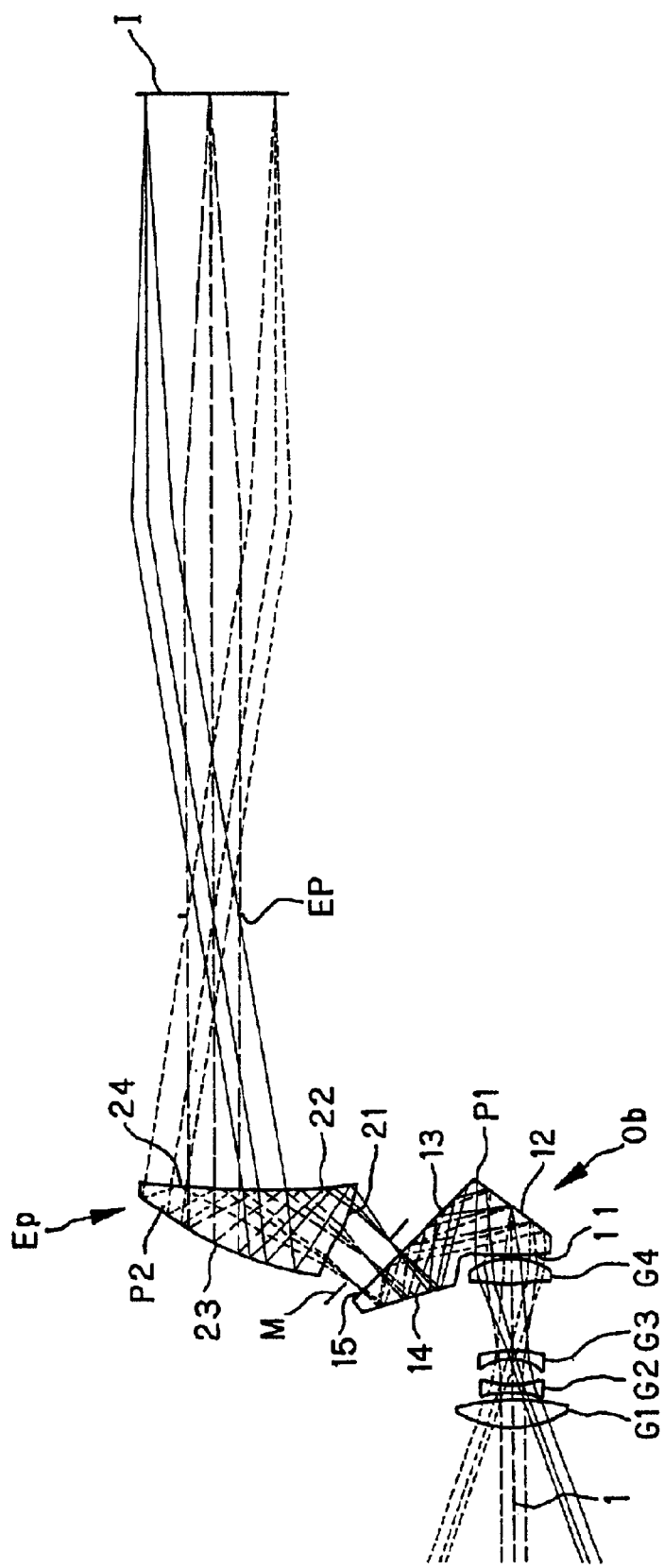
FIG. 11 is a Y-Z sectional view at the wide-angle end of the real image type zoom finder according to Example 4 of the invention.
Figure 12:
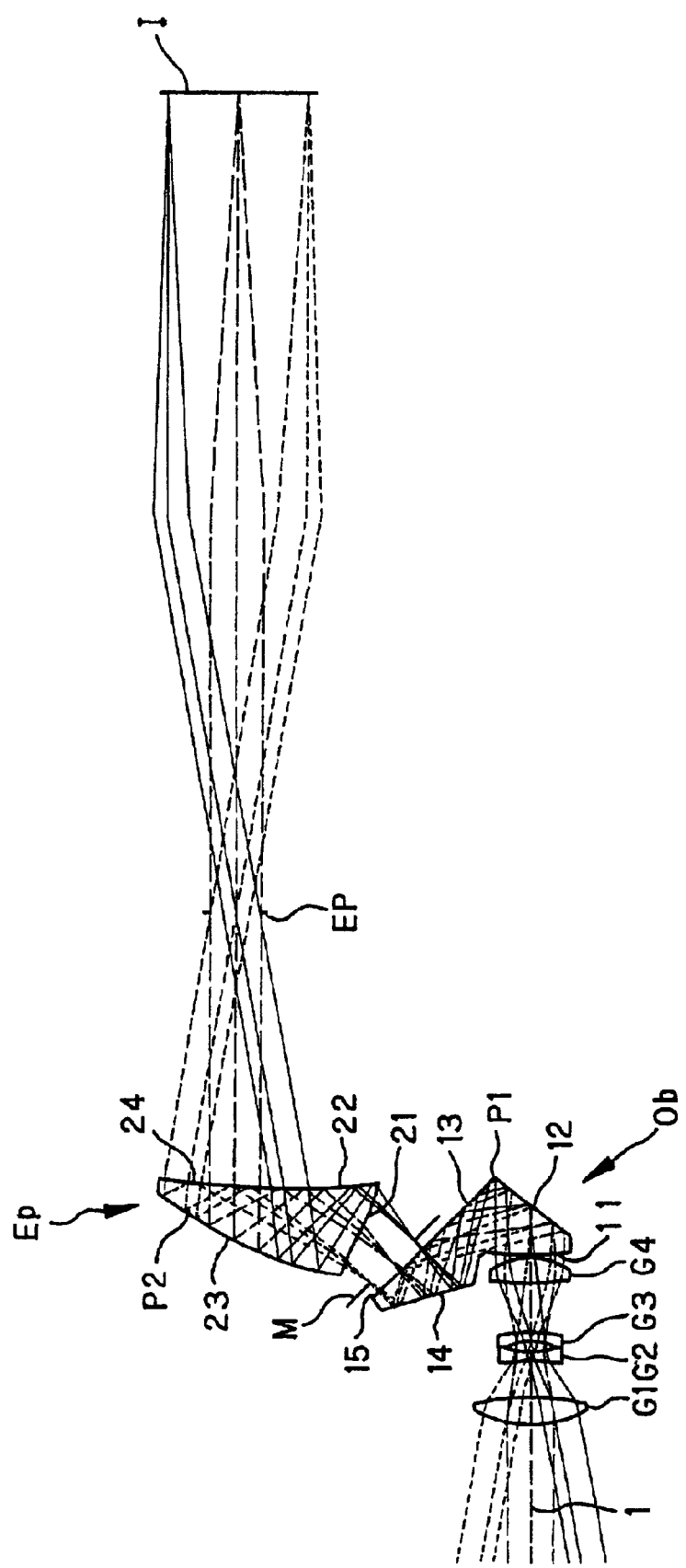
FIG. 12 is a Y-Z sectional view in the standard state of the real image type zoom finder according to Example 4 of the invention.
Figure 13:
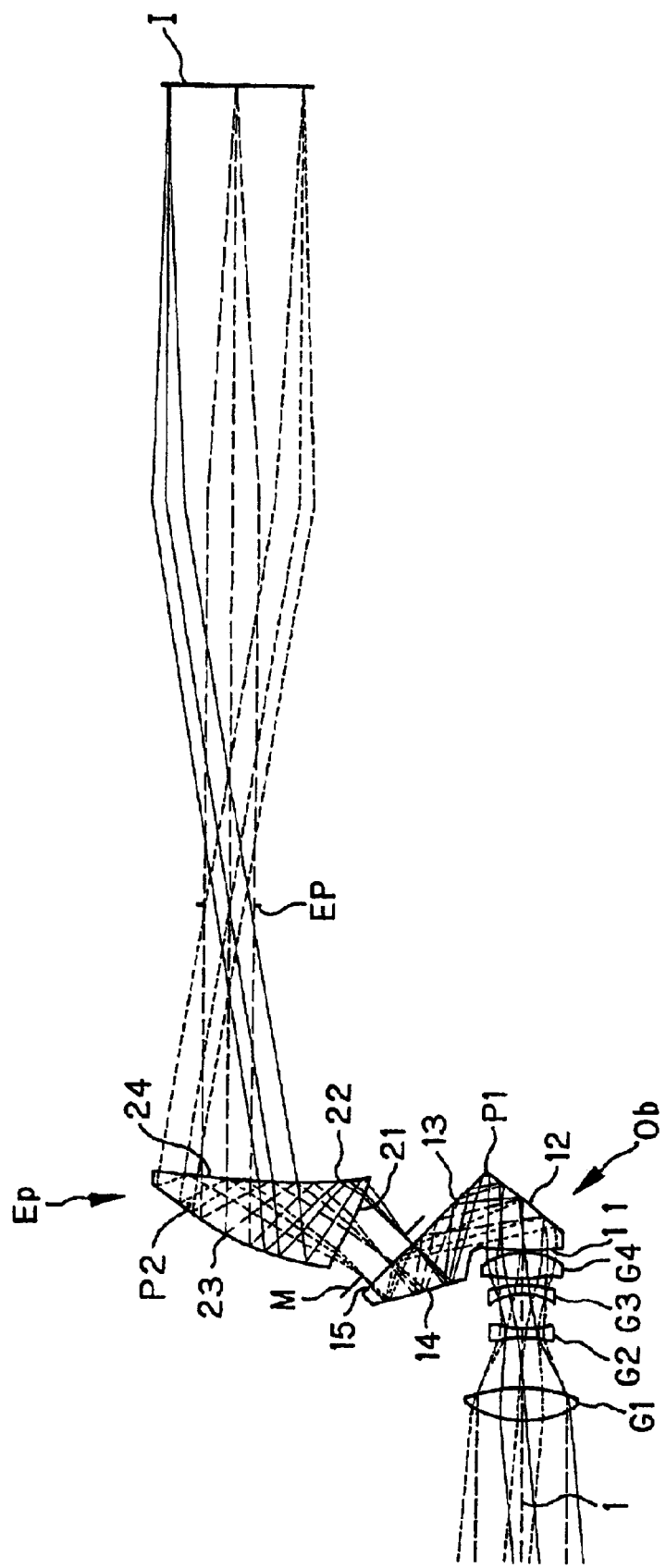
FIG. 13 is a Y-Z sectional view at the telephoto end of the real image type zoom finder according to Example 4 of the invention.
Figure 14:
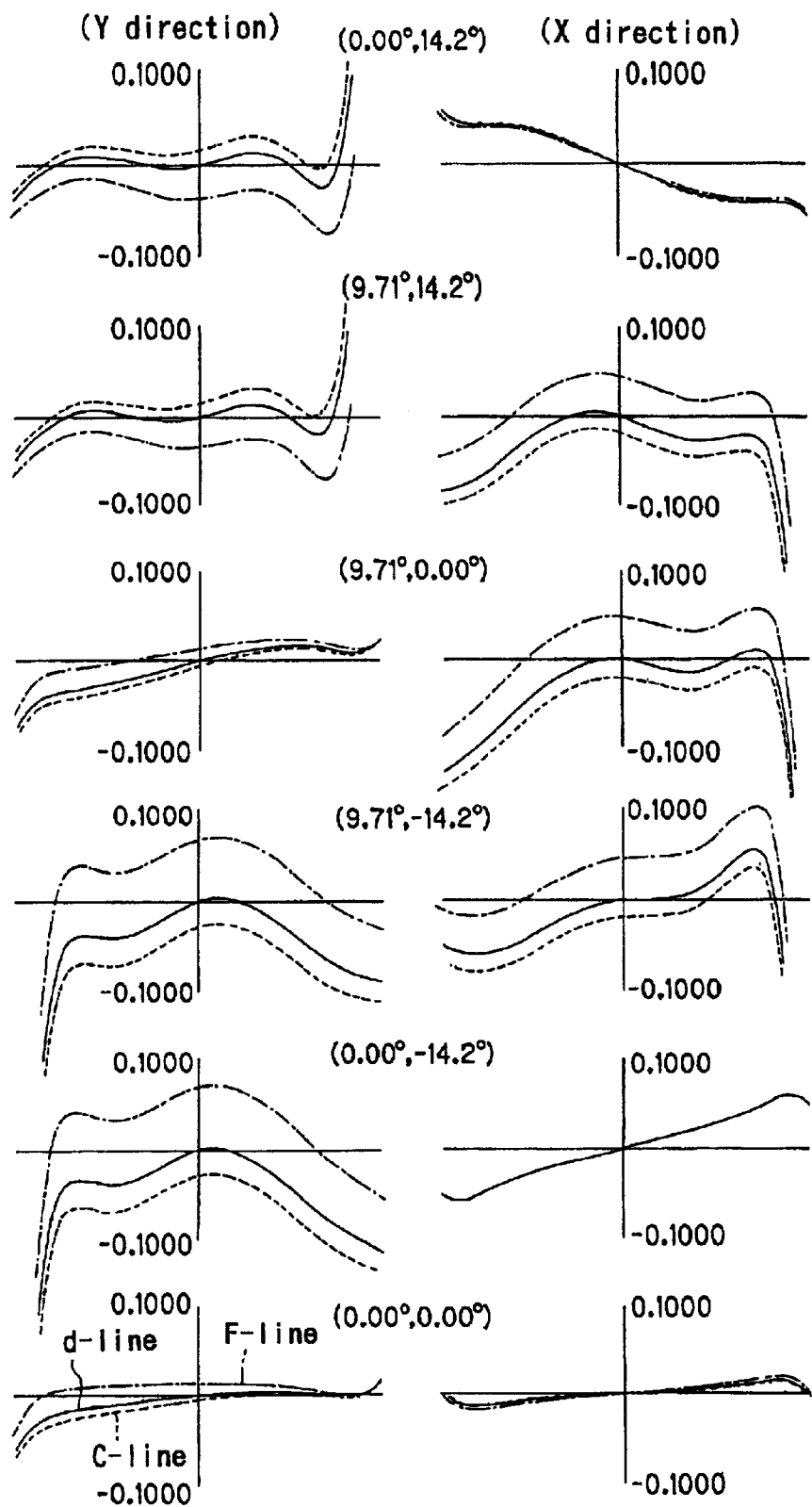
FIG. 14 is a transverse aberration diagram at the wide-angle end of the real image type zoom finder according to Example 1 of the invention.
Figure 15:
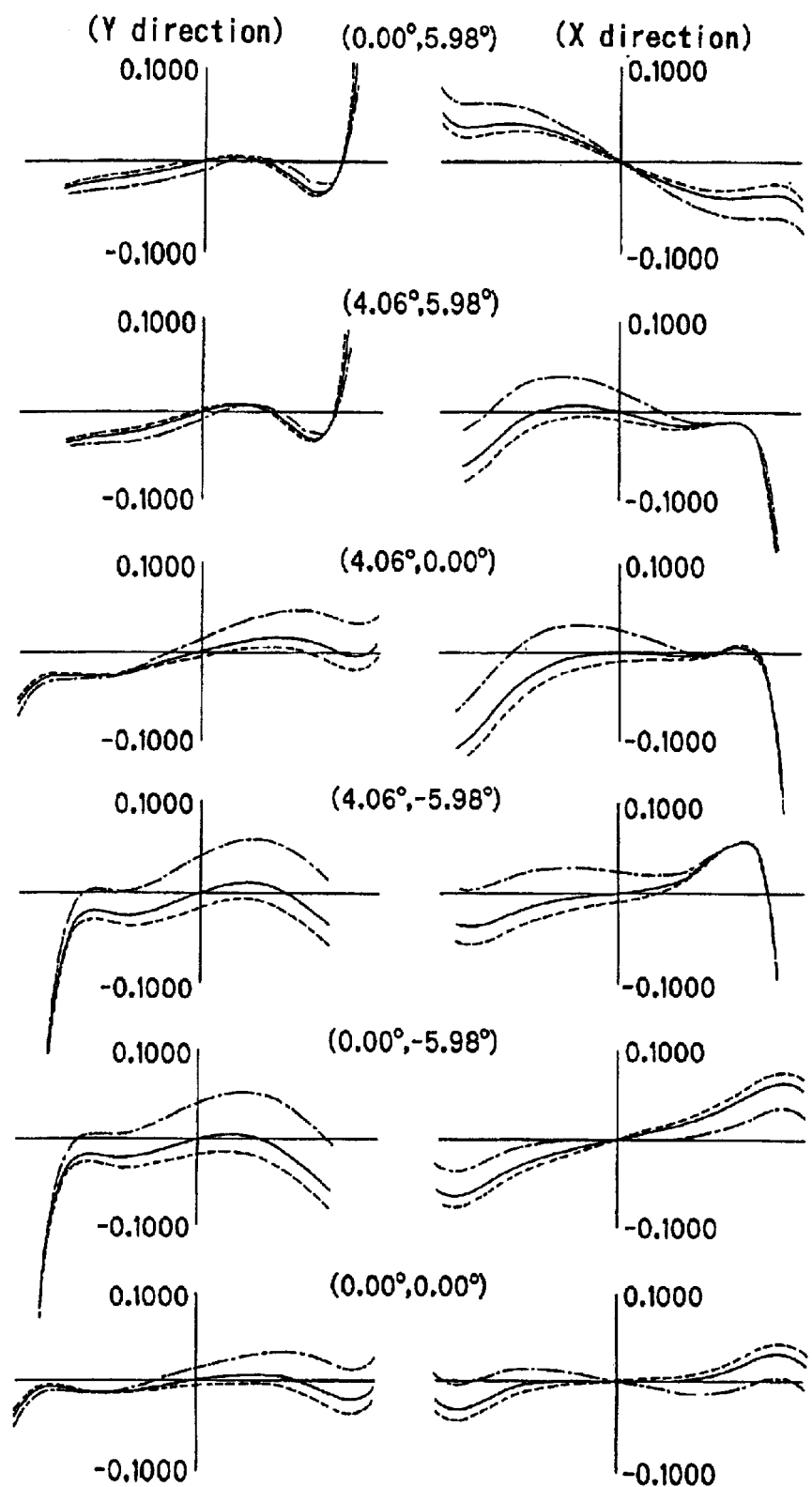
FIG. 15 is a transverse aberration diagram in the standard state of the real image type zoom finder according to Example 1 of the invention.
Figure 16:
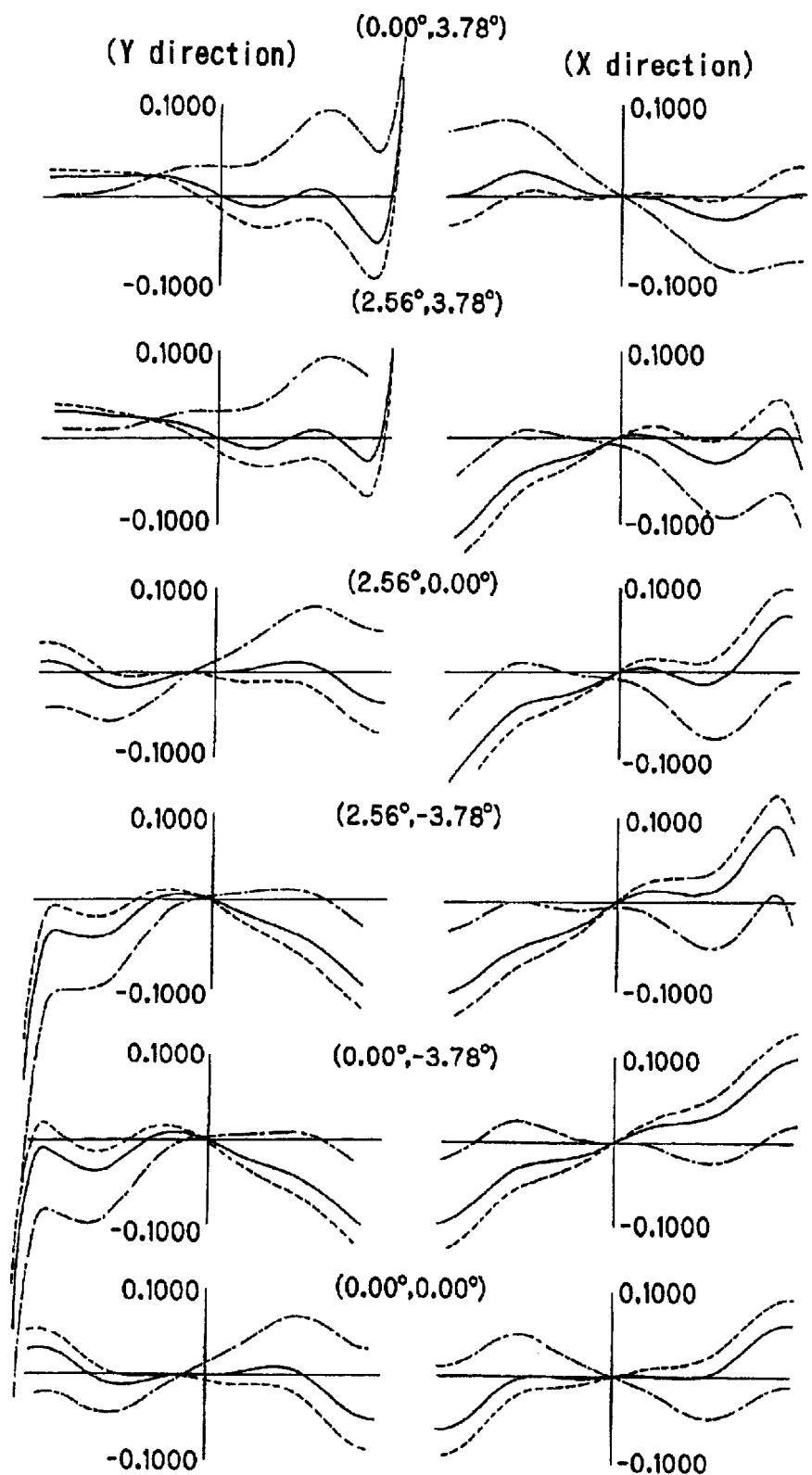
FIG. 16 is a transverse aberration diagram at the telephoto end of the real image type zoom finder according to Example 1 of the invention.
Figure 17:
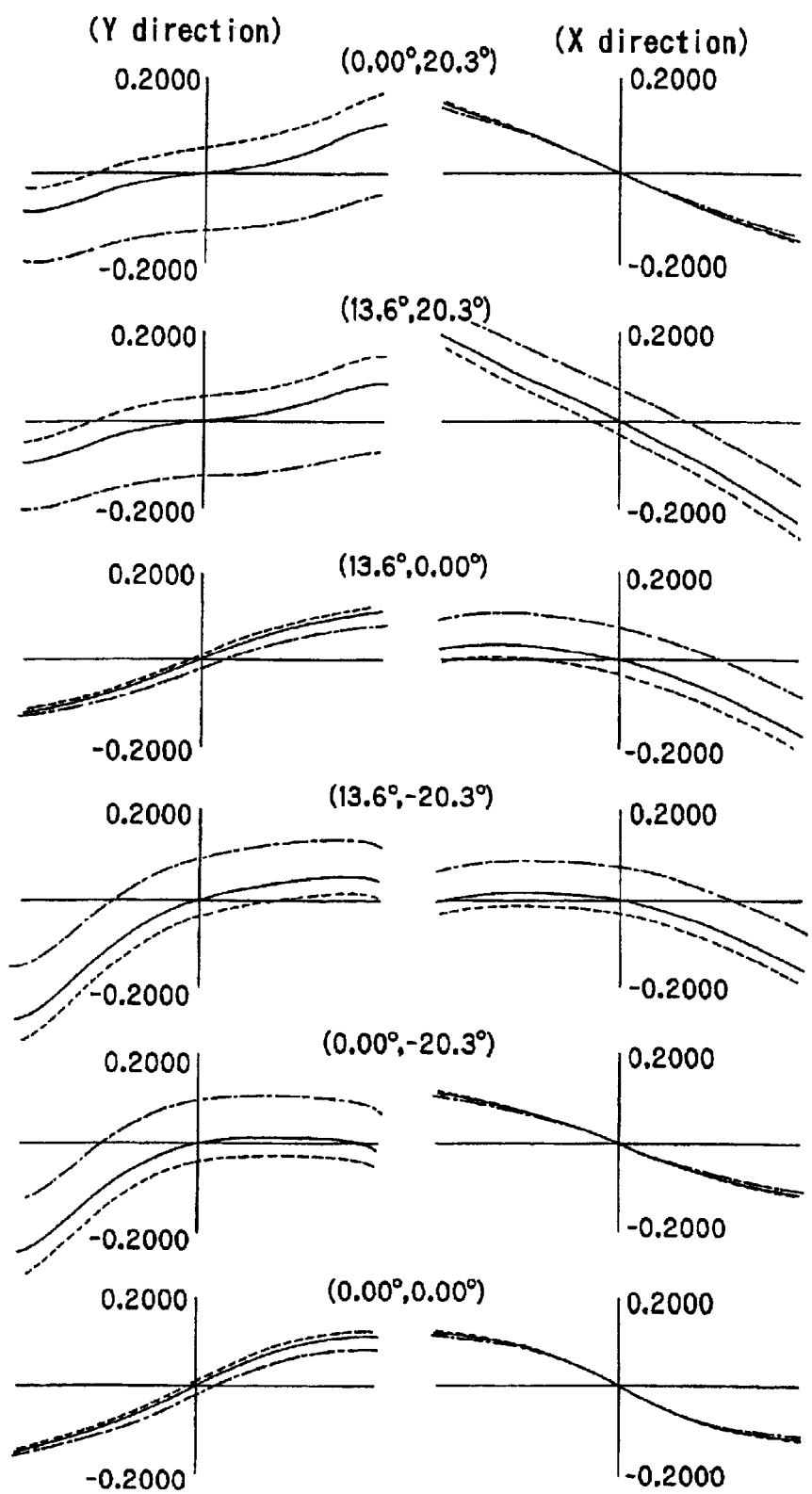
FIG. 17 is a transverse aberration diagram at the wide-angle end of the real image type zoom finder according to Example 2 of the invention.
Figure 18:
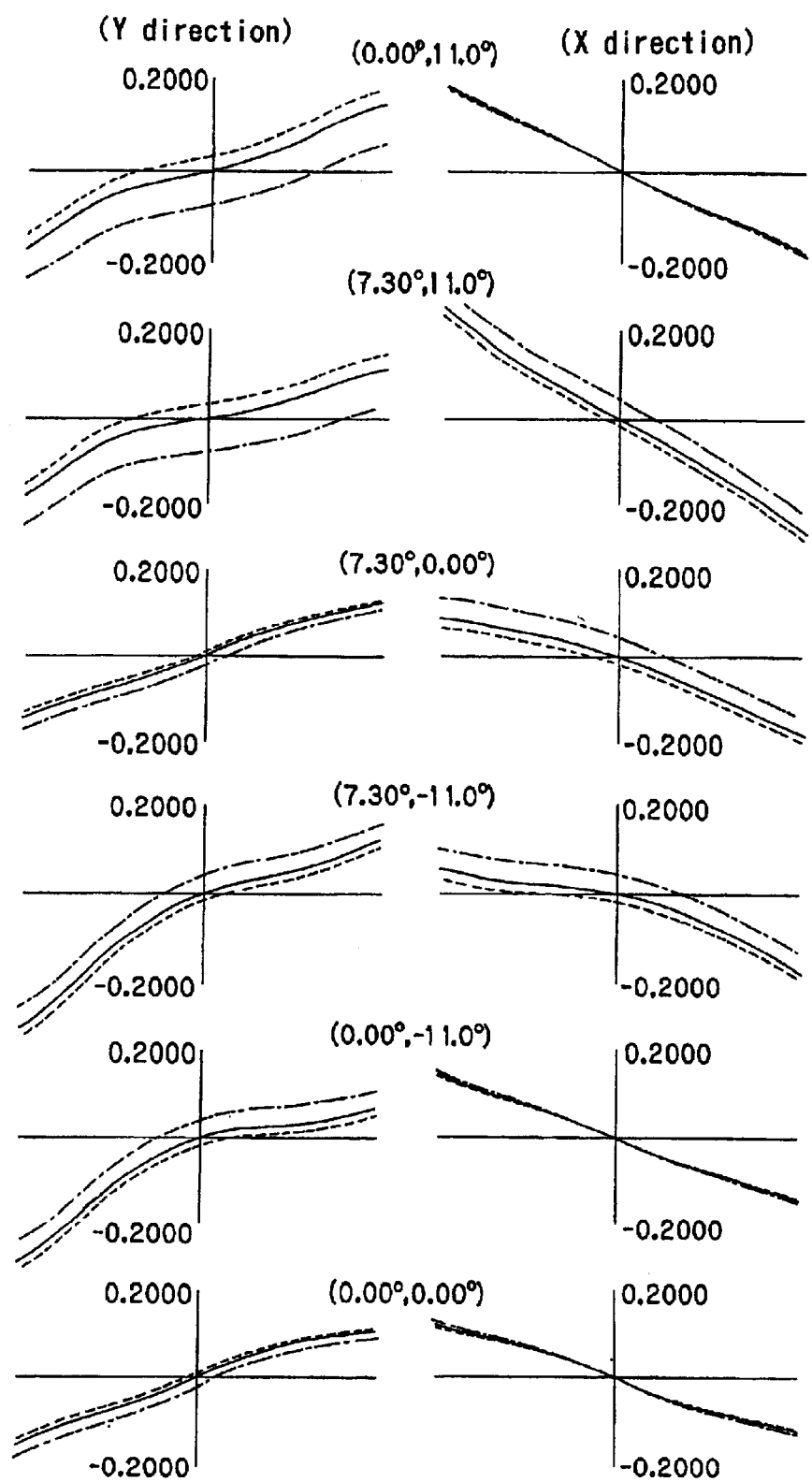
FIG. 18 is a transverse aberration diagram in the standard state of the real image type zoom finder according to Example 2 of the invention.
Figure 19:
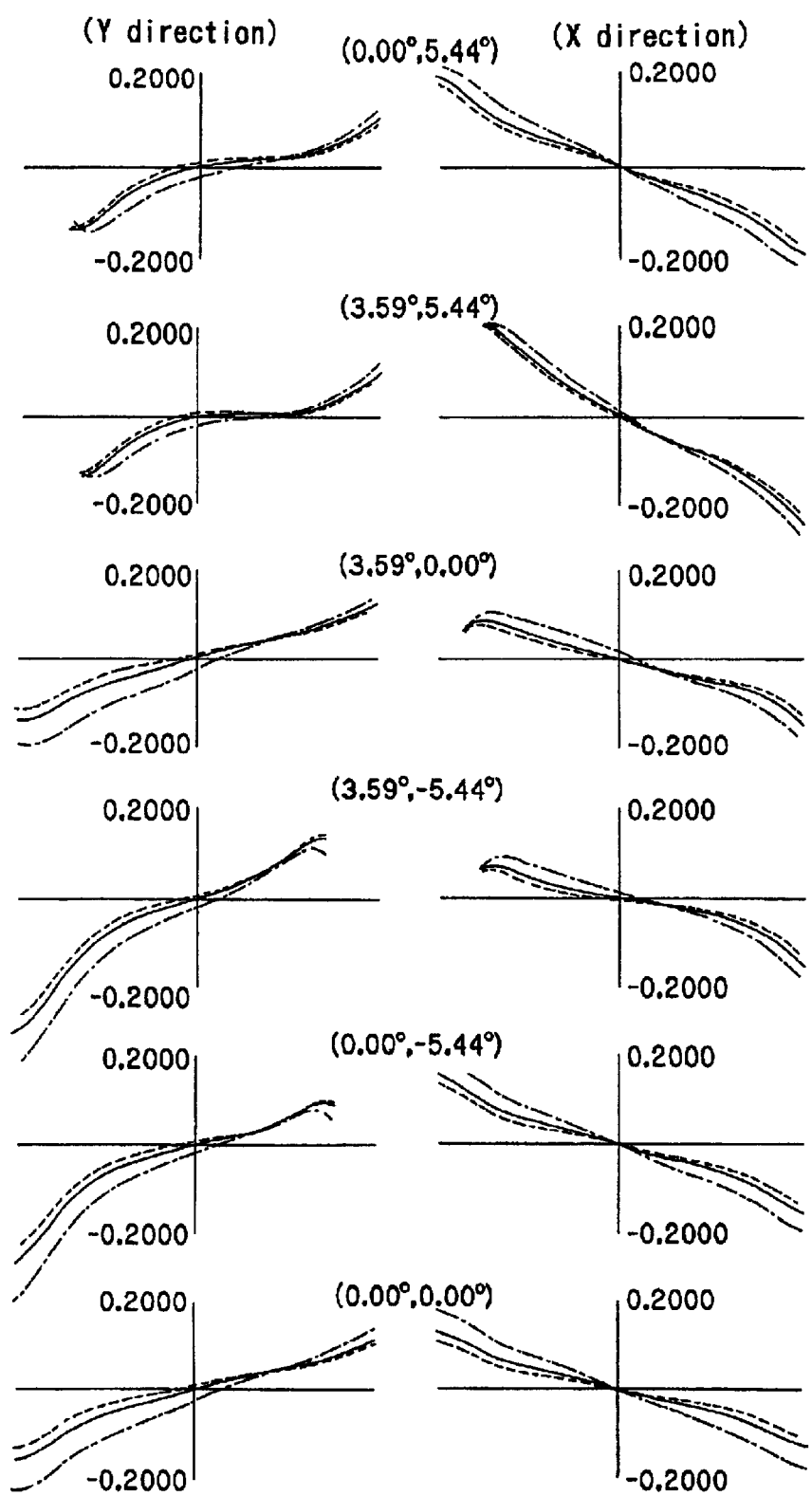
FIG. 19 is a transverse aberration diagram at the telephoto end of the real image type zoom finder according to Example 2 of the invention.
Figure 20:
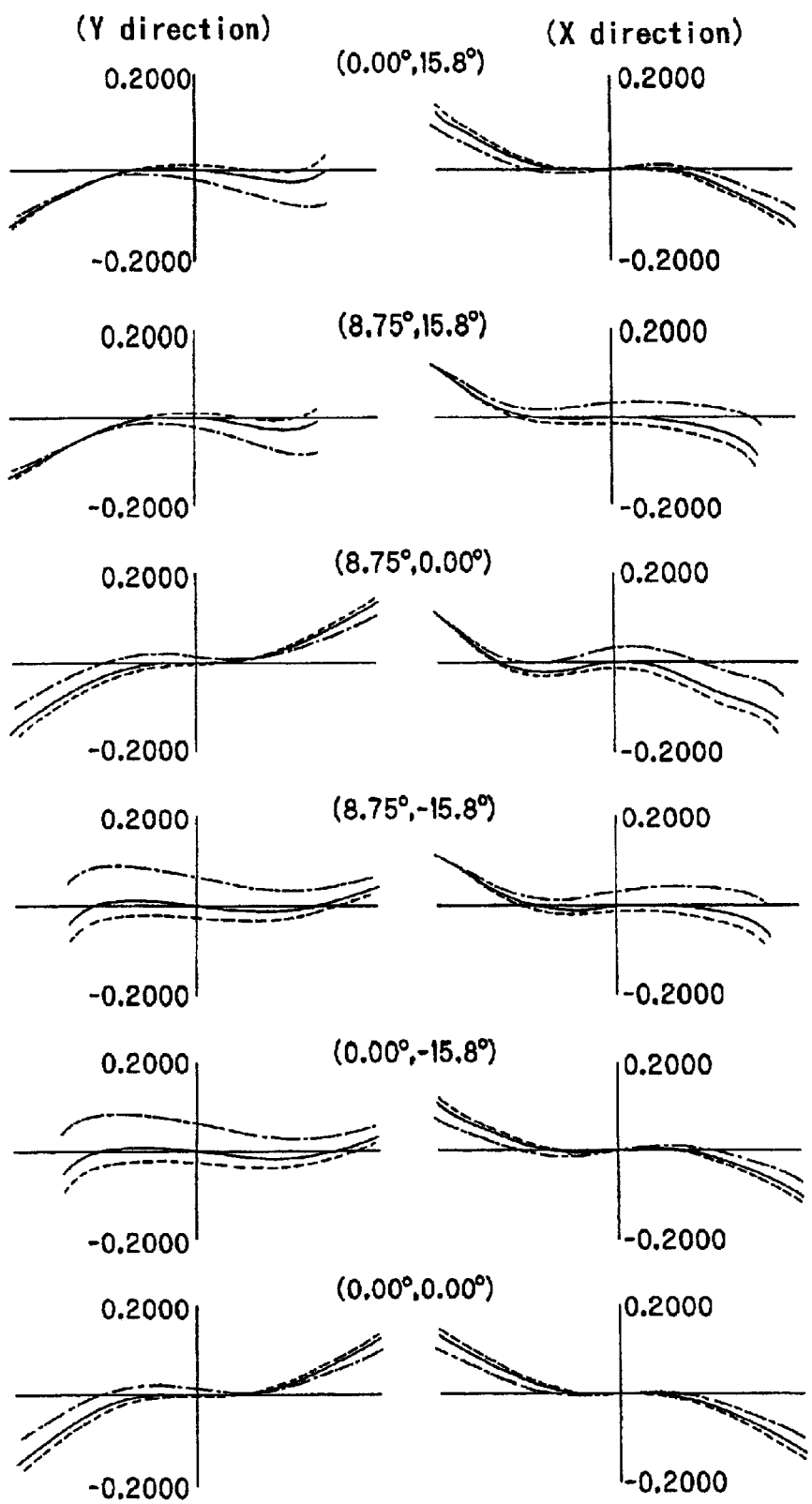
FIG. 20 is a transverse aberration diagram at the wide-angle end of the real image type zoom finder according to Example 3 of the invention.
Figure 21:
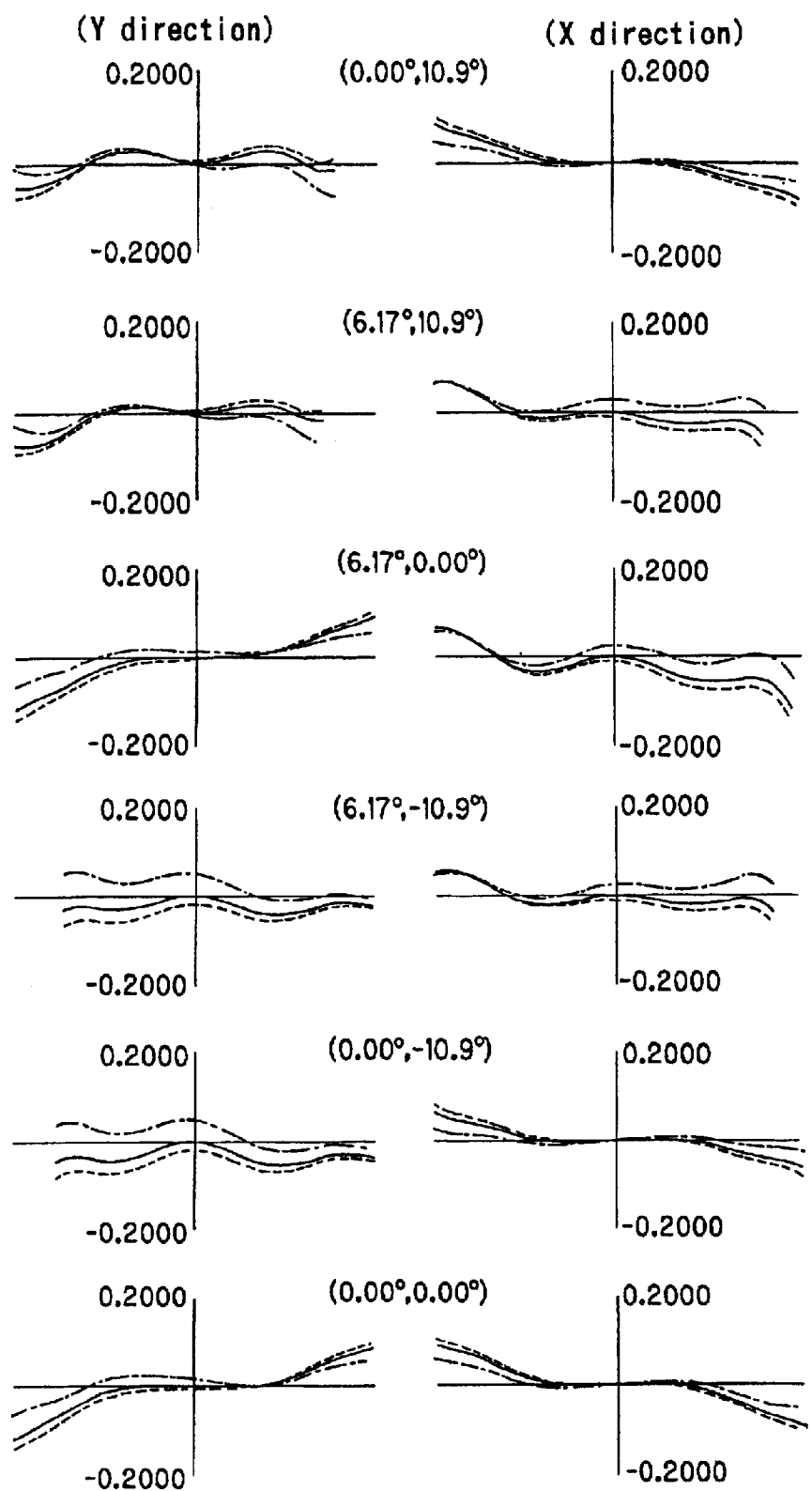
FIG. 21 is a transverse aberration diagram in the standard state of the real image type zoom finder according to Example 3 of the invention.
Figure 22:
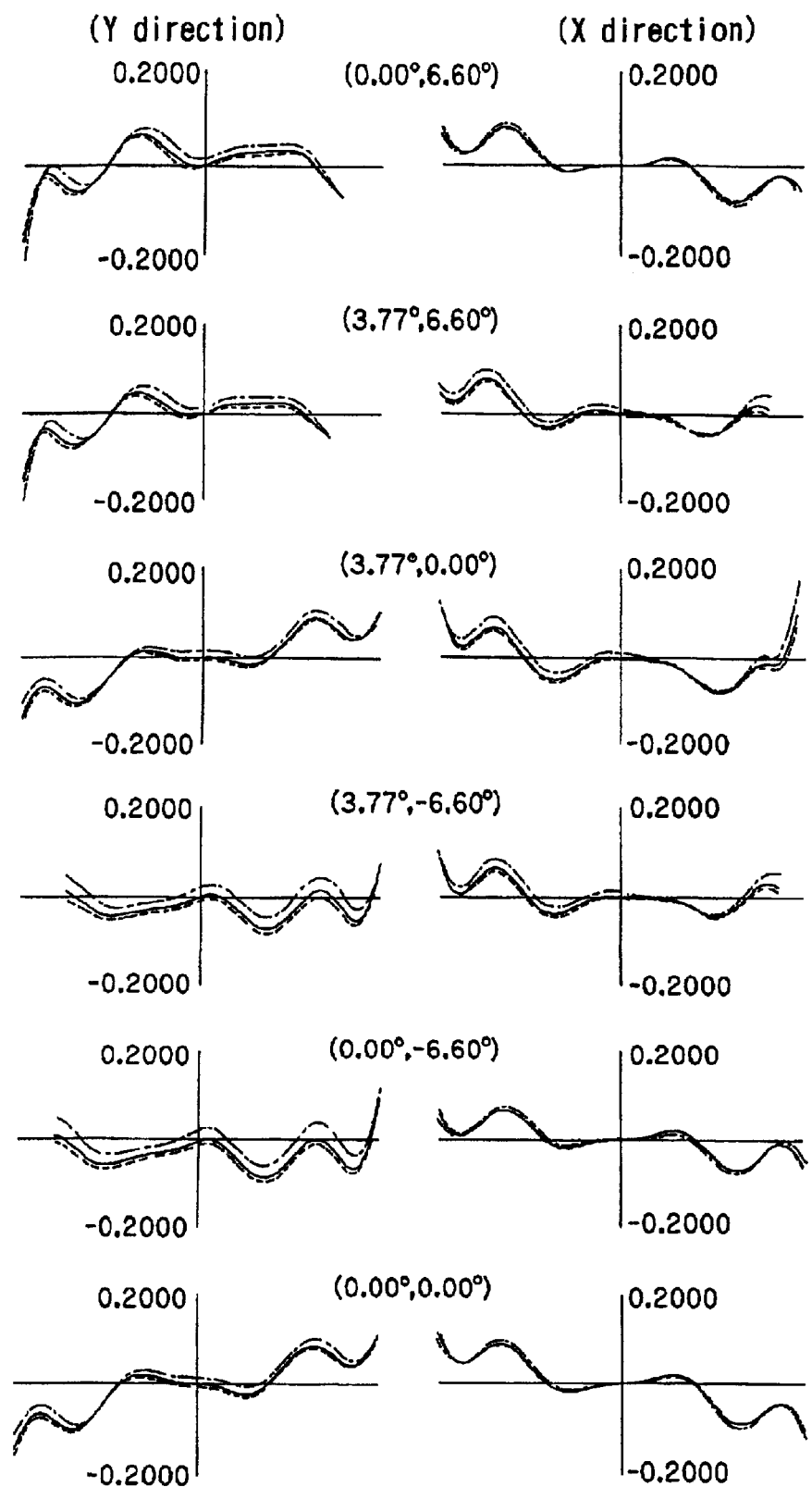
FIG. 22 is a transverse aberration diagram at the telephoto end of the real image type zoom finder according to Example 3 of the invention.
Figure 23:
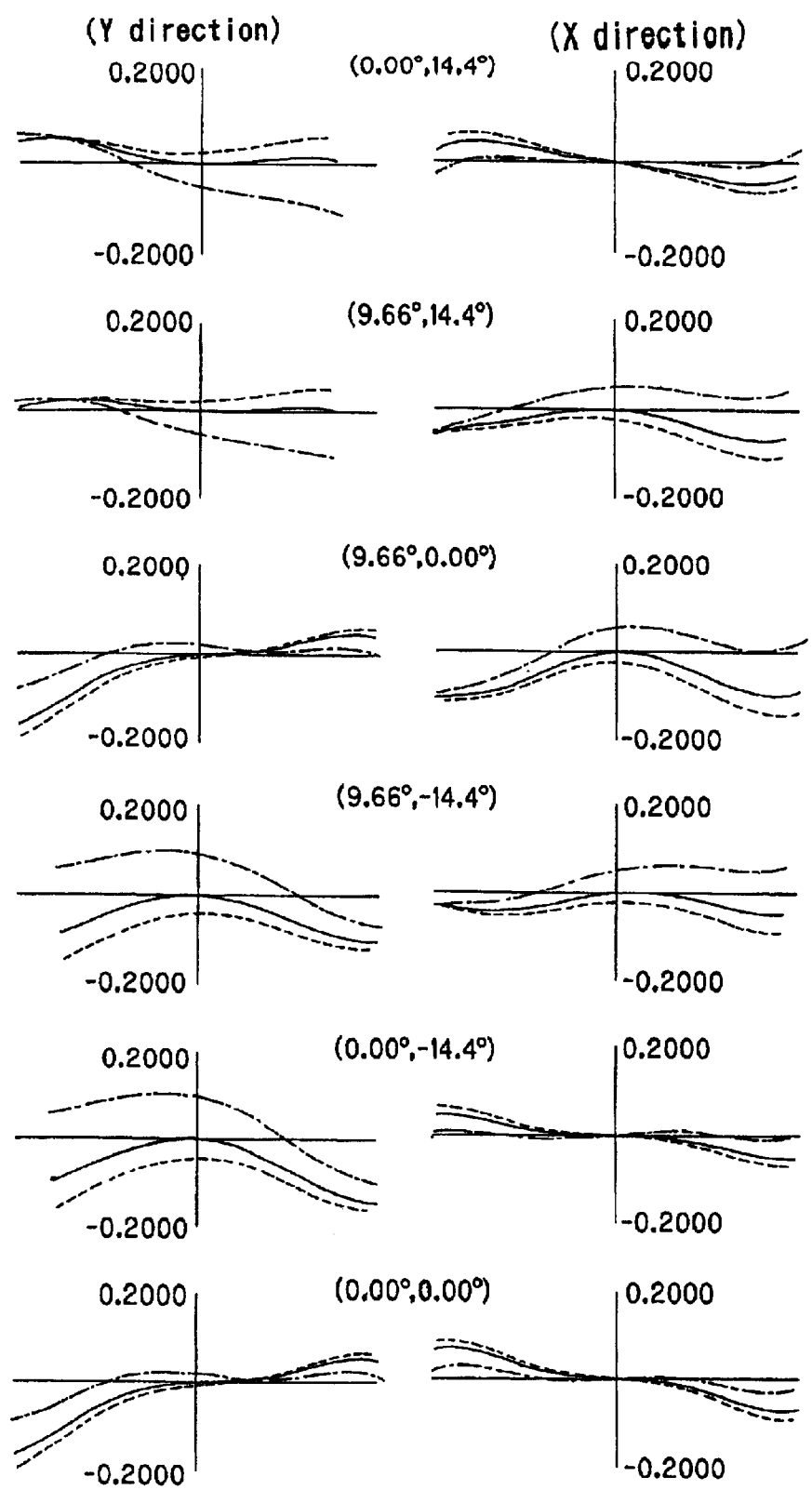
FIG. 23 is a transverse aberration diagram at the wide-angle end of the real image type zoom finder according to Example 4 of the invention.
Figure 24:
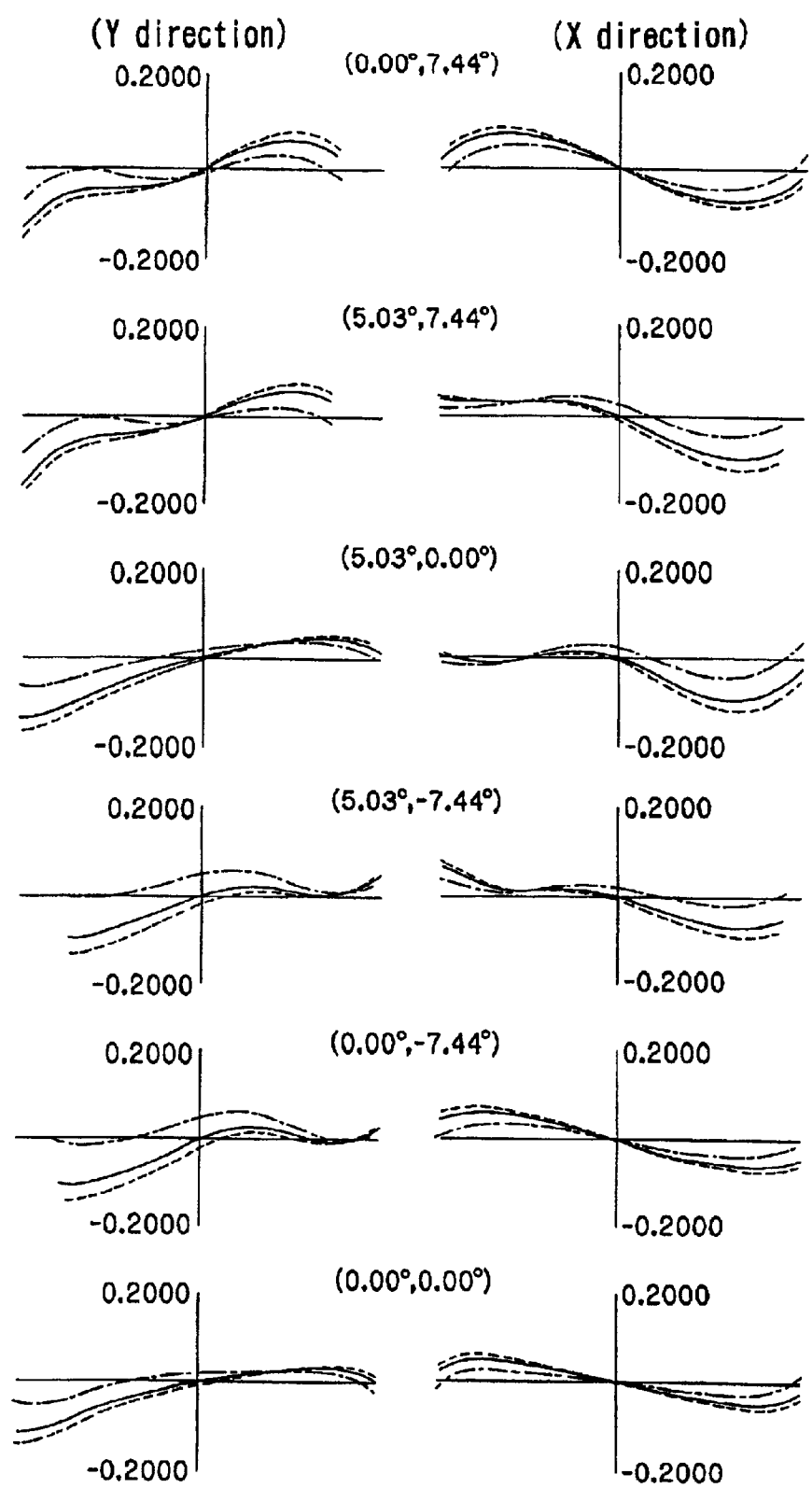
FIG. 24 is a transverse aberration diagram in the standard state of the real image type zoom finder according to Example 4 of the invention.
Figure 25:
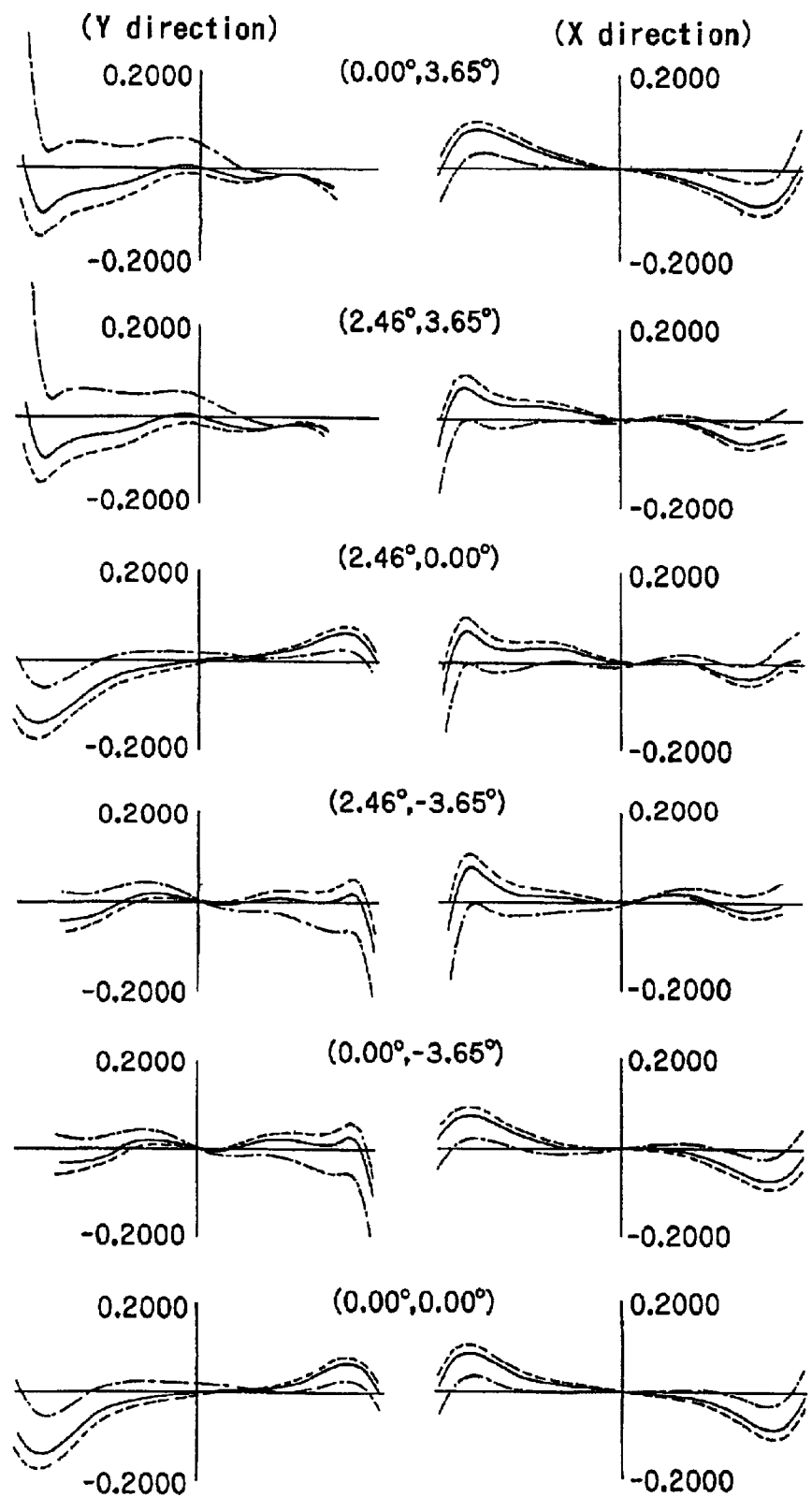
FIG. 25 is a transverse aberration diagram at the telephoto end of the real image type zoom finder according to Example 4 of the invention.

Y-Z sectional views of the real image type zoom finder according to Example 4 including an axial chief ray 1 are given in FIGS. 11 to 13 showing the zoom finder at the wide-angle end, in the standard state and at the telephoto end, respectively.

In Example 4, the X-direction half angle of view is 13.66°~7.16° ~3.510°, the Y-direction half angle of view is 19.84°~10.57° ~5.20°, the pupil diameter is φ4 mm, the intermediate image size is 2.90×4.40 mm (the diagonal size is 5.26 mm and the maximum image height 2.63 mm), and the finder magnification is 0.43~0.61~0.99. When calculated as the focal length of a rotationally symmetric optical system, the objective optical system has a focal length of 6.13~13.70~30.63 mm and the eyepiece optical system has a focal length of 14.12 mm.

The real image type zoom finder of Example 4 is made up of, in ray propagation order from its object side, a first lens group G1 of the fixed type consisting of a double-convex positive lens having a rotationally symmetric aspheric surface on its image side, a second lens group G2 of the moving type consisting of a double-concave negative lens having a rotationally symmetric aspheric surface on its pupil side, a third lens group G3 of the moving type consisting of a negative meniscus lens having a rotationally symmetric aspheric surface on its object side and convex on its pupil side, a fourth lens group G4 of the fixed type consisting of a double-convex positive lens having rotationally symmetric aspheric surfaces on both its sides, an objective optical system Ob composed of a first prism P1 consisting of a first transmitting surface 11 of positive power, a first reflecting surface 12 of positive power, a second reflecting surface 13 of positive power in the X direction and negative power in the Y direction, a third reflecting surface 14 formed of a room surface and a second transmitting surface 15 of positive power in the X direction and negative power in the Y direction, a field mask M for defining the range of the field of view, and an eyepiece optical system Ep composed of a second prism P2 consisting of a first transmitting surface 21 having a positive and negative action, a first reflecting surface 22 of negative power, a second reflecting surface 23 of positive power and a second transmitting surface 24 of negative power, and having a generally positive power. Throughout FIGS. 11 to 13, EP represents an exit pupil (corresponding to a stop in the numerical data). It is noted that the second transmitting surface 15 and the second reflecting surface 13 in the first prism P1, and the second transmitting surface 24 and the first reflecting surface 22 in the second prism P2 are composed of surfaces having the same optical action comprising a combined transmitting and reflecting action. The first transmitting surface 11, the first reflecting surface 12 and the second reflecting surface 13 (=the second transmitting surface 15) in the first prism P1, and the first transmitting surface 21, the first reflecting surface 22 (=the second transmitting surface 24) and the second reflecting surface 23 in the second prism P2 are all formed of free-form surfaces.

In this example, the third reflecting surface formed of a roof surface in the first prism P1 is provided in a plane form; however, it may be defined by an aspheric or free-form surface.

Regarding the numerical data given later, it is noted that the amount of decentration is given on the basis of a reference surface 1 for the 10th to 14th surfaces, and a reference surface 2 for 16th to 20th surfaces, and an image plane I is vertical (to the Z axis.

Set out below are the constituting parameters for Examples 1 to 4. In what follows, "FAS", "ASS", "RP", "HRP", "RE", "FS" and "FM" represent a free-form surface, an aspheric surface, a reference plane, a virtual plane, a reflecting surface, a flare stop and a field mask, respectively. Regarding the zooming space, "WE", "ST" and "TE" stand for a wide-angle end, a standard state and a telephoto end, respectively.

Example 1

| Surface No. | Radius of curvature | Surface separation | Displacement and tilt | Refractive index | Abbe's No. |
|---|---|---|---|---|---|
| Object plane | ∞ | 3000.000 | | | |
| 1 | −34.1181 | 0.700 | | 1.5842 | 30.5 |
| 2 | ASS ① | $d_1$ | | | |
| 3 | ASS ② | 3.150 | | 1.5254 | 55.8 |
| 4 | ASS ③ | 0.700 | | | |
| 5 | ∞ (FS) | $d_2$ | | | |
| 6 | ASS ④ | 0.700 | | 1.5842 | 30.5 |
| 7 | ASS ⑤ | $d_3$ | | | |
| 8 | ASS ⑥ (RP 1) | | | 1.5254 | 55.8 |
| 9 | ∞ (RE) | | (1) | 1.5254 | 55.8 |
| 10 | ASS ⑦ | | (2) | | |
| 11 | ASS ⑧ | | (3) | 1.5254 | 55.8 |
| 12 | ∞ (RE) | | (4) | 1.5254 | 55.8 |
| 13 | ∞ (RE) | | (5) | 1.5254 | 55.8 |
| 14 | ∞ | | (4) | | |
| 15 | ∞ (RP 1, FM) | | (6) | | |
| 16 | FFS ① | | (7) | 1.5254 | 55.8 |
| 17 | FFS ② (RE) | | (8) | 1.5254 | 55.8 |
| 18 | FFS ③ (RE) | | (9) | 1.5254 | 55.8 |
| 19 | FFS ② | | (8) | | |
| 20 | ∞ (Stop) | 31.623 | (10) | | |
| 21 | ∞ | 32.623 | | | |
| Image plane | ∞ | | | | |

ASS ①

| R | 5.5315 |
|---|---|
| K | 0.0000 |
| A | −1.2442 × 10$^{-3}$ |
| B | −1.0111 × 10$^{-5}$ |
| C | −6.2942 × 10$^{-7}$ |
| D | 1.7545 × 10$^{-8}$ |

ASS ②

| R | 4.8556 |
|---|---|
| K | −4.1046 |
| A | 3.3305 × 10$^{-3}$ |
| B | −2.6057 × 10$^{-4}$ |
| C | 1.2644 × 10$^{-5}$ |
| D | −2.7973 × 10$^{-7}$ |

ASS ③

| R | −8.0720 |
|---|---|
| K | 0.0000 |
| A | 1.4412 × 10$^{-3}$ |
| B | −1.2127 × 10$^{-4}$ |
| C | 8.0639 × 10$^{-6}$ |
| D | −2.1715 × 10$^{-7}$ |

ASS ④

| R | −2.6654 |
|---|---|
| K | 0.0000 |
| A | 4.4688 × 10$^{-2}$ |
| B | −9.8426 × 10$^{-3}$ |
| C | 1.6876 × 10$^{-3}$ |
| D | −9.8628 × 10$^{-5}$ |

ASS ⑤

| R | −85.9352 |
|---|---|
| K | 0.0000 |
| A | 2.8361 × 10$^{-2}$ |
| B | −5.9309 × 10$^{-3}$ |
| C | 5.6479 × 10$^{-4}$ |

ASS ⑥

| R | 4.2881 |
|---|---|
| K | 0.0000 |
| A | −1.6714 × 10$^{-3}$ |
| B | 5.1605 × 10$^{-4}$ |
| C | −5.3619 × 10$^{-5}$ |

ASS ⑦

| R | −2.4584 |
|---|---|

-continued

| | | | | | |
|---|---|---|---|---|---|
| K | −2.7145 | | | | |
| A | $1.1865 \times 10^{-2}$ | | | | |
| B | $6.6140 \times 10^{-4}$ | | | | |
| ASS ⑧ | | | | | |
| R | −2.3646 | | | | |
| K | $-3.1120 \times 10^{-1}$ | | | | |
| A | $4.7317 \times 10^{-2}$ | | | | |
| B | $-3.6651 \times 10^{-3}$ | | | | |
| C | $3.1872 \times 10^{-4}$ | | | | |
| FFS ① | | | | | |
| $C_4$ | $2.0881 \times 10^{-4}$ | $C_6$ | $5.4010 \times 10^{-2}$ | $C_8$ | $-2.2942 \times 10^{-3}$ |
| $C_{10}$ | $-2.1754 \times 10^{-3}$ | $C_{11}$ | $1.0517 \times 10^{-5}$ | $C_{13}$ | $-1.1277 \times 10^{-4}$ |
| $C_{15}$ | $-1.5321 \times 10^{-4}$ | $C_{17}$ | $5.6094 \times 10^{-4}$ | $C_{19}$ | $3.3202 \times 10^{-5}$ |
| FFS ② | | | | | |
| $C_4$ | $1.2971 \times 10^{-2}$ | $C_6$ | $1.7271 \times 10^{-3}$ | $C_8$ | $2.3599 \times 10^{-4}$ |
| $C_{10}$ | $-1.2559 \times 10^{-5}$ | $C_{11}$ | $6.0682 \times 10^{-5}$ | $C_{13}$ | $6.3879 \times 10^{-5}$ |
| $C_{15}$ | $3.1335 \times 10^{-5}$ | | | | |
| FFS ③ | | | | | |
| $C_4$ | $1.9439 \times 10^{-2}$ | $C_6$ | $1.3742 \times 10^{-2}$ | $C_8$ | $1.5368 \times 10^{-4}$ |
| $C_{10}$ | $-1.0295 \times 10^{-4}$ | $C_{11}$ | $1.5637 \times 10^{-5}$ | $C_{13}$ | $2.8654 \times 10^{-5}$ |
| $C_{15}$ | $6.7700 \times 10^{-6}$ | $C_{17}$ | $-8.3095 \times 10^{-7}$ | $C_{19}$ | $1.1432 \times 10^{-6}$ |
| $C_{21}$ | $1.1818 \times 10^{-6}$ | | | | |

| Displacement and tilt (1) | | | | | |
|---|---|---|---|---|---|
| X | 0.000 | Y | 0.000 | Z | 3.150 |
| α | −38.000 | β | 0.000 | γ | 0.000 |

| Displacement and tilt (2) | | | | | |
|---|---|---|---|---|---|
| X | 0.000 | Y | 3.056 | Z | 2.388 |
| α | 104.000 | β | 0.000 | γ | 0.000 |

| Displacement and tilt (3) | | | | | |
|---|---|---|---|---|---|
| X | 0.000 | Y | 3.736 | Z | 2.219 |
| α | 104.000 | β | 0.000 | γ | 0.000 |

| Displacement and tilt (4) | | | | | |
|---|---|---|---|---|---|
| X | 0.000 | Y | 7.098 | Z | 1.398 |
| α | 45.000 | β | 0.000 | γ | 0.000 |

| Displacement and tilt (5) | | | | | |
|---|---|---|---|---|---|
| X | 0.000 | Y | 8.110 | Z | −2.677 |
| α | 15.500 | β | 0.000 | γ | 0.000 |

| Displacement and tilt (6) | | | | | |
|---|---|---|---|---|---|
| X | 0.000 | Y | 10.127 | Z | −0.659 |
| α | 45.000 | β | 0.000 | γ | 0.000 |

| Displacement and tilt (7) | | | | | |
|---|---|---|---|---|---|
| X | 0.000 | Y | −3.306 | Z | 4.955 |
| α | 36.984 | β | 0.000 | γ | 0.000 |

| Displacement and tilt (8) | | | | | |
|---|---|---|---|---|---|
| X | 0.000 | Y | 4.134 | Z | 12.104 |
| α | −43.948 | β | 0.000 | γ | 0.000 |

| Displacement and tilt (9) | | | | | |
|---|---|---|---|---|---|
| X | 0.000 | Y | 9.469 | Z | 10.152 |
| α | −69.542 | β | 0.000 | γ | 0.000 |

| Displacement and tilt (10) | | | | | |
|---|---|---|---|---|---|
| X | 0.000 | Y | −9.404 | Z | 28.641 |
| α | −43.594 | β | 0.000 | γ | 0.000 |

| Zooming Space | WE | ST | TE |
|---|---|---|---|
| $d_1$ | 5.4464 | 1.5052 | 0.7681 |
| $d_2$ | 0.3987 | 5.7848 | 8.5745 |
| $d_3$ | 4.5429 | 3.0980 | 1.0454 |

Example 2

| Surface No. | Radius of curvature | Surface separation | Displacement and tilt | Refractive index | Abbe's No. |
|---|---|---|---|---|---|
| Object plane | ∞ | 3000.000 | | | |
| 1 | 515.7701 | 1.000 | | 1.5842 | 30.5 |
| 2 | ASS ① | $d_1$ | | | |
| 3 | ASS ② | 4.310 | | 1.5254 | 55.8 |
| 4 | ASS ③ | $d_2$ | | | |
| 5 | ASS ④ | 1.000 | | 1.5842 | 30.3 |
| 6 | ASS ⑤ | $d_3$ | | | |
| 7 | 8.2037 (RP 1) | | | 1.5254 | 55.8 |
| 8 | ∞ (RE) | | (1) | 1.5254 | 55.8 |
| 9 | ASS ⑥ | | (2) | | |
| 10 | ASS ⑦ | | (3) | 1.5254 | 55.8 |
| 11 | ∞ (RE) | | (4) | 1.5254 | 55.8 |
| 12 | ∞ (RE) | | (5) | 1.5254 | 55.8 |
| 13 | ∞ | | (4) | | |
| 14 | ∞ (FM) | 2.230 | (6) | | |
| 15 | ∞ (HRP, RP 2) | | | | |
| 16 | FFS ① | | (7) | 1.5254 | 55.8 |
| 17 | FFS ② (RE) | | (8) | 1.5254 | 55.8 |
| 18 | FFS ③ (RE) | | (9) | 1.5254 | 55.8 |
| 19 | FFS ② | | (8) | | |
| 20 | ∞ (Stop) | 32.623 | (10) | | |
| 21 | ∞ | 31.123 | | | |
| Image plane | ∞ | | | | |

ASS ①

R      10.4365
K      −1.4510
A      −6.3541 × 10$^{-5}$
B      1.3560 × 10$^{-6}$
C      −5.3052 × 10$^{-9}$

ASS ②

R      10.5246
K      −3.0917 × 10$^{-1}$
A      −1.7129 × 10$^{-4}$
B      1.3538 × 10$^{-6}$
C      −1.2980 × 10$^{-8}$

ASS ③

R      −17.6999
K      5.1325 × 10$^{-1}$
A      7.6861 × 10$^{-5}$
B      7.9949 × 10$^{-7}$
C      −9.1585 × 10$^{-9}$

ASS ④

R      −9.7400
K      7.5379 × 10$^{-1}$
A      4.7154 × 10$^{-4}$
B      −4.3705 × 10$^{-5}$
C      2.6969 × 10$^{-6}$

ASS ⑤

R      7.7830
K      −1.6947
A      −3.7194 × 10$^{-4}$
B      2.3982 × 10$^{-5}$
C      −1.8737 × 10$^{-6}$

ASS ⑥

R      −1273.0059
K      0.0000
A      1.3485 × 10$^{-3}$
B      3.2247 × 10$^{-6}$
C      −2.1456 × 10$^{-7}$

ASS ⑦

R      11.0643
K      2.2528 × 10$^{-1}$
A      9.1630 × 10$^{-4}$
B      −1.8237 × 10$^{-5}$
C      8.9046 × 10$^{-8}$

-continued

FFS ①

| | | | | | |
|---|---|---|---|---|---|
| $C_4$ | $7.7967 \times 10^{-3}$ | $C_6$ | $1.1298 \times 10^{-2}$ | $C_8$ | $2.8069 \times 10^{-3}$ |
| $C_{10}$ | $-1.9209 \times 10^{-3}$ | $C_{11}$ | $-2.3470 \times 10^{-4}$ | $C_{13}$ | $-4.3695 \times 10^{-4}$ |
| $C_{15}$ | $9.4112 \times 10^{-5}$ | $C_{17}$ | $-5.5691 \times 10^{-5}$ | $C_{19}$ | $5.0658 \times 10^{-6}$ |

FFS ②

| | | | | | |
|---|---|---|---|---|---|
| $C_4$ | $4.5073 \times 10^{-3}$ | $C_6$ | $1.6534 \times 10^{-3}$ | $C_8$ | $3.6485 \times 10^{-5}$ |
| $C_{10}$ | $-7.6975 \times 10^{-5}$ | $C_{11}$ | $3.2200 \times 10^{-6}$ | $C_{13}$ | $-2.3693 \times 10^{-5}$ |
| $C_{15}$ | $4.0228 \times 10^{-6}$ | | | | |

FFS ③

| | | | | | |
|---|---|---|---|---|---|
| $C_4$ | $1.2566 \times 10^{-2}$ | $C_6$ | $1.0594 \times 10^{-2}$ | $C_8$ | $7.3118 \times 10^{-5}$ |
| $C_{10}$ | $-2.6109 \times 10^{-5}$ | $C_{11}$ | $4.2545 \times 10^{-6}$ | $C_{13}$ | $-7.4415 \times 10^{-6}$ |
| $C_{15}$ | $9.4402 \times 10^{-7}$ | $C_{17}$ | $5.4205 \times 10^{-7}$ | $C_{19}$ | $-1.6276 \times 10^{-6}$ |
| $C_{21}$ | $4.1319 \times 10^{-7}$ | | | | |

Displacement and tilt (1)

| X | 0.000 | Y | 0.000 | Z | 6.000 |
|---|---|---|---|---|---|
| α | −38.000 | β | 0.000 | γ | 0.000 |

Displacement and tilt (2)

| X | 0.000 | Y | 5.822 | Z | 4.550 |
|---|---|---|---|---|---|
| α | 104.000 | β | 0.000 | γ | 0.000 |

Displacement and tilt (3)

| X | 0.000 | Y | 6.307 | Z | 4.429 |
|---|---|---|---|---|---|
| α | 104.000 | β | 0.000 | γ | 0.000 |

Displacement and tilt (4)

| X | 0.000 | Y | 13.099 | Z | 2.736 |
|---|---|---|---|---|---|
| α | 55.500 | β | 0.000 | γ | 0.000 |

Displacement and tilt (5)

| X | 0.000 | Y | 11.964 | Z | −6.515 |
|---|---|---|---|---|---|
| α | 31.250 | β | 0.000 | γ | 0.000 |

Displacement and tilt (6)

| X | 0.000 | Y | 17.053 | Z | −3.018 |
|---|---|---|---|---|---|
| α | 55.500 | β | 0.000 | γ | 0.000 |

Displacement and tilt (7)

| X | 0.000 | Y | −2.433 | Z | 4.449 |
|---|---|---|---|---|---|
| α | 26.104 | β | 0.000 | γ | 0.000 |

Displacement and tilt (8)

| X | 0.000 | Y | 2.556 | Z | 13.889 |
|---|---|---|---|---|---|
| α | −39.871 | β | 0.000 | γ | 0.000 |

Displacement and tilt (9)

| X | 0.000 | Y | 10.785 | Z | 12.955 |
|---|---|---|---|---|---|
| α | −69.260 | β | 0.000 | γ | 0.000 |

Displacement and tilt (10)

| X | 0.000 | Y | −11.808 | Z | 29.040 |
|---|---|---|---|---|---|
| α | −55.440 | β | 0.000 | γ | 0.000 |

| Zooming Space | WE | ST | TE |
|---|---|---|---|
| $d_1$ | 13.2575 | 8.8828 | 4.7153 |
| $d_2$ | 1.3095 | 7.7569 | 15.0162 |
| $d_3$ | 6.1330 | 4.0603 | 0.9685 |

Example 3

| Surface No. | Radius of curvature | Surface separation | Displacement and tilt | Refractive index | Abbe's No. |
|---|---|---|---|---|---|
| Object plane | ∞ | 3000.000 | | | |
| 1 | −10.5156 | 0.700 | | 1.5842 | 30.5 |
| 2 | ASS ① | $d_1$ | | | |

-continued

| | | | | | |
|---|---|---|---|---|---|
| 3 | ASS ② | 1.400 | | 1.4924 | 57.6 |
| 4 | 34.3296 | $d_2$ | | | |
| 5 | ASS ③ | 2.100 | | 1.4924 | 57.6 |
| 6 | ASS ④ | $d_3$ | | | |
| 7 | ASS ⑤ (RP 1) | | | 1.5254 | 55.8 |
| 8 | ∞ (RE) | | (1) | 1.5254 | 55.8 |
| 9 | ∞ (RE) | | (2) | 1.5254 | 55.8 |
| 10 | ∞ (RE) | | (3) | 1.5254 | 55.8 |
| 11 | ∞ | | (2) | | |
| 12 | ∞ (HRP) | 1.050 | (4) | | |
| 13 | ∞ (RP 2, FM) | | | | |
| 14 | FFS ① | | (5) | 1.5254 | 55.8 |
| 15 | FFS ② (RE) | | (6) | 1.5254 | 55.8 |
| 16 | FFS ③ (RE) | | (7) | 1.5254 | 55.8 |
| 17 | FFS ② | | (6) | | |
| 18 | ∞ (Stop) | 31.623 | (8) | | |
| 19 | ∞ | 32.123 | | | |
| Image plane | ∞ | | | | |

ASS ①

| | |
|---|---|
| R | 5.3473 |
| K | $-3.3934 \times 10^{+1}$ |
| A | $1.8172 \times 10^{-2}$ |
| B | $-3.8649 \times 10^{-3}$ |
| C | $4.5985 \times 10^{-4}$ |
| D | $-2.1821 \times 10^{-5}$ |

ASS ②

| | |
|---|---|
| R | 7.0736 |
| K | $8.8664 \times 10^{-1}$ |
| A | $-2.0726 \times 10^{-3}$ |
| B | $4.1155 \times 10^{-4}$ |
| C | $-6.2914 \times 10^{-5}$ |
| D | $3.2841 \times 10^{-6}$ |

ASS ③

| | |
|---|---|
| R | 6.0466 |
| K | $-1.7068 \times 10^{-1}$ |
| A | $-6.1301 \times 10^{-5}$ |
| B | $-3.3624 \times 10^{-5}$ |
| C | $-4.4993 \times 10^{-6}$ |
| D | $1.2315 \times 10^{-7}$ |

ASS ④

| | |
|---|---|
| R | −6.5028 |
| K | $-3.9392 \times 10^{-1}$ |
| A | $2.6168 \times 10^{-3}$ |
| B | $-3.5863 \times 10^{-4}$ |
| C | $3.5428 \times 10^{-5}$ |
| D | $-1.6141 \times 10^{-6}$ |

ASS ⑤

| | |
|---|---|
| R | −14.5037 |
| K | 7.6696 |
| A | $-6.9862 \times 10^{-4}$ |
| B | $2.0942 \times 10^{-4}$ |
| C | $-3.5573 \times 10^{-5}$ |

FFS ①

| | | | | | |
|---|---|---|---|---|---|
| $C_4$ | $-1.1671 \times 10^{-2}$ | $C_6$ | $5.2231 \times 10^{-2}$ | $C_8$ | $-7.1371 \times 10^{-4}$ |
| $C_{10}$ | $7.6824 \times 10^{-4}$ | $C_{11}$ | $7.4037 \times 10^{-4}$ | $C_{13}$ | $1.1806 \times 10^{-3}$ |
| $C_{15}$ | $-6.2966 \times 10^{-4}$ | $C_{17}$ | $2.8584 \times 10^{-4}$ | $C_{19}$ | $-1.9403 \times 10^{-4}$ |
| $C_{21}$ | $1.6938 \times 10^{-5}$ | | | | |

FFS ②

| | | | | | |
|---|---|---|---|---|---|
| $C_4$ | $1.4879 \times 10^{-2}$ | $C_6$ | $6.1261 \times 10^{-3}$ | $C_8$ | $-1.3205 \times 10^{-3}$ |
| $C_{10}$ | $-6.7523 \times 10^{-4}$ | $C_{11}$ | $1.7792 \times 10^{-5}$ | $C_{13}$ | $3.6047 \times 10^{-5}$ |
| $C_{15}$ | $2.4007 \times 10^{-5}$ | | | | |

FFS ③

| | | | | | |
|---|---|---|---|---|---|
| $C_4$ | $2.0009 \times 10^{-2}$ | $C_6$ | $1.5352 \times 10^{-2}$ | $C_8$ | $-2.9204 \times 10^{-4}$ |
| $C_{10}$ | $-1.3431 \times 10^{-4}$ | $C_{11}$ | $7.8462 \times 10^{-6}$ | $C_{13}$ | $2.6420 \times 10^{-6}$ |
| $C_{15}$ | $-8.4258 \times 10^{-6}$ | $C_{17}$ | $-2.4200 \times 10^{-8}$ | $C_{19}$ | $-6.5814 \times 10^{-7}$ |
| $C_{21}$ | $1.1105 \times 10^{-7}$ | | | | |

-continued

|   | Displacement and tilt (1) |   |   |   |   |
|---|---|---|---|---|---|
| X | 0.000 | Y | 0.000 | Z | 2.800 |
| α | −38.000 | β | 0.000 | γ | 0.000 |
|   | Displacement and tilt (2) |   |   |   |   |
| X | 0.000 | Y | 5.129 | Z | 1.521 |
| α | 45.000 | β | 0.000 | γ | 0.000 |
|   | Displacement and tilt (3) |   |   |   |   |
| X | 0.000 | Y | 6.076 | Z | −2.278 |
| α | 15.500 | β | 0.000 | γ | 0.000 |
|   | Displacement and tilt (4) |   |   |   |   |
| X | 0.000 | Y | 7.477 | Z | −0.827 |
| α | 45.000 | β | 0.000 | γ | 0.000 |
|   | Displacement and tilt (5) |   |   |   |   |
| X | 0.000 | Y | −3.427 | Z | 4.546 |
| α | 36.301 | β | 0.000 | γ | 0.000 |
|   | Displacement and tilt (6) |   |   |   |   |
| X | 0.000 | Y | 1.099 | Z | 9.210 |
| α | −45.616 | β | 0.000 | γ | 0.000 |
|   | Displacement and tilt (7) |   |   |   |   |
| X | 0.000 | Y | 8.096 | Z | 8.500 |
| α | −69.014 | β | 0.000 | γ | 0.000 |
|   | Displacement and tilt (8) |   |   |   |   |
| X | 0.000 | Y | −12.712 | Z | 30.979 |
| α | −45.000 | β | 0.000 | γ | 0.000 |

| Zooming Space | WE | ST | TE |
|---|---|---|---|
| $d_1$ | 4.3515 | 1.7646 | 0.7863 |
| $d_2$ | 2.0355 | 2.7203 | 0.5383 |
| $d_3$ | 0.7000 | 2.6021 | 5.7624 |

Example 4

| Surface No. | Radius of curvature | Surface separation | Displacement and tilt | Refractive index | Abbe's No. |
|---|---|---|---|---|---|
| Object plane | ∞ | 3000.000 |   |   |   |
| 1 | 8.6828 | 2.135 |   | 1.5254 | 55.8 |
| 2 | ASS ① | $d_1$ |   |   |   |
| 3 | −6.4453 | 0.560 |   | 1.5842 | 30.5 |
| 4 | ASS ② | $d_2$ |   |   |   |
| 5 | ASS ③ | 0.560 |   | 1.4923 | 57.8 |
| 6 | −10.4378 | $d_3$ |   |   |   |
| 7 | ASS ④ | 2.100 |   | 1.5254 | 55.8 |
| 8 | ASS ⑤ | 0.210 |   |   |   |
| 9 | FFS ① (RP 1) |   |   | 1.5254 | 55.8 |
| 10 | FFS ② (RE) |   | (1) | 1.5254 | 55.8 |
| 11 | FFS ③ (RE) |   | (2) | 1.5254 | 55.8 |
| 12 | ∞ (RE) |   | (3) | 1.5254 | 55.8 |
| 13 | FFS ③ |   | (2) |   |   |
| 14 | ∞ (HRP) | 1.050 | (4) |   |   |
| 15 | ∞ (RP 2, FM) |   |   |   |   |
| 16 | FFS ④ |   | (5) | 1.5254 | 55.8 |
| 17 | FFS ⑤ (RE) |   | (6) | 1.5254 | 55.8 |
| 18 | FFS ⑥ (RE) |   | (7) | 1.5254 | 55.8 |
| 19 | FFS ⑤ |   | (6) |   |   |
| 20 | ∞ (Stop) | 31.623 | (8) |   |   |
| 21 | ∞ | 32.123 |   |   |   |
| Image plane | ∞ |   |   |   |   |

ASS ①

R   −11.0433
K   −1.9215 × 10$^{+1}$

-continued

| | |
|---|---|
| A | $-5.0389 \times 10^{-4}$ |
| B | $3.2947 \times 10^{-5}$ |
| C | $-5.6026 \times 10^{-7}$ |
| D | $-1.4257 \times 10^{-8}$ |

ASS ②

| | |
|---|---|
| R | 3.8945 |
| K | $-3.6338$ |
| A | $-5.2560 \times 10^{-3}$ |
| B | $1.7240 \times 10^{-3}$ |
| C | $-7.0907 \times 10^{-4}$ |
| D | $8.0072 \times 10^{-5}$ |

ASS ③

| | |
|---|---|
| R | $-3.7565$ |
| K | $4.5341 \times 10^{-1}$ |
| A | $2.4896 \times 10^{-3}$ |
| B | $-1.8064 \times 10^{-3}$ |
| C | $4.7942 \times 10^{-4}$ |
| D | $-6.2070 \times 10^{-5}$ |

ASS ④

| | |
|---|---|
| R | 8.5611 |
| K | $-6.5183$ |
| A | $-2.3970 \times 10^{-3}$ |
| B | $-2.3308 \times 10^{-4}$ |
| C | $2.1005 \times 10^{-5}$ |
| D | $-9.6241 \times 10^{-7}$ |

ASS ⑤

| | |
|---|---|
| R | $-4.7696$ |
| K | $-7.4487 \times 10^{-1}$ |
| A | $1.4348 \times 10^{-3}$ |
| B | $-3.4222 \times 10^{-4}$ |
| C | $2.3753 \times 10^{-5}$ |
| D | $-1.0605 \times 10^{-6}$ |

FFS ①

| | | | | | |
|---|---|---|---|---|---|
| $C_4$ | $-1.8916 \times 10^{-2}$ | $C_6$ | $-1.4868 \times 10^{-2}$ | $C_8$ | $-6.0549 \times 10^{-5}$ |
| $C_{10}$ | $-1.0763 \times 10^{-4}$ | $C_{11}$ | $2.7169 \times 10^{-3}$ | $C_{13}$ | $4.7139 \times 10^{-3}$ |
| $C_{15}$ | $2.6769 \times 10^{-3}$ | | | | |

FFS ②

| | | | | | |
|---|---|---|---|---|---|
| $C_4$ | $-2.1554 \times 10^{-3}$ | $C_6$ | $-8.7407 \times 10^{-4}$ | $C_8$ | $-3.5501 \times 10^{-5}$ |
| $C_{10}$ | $-9.5181 \times 10^{-5}$ | $C_{11}$ | $1.0783 \times 10^{-4}$ | $C_{13}$ | $3.3696 \times 10^{-5}$ |
| $C_{15}$ | $2.6417 \times 10^{-5}$ | | | | |

FFS ③

| | | | | | |
|---|---|---|---|---|---|
| $C_4$ | $-1.5112 \times 10^{-3}$ | $C_6$ | $1.2410 \times 10^{-4}$ | $C_8$ | $-3.4154 \times 10^{-5}$ |
| $C_{10}$ | $-4.9501 \times 10^{-5}$ | $C_{11}$ | $6.2850 \times 10^{-5}$ | $C_{13}$ | $7.8011 \times 10^{-6}$ |
| $C_{15}$ | $8.5097 \times 10^{-6}$ | | | | |

FFS ④

| | | | | | |
|---|---|---|---|---|---|
| $C_4$ | $-1.5817 \times 10^{-2}$ | $C_6$ | $5.8837 \times 10^{-2}$ | $C_8$ | $-3.3444 \times 10^{-3}$ |
| $C_{10}$ | $-6.0309 \times 10^{-3}$ | $C_{11}$ | $-2.1897 \times 10^{-3}$ | $C_{13}$ | $1.5343 \times 10^{-3}$ |
| $C_{15}$ | $7.3239 \times 10^{-5}$ | $C_{17}$ | $6.2760 \times 10^{-4}$ | $C_{19}$ | $-2.2020 \times 10^{-4}$ |

FFS ⑤

| | | | | | |
|---|---|---|---|---|---|
| $C_4$ | $1.6235 \times 10^{-2}$ | $C_6$ | $6.9315 \times 10^{-3}$ | $C_8$ | $-1.0942 \times 10^{-3}$ |
| $C_{10}$ | $-6.4406 \times 10^{-4}$ | $C_{11}$ | $-1.9267 \times 10^{-5}$ | $C_{13}$ | $2.7272 \times 10^{-5}$ |
| $C_{15}$ | $2.3904 \times 10^{-5}$ | | | | |

FFS ⑥

| | | | | | |
|---|---|---|---|---|---|
| $C_4$ | $2.2555 \times 10^{-2}$ | $C_6$ | $1.7891 \times 10^{-2}$ | $C_8$ | $-2.3965 \times 10^{-4}$ |
| $C_{10}$ | $-1.1081 \times 10^{-4}$ | $C_{11}$ | $1.4021 \times 10^{-5}$ | $C_{13}$ | $8.0348 \times 10^{-6}$ |
| $C_{15}$ | $-6.4654 \times 10^{-6}$ | $C_{17}$ | $-2.3714 \times 10^{-6}$ | $C_{19}$ | $-5.3377 \times 10^{-7}$ |
| $C_{21}$ | $-5.8110 \times 10^{-8}$ | | | | |

| Displacement and tilt (1) | | | | | |
|---|---|---|---|---|---|
| X | 0.000 | Y | 0.000 | Z | 3.867 |
| α | $-38.000$ | β | 0.000 | γ | 0.000 |

| Displacement and tilt (2) | | | | | |
|---|---|---|---|---|---|
| X | 0.000 | Y | 6.501 | Z | 2.243 |
| α | 44.949 | β | 0.000 | γ | 0.000 |

-continued

|   | Displacement and tilt (3) |   |   |   |   |
|---|---|---|---|---|---|
| X | 0.000 | Y | 7.905 | Z | −3.354 |
| α | 15.497 | β | 0.000 | γ | 0.000 |
|   | Displacement and tilt (4) |   |   |   |   |
| X | 0.000 | Y | 10.009 | Z | −1.256 |
| α | 45.203 | β | 0.000 | γ | 0.000 |
|   | Displacement and tilt (5) |   |   |   |   |
| X | 0.000 | Y | −2.880 | Z | 4.596 |
| α | 29.376 | β | 0.000 | γ | 0.000 |
|   | Displacement and tilt (6) |   |   |   |   |
| X | 0.000 | Y | 1.453 | Z | 9.679 |
| α | −47.200 | β | 0.000 | γ | 0.000 |
|   | Displacement and tilt (7) |   |   |   |   |
| X | 0.000 | Y | 6.658 | Z | 7.955 |
| α | −68.719 | β | 0.000 | γ | 0.000 |
|   | Displacement and tilt (8) |   |   |   |   |
| X | 0.000 | Y | −11.251 | Z | 27.845 |
| α | −45.513 | β | 0.000 | γ | 0.000 |

| Zooming Space | WE | ST | TE |
|---|---|---|---|
| $d_1$ | 0.5110 | 2.8050 | 4.1916 |
| $d_2$ | 2.0398 | 0.9800 | 2.9204 |
| $d_3$ | 5.0442 | 3.8100 | 0.4830 |

FIGS. 14–16, FIGS. 17–19, FIGS. 20–22 and FIGS. 23–25 are transverse aberration diagrams for Examples 1, 2, 3 and 4, respectively. FIGS. 14, 17, 20 and 13 show transverse aberrations at the wide-angle ends, FIGS. 15, 18, 21 and 24 in the standard states, and FIGS. 16, 19, 22 and 25 at the telephoto ends. In these aberration diagrams, the bracketed figures indicate the angles of view (in the horizontal (X) and vertical (Y) directions), and represent transverse aberrations at those angles. More specifically, the diagrams show transverse aberrations as found at positions in order from below, i.e., the center of the screen, a position of—about 70% of the angle of view on the Y axis, a position of about 70% of the angle of view on the X direction and—about 70% of the angle of view on the Y axis, a position of about 70% of the angle of view in the X direction, a position of about 70% of the angle of view in the X direction and about 70% of the angle of view in the Y direction, and a position of about 70% of the angle of view on the Y axis.

Enumerated below are the values for conditions (1) to (14) in Examples 1 to 4.

|   |   | Example 1 | Example 2 |
|---|---|---|---|
|   | $d_{EP}/f_{OC}$ | 1.53 | 1.31 |
|   | $l_{OC}/f_{OC}$ | 1.16 | 1.21 |
|   | $f_w/f_{OC}$ | 0.41 | 0.49 |
|   | $Ih/f_{OC}$ | 0.18 | 0.31 |
| $(n' - n) \times (1/r - 1/r_{ASP}) \times f_{OC}$ |   |   |   |
|   | 1st surface | — | — |
|   | 2nd surface | −0.27 | −0.20 |
|   | 3rd surface | 0.35 | 0.17 |
|   | 4th surface | 0.16 | 0.10 |
|   | 5th surface | — | −0.08 |
|   | 6th surface | −1.50 | −0.21 |
|   | 7th surface | 1.19 | — |
|   | 8th surface | 0.05 | — |
|   | 9th surface | — | 0.71 |

-continued

|   |   | 10th surface | 3.48 |   | −0.21 |   |
|---|---|---|---|---|---|---|
|   |   | 11th surface | −3.41 |   | — |   |
|   |   | 12th surface | — |   | — |   |
|   |   | 13th surface | — |   | — |   |
|   |   | $f_w/f_{neg}$ | 0.77 |   | 1.03 |   |
|   |   | $|fN/fP|$ | 0.75 |   | 0.55 |   |
|   |   | $f_w/f_{pos}$ | — |   | — |   |
|   |   | $|fP/fN|$ | — |   | — |   |
|   |   | $|2n \cdot \tan\theta \cdot Ih/r|$ | X | Y | X | Y |
|   |   | 1st reflecting surface | 0.237 | 0.128 | 0.152 | 0.071 |
|   |   | 2nd reflecting surface | 0.131 | 0.092 | 0.133 | 0.113 |
| θ |   | 1st reflecting surface | 49.87° |   | 48.10° |   |
|   |   | 2nd reflecting surface | 24.14° |   | 18.90° |   |
| φ |   |   | 1.41° |   | 0.04° |   |
| α |   |   | 45° |   | 55° |   |
| $f_{OC}$ |   |   | 13.9 |   | 16.4 |   |
|   |   | $(d \cdot 1000)/f_{OC}^2$ | OS | ES | OS | ES |
|   |   |   | 3.56 | 16.56 | 8.29 | 12.34 |
|   |   | Ex1/Ey1 | 0.72 |   | 0.62 |   |
|   |   | Ex2/Ey2 | 0.80 |   | 0.69 |   |
|   |   | Ex3/Ey3 | 0.62 |   | 0.48 |   |
|   |   | Ex1 | 4.23 |   | 7.30 |   |
|   |   | Ey1 | 5.91 |   | 11.72 |   |
|   |   | Ex2 | 9.38 |   | 12.47 |   |
|   |   | Ey2 | 11.72 |   | 18.08 |   |
|   |   | Ex3 | 8.22 |   | 11.03 |   |
|   |   | Ey3 | 13.27 |   | 23.15 |   |

OS: objective side
ES: eyepiece side

|   |   | Example 3 | Example 4 |
|---|---|---|---|
|   | $d_{EP}/f_{OC}$ | 1.78 | 1.53 |
|   | $l_{OC}/f_{OC}$ | 1.09 | 1.01 |
|   | $f_w/f_{OC}$ | 0.43 | 0.44 |
|   | $Ih/f_{OC}$ | 0.19 | 0.19 |
| $(n' - n) \times (1/r - 1/r_{ASP}) \times f_{OC}$ |   |   |   |
|   | 1st Surface | — | — |
|   | 2nd Surface | −0.17 | −0.24 |
|   | 3rd Surface | 0.10 | — |
|   | 4th Surface | — | −1.16 |

-continued

|  |  |  | X | Y |
|---|---|---|---|---|
| 5th Surface | 0.19 |  |  | 0.22 |
| 6th Surface | 0.16 |  |  | — |
| 7th Surface | 0.08 |  |  | 0.78 |
| 8th Surface | — |  |  | 0.05 |
|  |  |  | X | Y |
| 9th Surface | — |  | 1.37 | 1.44 |
| 10th Surface | — |  | 0.20 | 0.25 |
| 11th Surface | — |  | 0.15 | −0.01 |
| 12th Surface | — |  | — | — |
| 13th Surface | — |  | 0.10 | 0.22 |
| $f_W/f_{neg}$ | — |  |  | 1.15 |
| $|fN/fP|$ | — |  |  | 0.42 |
| $f_W/f_{pos}$ | 1.37 |  |  | — |
| $|fP/fN|$ | 1.13 |  |  | — |
| $|2n \cdot \tan\theta \cdot Ih/r|$ | X | Y | X | Y |
| 1st reflecting surface | 0.329 | 0.154 | 0.367 | 0.199 |
| 2nd reflecting surface | 0.155 | 0.116 | 0.172 | 0.132 |
| θ 1st reflecting surface | 52.03° |  | 52.37° |  |
| 2nd reflecting surface | 25.77° |  | 25.84° |  |
| φ | 0° |  | 0.31° |  |
| α | 45° |  | 45.2° |  |
| $f_{OC}$ | 14.0 |  | 14.1 |  |
| $(d \cdot 1000)/f_{OC}^2$ | OS | ES | OS | ES |
|  | 5.33 | 14.43 | 5.97 | 17.16 |
| Ex1/Ey1 | 0.62 |  | 0.67 |  |
| Ex2/Ey2 | 0.69 |  | 0.75 |  |
| Ex3/Ey3 | 0.49 |  | 0.54 |  |
| Ex1 | 4.36 |  | 4.47 |  |
| Ey1 | 6.99 |  | 6.62 |  |
| Ex2 | 9.99 |  | 10.00 |  |
| Ey2 | 14.50 |  | 13.37 |  |
| Ex3 | 8.67 |  | 8.70 |  |
| Ey3 | 17.82 |  | 16.12 |  |

OS: objective side
ES: eyepiece side

Figure 26:
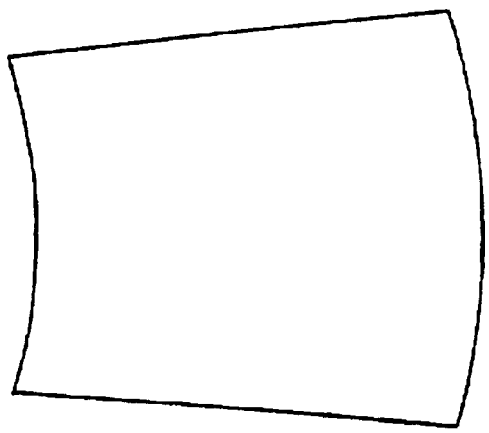
FIG. 26 is illustrative in schematic of distortion produced at the eyepiece optical system in the real image type zoom finder of the invention.
Figure 27:
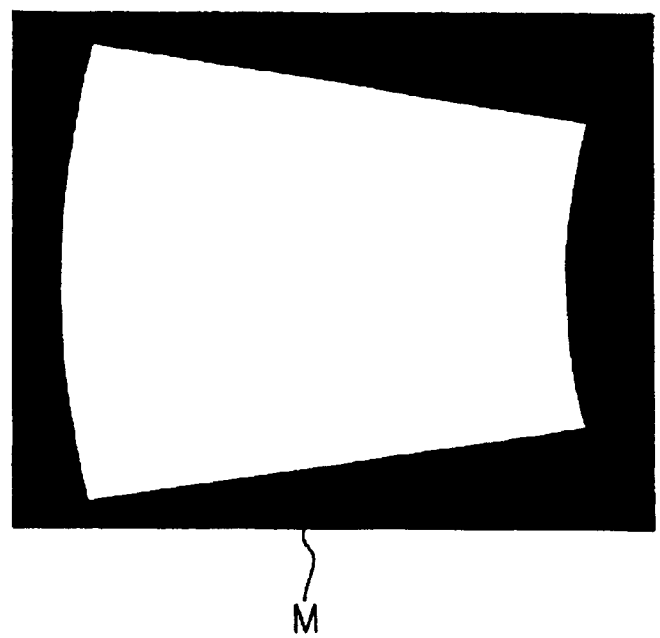
FIG. 27 is illustrative of the configuration of the field mask for making correction of the distortion of FIG. 26.

Here assume that when observed through the eyepiece optical system Ep using the (rectangular) field mask M of any one of Examples 1 to 4, the periphery of the field of view is looked as shown typically in FIG. 26. Then, distortion occurs, which is symmetrically decentered with respect to the whole symmetric plane of the eyepiece optical system Ep. As shown schematically in FIG. 26, assume that a fan form of distortion spreading on the right side is produced. To correct this, it is preferable to use, instead of the rectangular field frame, a fan form of field mask M of FIG. 27, which is bilaterally symmetrical with respect to the fan form of FIG. 26, because the distortion is canceled out by aberrations at the eyepiece optical system Ep, so that an image having a substantially rectangular contour can be observed to mitigate distortion in the periphery.

To reduce decentration aberration occurring at the eyepiece optical system Ep in each example, it is more preferable to allow the objective optical system Ob to produce opposite decentration aberration by itself, because distortion due to the decentration of the image itself under observation, too, can be corrected.

Figure 28:
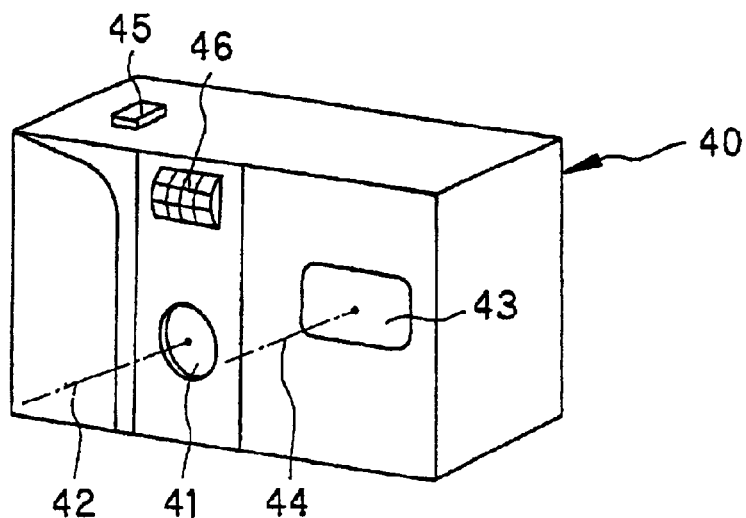
FIG. 28 is a front perspective view illustrative of the outside shape of a digital camera to which the real image type zoom finder of the invention is applied.
Figure 29:
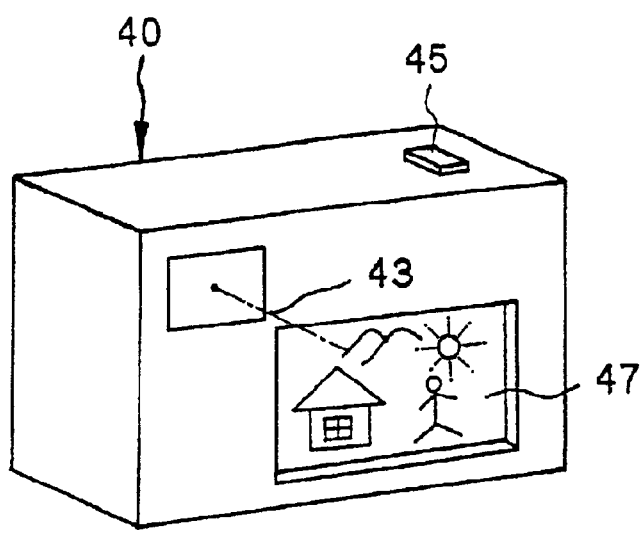
FIG. 29 is a rear perspective view of the digital camera of FIG. 28.
Figure 30:
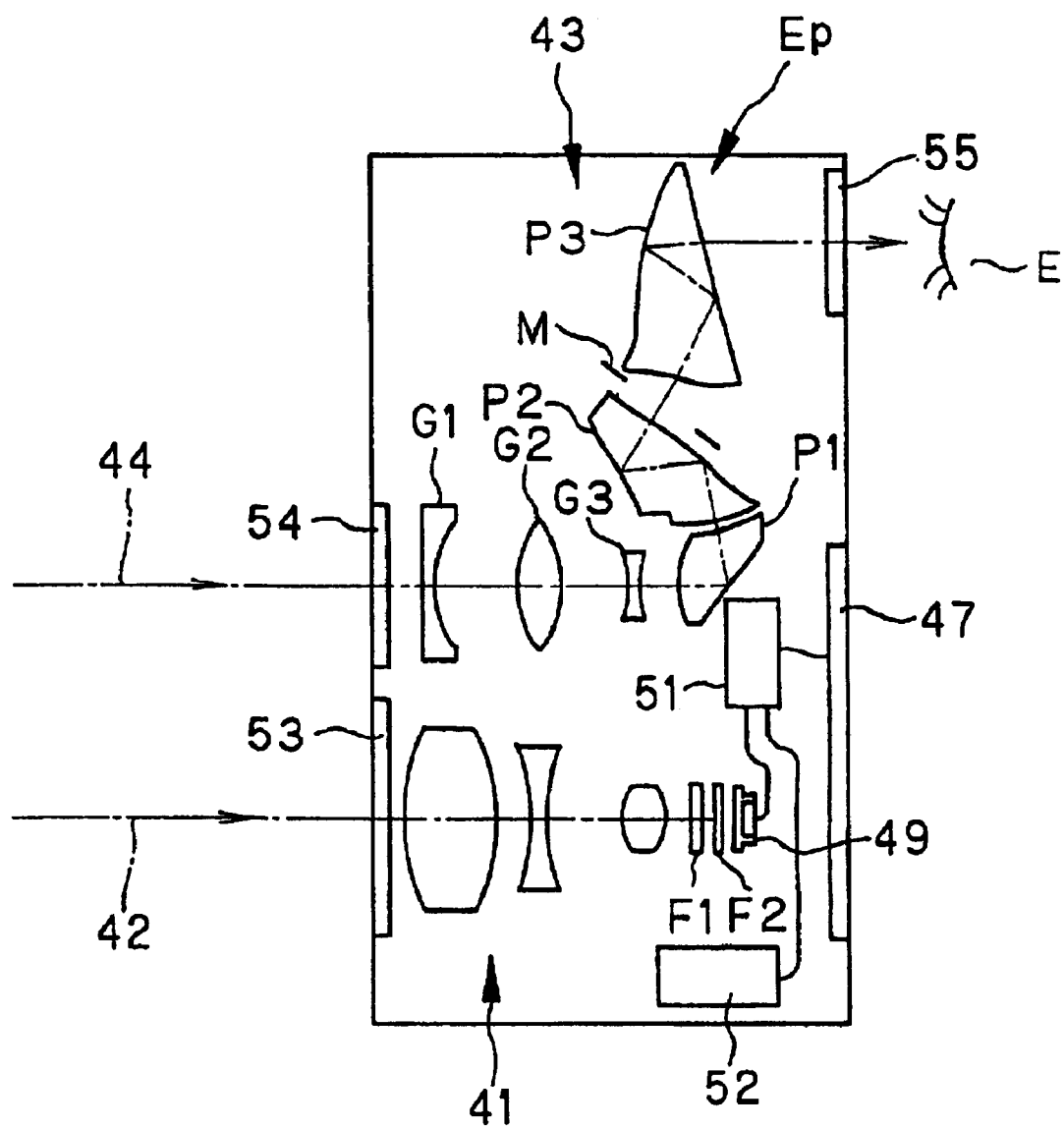
FIG. 30 is a sectional view of the construction of the digital camera of FIG. 28.
Figure 31:
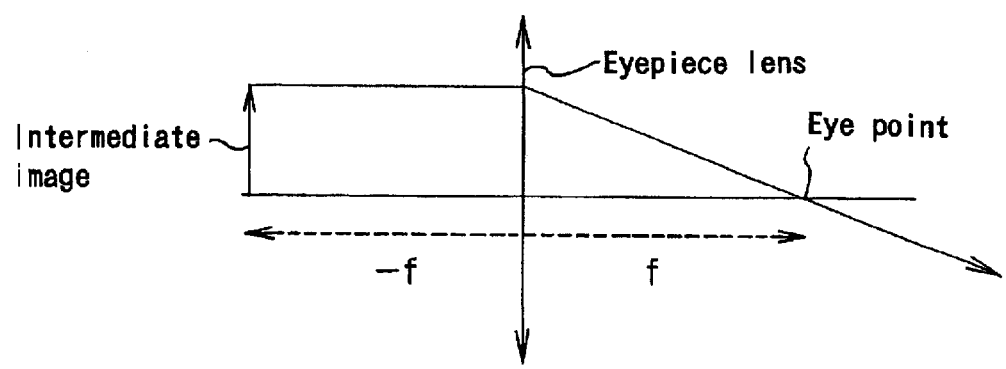
FIG. 31 is illustrative of problems with an eyepiece optical system having a reduced focal length.
Figure 32:
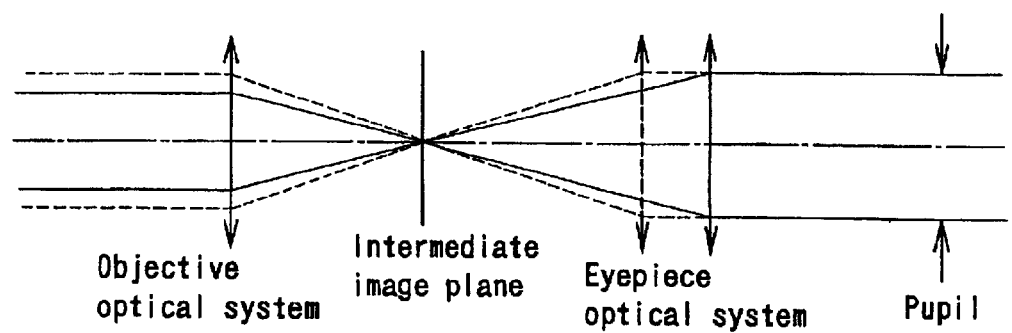
FIG. 32 is illustrative of how the F-number of the objective optical system becomes small when the focal length of the eyepiece optical system is reduced.
Figure 33:
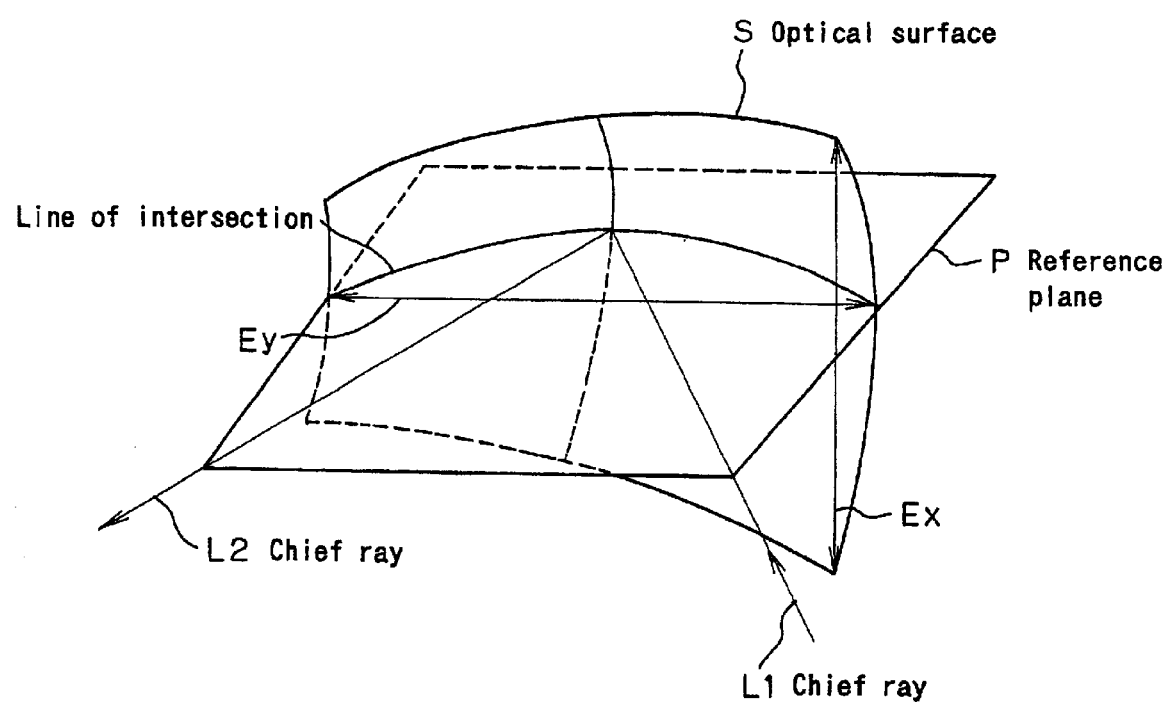
FIG. 33 is illustrative of the definitions of Ex and Ey.

The real image type zoom finder of the invention may be used in the form of a phototaking optical system for image pickup devices. FIGS. 28 to 30 are conceptual illustrations of a digital camera that is one embodiment of the image pickup device using the real image type zoom finder of the invention. FIG. 28 is a front perspective view illustrative of the outside configuration of a digital camera 40, FIG. 29 is a rear perspective view of the digital camera, and FIG. 30 is a sectional view illustrative of the construction of the digital camera 40 as viewed from below. As illustrated, this digital camera 40 comprises a phototaking optical system 41 having a phototaking optical path 42, a finder optical system 43 having a finder optical path 44, a shutter button 45, a flash 46 and a liquid crystal display monitor 47. Giving a push on the shutter button 45 located on the upper portion of the camera 40 causes an image to be phototaken through a zoom lens forming the phototaking optical system 41. For the finder optical system 43 on the finder optical path 44, for instance, the real image type zoom finder of Example 2 is used, so that the image of a subject can be observed by an observer's eyeball E through an eyepiece optical system EL of this finder. On the other hand, an object image formed by the phototaking optical system 41 is formed on an image pickup plane of an electronic image pickup device (CCD) 49 through filters F1, F2 such as IR cut filters. The object image received on this CCD 49 is displayed as an electron image on the liquid crystal display monitor 47 mounted on the back side of the camera via processing means 51. This processing means 51 is connected with recording means 52 for recording the phototaken electron image. This recording means 52 may be provided separately from the processing means 51, or may be designed in such a way as to write or record images electronically on a floppy disk, a memory card, an MO or the like. Instead of a digital camera using CCD 49, it is acceptable to use a silver-salt camera using a silver-salt film. As shown, cover members 53, 54 and 55 are mounted on the entrance sides of the phototaking optical system 41 and finder optical system 43 and the exit side of the eyepiece optical system Ep.

The thus assembled digital camera 40, because of using the real image type zoom finder of the invention as the finder optical system 43, can be reduced in terms of size and thickness with a high zoom ratio.

As can be appreciated from the foregoing, the present invention achieves a compact, wide-field yet high-performance finder optical system, because rotationally asymmetric surfaces are properly built in the eyepiece optical system.

I claim:

1. A real image type zoom finder comprising, in order from an object side thereof, a positive objective optical system and a positive eyepiece optical system and further including an image inverting means for erecting a real image formed through the objective optical system, wherein:

said objective optical system comprises a plurality of moving groups, and said eyepiece optical system comprises positive reflecting surfaces at least one of which is defined by a rotationally asymmetric surface and satisfies the following conditions:

$$1.25 < d_{EP}/f_{OC} < 2.0 \qquad (1)$$

$$0.5 < l_{OC}/f_{OC} < 1.3 \qquad (2)$$

where $d_{Ep}$ is a distance as measured along an axial chief ray from a final surface to an eye point of the eyepiece optical system, $f_{OC}$ is a focal length of the eyepiece optical system, and $l_{OC}$ is a length as calculated on an air basis and measured along an axial chief ray from an intermediate image-formation plane to the final surface of the eyepiece optical system.

2. The real image type zoon finder according to claim 1, which satisfies the following condition:

$$0.2 < f_W/f_{OC} < 1.0 \qquad (3)$$

where $f_W$ is a focal length of the objective optical system at a wide-angle end, and $f_{OC}$ is the focal length of the eyepiece optical system.

3. A real image type zoom finder comprising, in order from an object side thereof, a positive objective optical system and a positive eyepiece optical system and further including an image-inverting means for erecting a real image formed by the objective optical system with only one image-formation action, wherein:

said objective optical system comprises a plurality of moving groups, and said eyepiece optical system comprises positive reflecting surfaces at least one of which is defined by a rotationally asymmetric surface and satisfies the following conditions:

$$0.25 < lh/f_{OC} < 1.0 \quad (4)$$

$$0.3 < f_W/f_{OC} < 1.2 \quad (5)$$

where Ih is a half of a diagonal length of a field stop located near an intermediate image-formation plane, $f_W$ is a focal length of the objective optical system at a wide-angle end, and $f_{OC}$ is a focal length of the eyepiece optical system.

4. A real image type zoom finder comprising, in order from an object side thereof, a positive objective optical system and a positive eyepiece optical system and further including an image-inverting means for erecting a real image formed by the objective optical system, wherein:

said objective optical system comprises a plurality of moving groups, and said objective optical system further comprises, in order from an object side thereof, a reflecting surface having negative power and a reflecting surface having positive power on an eyepiece optical system side with respect to an intermediate image-formation plane, with at least one of said reflecting surfaces being defined by a rotationally asymmetric surface.

5. A real image type zoom finder comprising, in order from an object side thereof, a positive objective optical system and a positive eyepiece optical system and further including an image-inverting means for erecting a real image formed by the objective optical system, wherein:

said objective optical system comprises a plurality of moving groups, and said eyepiece optical system comprises, in ray propagation order from an object side thereof, a first transmitting surface, a first reflecting surface, a second reflecting surface and a second transmitting surface, wherein said first transmitting surface is provided separately from said first and second reflecting surfaces, said second transmitting surface is defined by a surface common to said first reflecting surface, said first reflecting surface has negative power, said second reflecting surface has positive power, and at least said second reflecting surface is defined by a rotationally asymmetric surface.

6. A real image type zoom finder comprising, in order from an object side thereof, a positive objective optical system and a positive eyepiece optical system and further including an image-inverting means for erecting a real image formed by the objective optical system, wherein:

said real image type zoom finder includes a plurality of moving groups and at least three reflecting surfaces on an objective optical system side with respect to an intermediate image-formation plane, and said real image type zoom finder includes positive reflecting surfaces on an eyepiece optical system with respect to the intermediate image-formation plane, at least one of which reflecting surfaces is defined by a rotationally asymmetric surface.

7. A real image type zoom finder comprising, in order from an object side thereof, a positive objective optical system and a positive eyepiece optical system and further including an image-inverting means for erecting a real image formed by the objective optical system, wherein:

said objective optical system comprises at least one fixed group and a plurality of moving groups, and said eyepiece optical system comprises positive reflecting surfaces, at least one of which is defined by a rotationally asymmetric surface.

8. A real image type zoom finder comprising, in order from an object side thereof, a positive objective optical system and a positive eyepiece optical system and further including an image-inverting means for erecting a real image formed by the objective optical system, wherein:

said objective optical system comprises a plurality of moving groups and at least five aspheric surfaces, and said eyepiece optical system comprises positive reflecting surfaces, at least one of which is defined by a rotationally asymmetric surface.

9. The real image type zoom finder according to claim 8, wherein said objective optical system comprises at most 20 aspheric surfaces.

10. The real image type zoom finder according to claim 8, wherein at least one of said aspheric surfaces satisfies the following condition:

$$0.02 < |(n'-n)\cdot(1/r - 1/r_{ASP})\cdot f_{OC}| < 1 \quad (6)$$

where n' is a refractive index of a medium on a refraction side, n is a refractive index of a medium on an entrance side (n'=−n for a reflecting surface), r is a paraxial radius of curvature on an optical axis, $r_{ASP}$ is a radius of curvature that undergoes the largest change in an effective diameter among the radii of curvature of a peripheral portion, and $f_{OC}$ is the focal length of the eyepiece optical system, provided that $r_{ASP}$ is indicative of a radius of curvature with an aspheric effect taken into consideration, and defined by $$r_{ASP} = y \cdot (1 + f'(y)^2)^{1/2}/f'(y)$$

where f(y) is a defining equation for an aspheric surface, y is a height from the optical axis, and f' (y) is the first differential of f(y).

11. The real image type zoom finder according to claim 8, wherein satisfies at least one aspheric surface capable of satisfying the following condition (7) and at least one aspheric surface capable of satisfying the following condition (8):

$$0.02 < (n'-n)\cdot(1/r - 1/r_{ASP})\cdot f_{OC} < 1 \quad (7)$$

$$-1 < (n'-n)\cdot(1/r - 1/r_{ASP})\cdot f_{OC} < -0.02 \quad (8)$$

where n' is a refractive index of a medium on a refraction side, n is a refractive index of a medium on an entrance side (n'=−n for a reflecting surface), r is a paraxial radius of curvature on an optical axis, $r_{ASP}$ is a radius of curvature that undergoes the largest change in an effective diameter among the radii of curvature of a peripheral portion, and $f_{OC}$ is the focal length of the eyepiece optical system, provided that $r_{ASP}$ is indicative of a radius of curvature with an aspheric effect taken into consideration, and defined by $$r_{ASP} = y \cdot (1 + f'(y)^2)^{1/2}/f'(y)$$

where f(y) is a defining equation for an aspheric surface, y is a height from the optical axis, and f' (y) is the first differential of f(y).

12. The real image type zoom finder according to claim 1, wherein said objective optical system comprises at least three groups.

13. The real image type zoom finder according to claim 12, wherein said objective optical system comprises at least one fixed group.

14. The real image type zoom finder according to claim 1, wherein said moving groups in said objective optical system are each a refracting optical system free of any reflecting surface.

15. The real image type zoom finder according to claim 1, wherein said objective optical system comprises at least five aspheric surfaces.

16. The real image type zoom finder according to claim 1, which comprises at most 20 aspheric surfaces.

17. The real image type zoom finder according to claim 15, wherein at least one of said aspheric surfaces satisfies the following condition:

$$0.02 < |(n'-n) \cdot (1/r - 1/r_{ASP}) \cdot f_{OC}| < 1 \quad (6)$$

where n' is a refractive index of a medium on a refraction side, n is a refractive index of a medium on an entrance side (n'=−n for a reflecting surface), r is a paraxial radius of curvature on an optical axis, $r_{ASP}$ is a radius of curvature that undergoes the largest change in an effective diameter among the radii of curvature of a peripheral portion, and $f_{OC}$ is the focal length of the eyepiece optical system, provided that $r_{ASP}$ is indicative of a radius of curvature with an aspheric effect taken into consideration, and defined by $$r_{ASP} = y \cdot (1 + f'(y)^2)^{1/2} / f'(y)$$

where f(y) is a defining equation for an aspheric surface, y is a height from the optical axis, and f' (y) is the first differential of f(y).

18. The real image type zoom finder according to claim 15, wherein satisfies at least one aspheric surface capable of satisfying the following condition (7) and at least one aspheric surface capable of satisfying the following condition (8):

$$0.02 < (n'-n) \cdot (1/r - 1/r_{ASP}) \cdot f_{OC} < 1 \quad (7)$$

$$-1 < (n'-n) \cdot (1/r - 1/r_{ASP}) \cdot f_{OC} < -0.02 \quad (8)$$

where n' is a refractive index of a medium on a refraction side, n is a refractive index of a medium on an entrance side (n'=−n for a reflecting surface), r is a paraxial radius of curvature on an optical axis, $r_{ASP}$ is a radius of curvature that undergoes the largest change in an effective diameter among the radii of curvature of a peripheral portion, and $f_{OC}$ is the focal length of the eyepiece optical system, provided that $r_{ASP}$ is indicative of a radius of curvature with an aspheric effect taken into consideration, and defined by $$r_{ASP} = y \cdot (1 + f'(y)^2)^{1/2} / f'(y)$$

where f(y) is a defining equation for an aspheric surface, y is a height from the optical axis, and f' (y) is the first differential of f(y).

19. The real image type zoom finder according to claim 1, wherein said objective optical system comprises a generally negative group comprising at least one positive unit and two negative units.

20. The real image type zoom finder according to claim 19, wherein said positive unit is located on a pupil side of said negative units.

21. The real image type zoom finder according to claim 19, wherein said negative units are each formed of a refracting lens free of any reflecting surface.

22. The real image type zoom finder according to claim 19, wherein said negative group has a focal length satisfying the following condition:

$$0.1 < f_W/f_{neg} < 1.5 \quad (9)$$

where $f_W$ is a focal length of the objective optical system at a wide-angle end, and $f_{neg}$ is the focal length of said negative group at the wide-angle end.

23. The real image type zoom finder according to claim 19, wherein among said negative units, a unit having the strongest positive and a unit having the strongest negative power satisfy the following condition:

$$0.2 < |fN/fP| < 0.5 \quad (10)$$

where $f_P$ is a focal length of the positive unit having the strongest power among said negative units and $f_N$ is a focal length of the negative unit having the strongest power among said negative units.

24. The real image type zoom finder according to claim 19, wherein at least one unit of said negative units remains fixed during zooming.

25. The real image type zoom finder according to claim 1, wherein said objective optical system comprises a generally positive group comprising at least two positive units and one negative unit.

26. The real image type zoom finder according to claim 25, wherein said positive units are each formed of a refracting lens free of any reflecting surface.

27. The real image type zoom finder according to claim 25, wherein said positive group has a focal length satisfying the following condition:

$$0.7 < f_W/f_{pos} < 2.5 \quad (11)$$

where $f_W$ is a focal length of the objective optical system at a wide-angle end, and $f_{pos}$ is the focal length of said positive group at the wide-angle end.

28. The real image type zoom finder according to claim 25, wherein among said positive units, a positive unit having the strongest power and a negative unit having the strongest power satisfy the following condition:

$$1.0 < |fP/fN| < 2.0 \quad (12)$$

where fP is a focal length of the positive unit having the strongest power among said positive units and fN is a focal length of the negative unit having the strongest power among said negative units.

29. The real image type zoom finder according to claim 25, wherein at least one unit of said positive units remains fixed during zooming.

30. The real image type zoom finder according to claim 1, wherein said objective optical system comprises, in order from an object side thereof, a negative first group, a positive negative group and a positive third group.

31. The real image type zoom finder according to claim 30, wherein said negative first group is a fixed group.

32. The real image type zoom finder according to claim 1, wherein said objective optical system comprises, in order from an object side thereof, a positive first group, a negative second group and a negative third group.

33. The real image type zoom finder according to claim 1, wherein said objective optical system comprises, in order from an object side thereof, a negative first group, a positive second group and a negative third group.

34. The real image type zoom finder according to claim 33, wherein said negative first group is a fixed group.

35. The real image type zoom finder according to claim 33, wherein a composite focal length of the first to third groups is negative.

36. The real image type zoom finder according to claim 1, wherein an image-inverting optical system located on a pupil side with respect to the intermediate image-formation plane comprises at least one reflecting surface that has positive power and satisfies the following condition:

$$0.015 < |2n \cdot \tan\theta \cdot Ih/r| < 1.5 \tag{13}$$

where r is a radius of curvature of the reflecting surface as measured at a point where an axial chief ray passes, n is a refractive index of a medium on entrance and exit sides, θ is an angle of reflection, and Ih is a half of a diagonal length of a field stop located near the intermediate image-formation plane.

37. The real image type zoom finder according to claim 1, wherein an image-inverting optical system located on an image side with respect to the intermediate image-formation plane comprises at least one positive reflecting surface and at least one negative reflecting surface.

38. The real image type zoom finder according to claim 1, wherein two reflecting surfaces are located on an image side with respect to the intermediate image-formation plane.

39. The real image type zoom finder according to claim 1, wherein at least one surface in the image-inverting optical system is defined by a total reflecting surface.

40. The real image type zoom finder according to claim 1, wherein an angle of reflection for at least one of the reflecting surfaces satisfies the following condition:

$$5° < \theta < 45° \tag{14}$$

where θ is an angle of reflection of an axial chief ray.

41. The real image type zoom finder according to claim 1, wherein an image-inverting optical system located on an object side with respect to the intermediate image-formation plane comprises a prism, an entrance refracting surface of which is defined by a rotationally asymmetric surface.

42. The real image type zoom finder according to claim 1, wherein an image-inverting optical system located on a pupil side with respect to the intermediate image-formation plane comprises a prism, an exit refracting surface of which is defined by a rotationally asymmetric surface.

43. The real image type zoom finder according to claim 1, wherein an image-inverting optical system on a pupil side with respect to the intermediate image-formation plane comprises a prism, an entrance refracting surface of which is provided independently of a reflecting surface.

44. The real image type zoom finder according to claim 1, wherein an image-inverting optical system on a pupil side with respect to the intermediate image-formation plane comprises a prism, an exit refracting surface of which is defined by a surface common to a reflecting surface.

45. The real image type zoom finder according to claim 1, wherein said eyepiece optical system is composed solely of a prism which has a positive reflecting surface and at least one surface of which is defined by a rotationally asymmetric surface.

46. The real image type zoom finder according to claim 1, wherein an image-converting optical system comprises a roof surface and has a total of six reflections.

47. The real image type zoom finder according to claim 1, wherein an entrance pupil position of said eyepiece optical system has been corrected in a rotationally symmetric manner.

48. The real image type zoom finder according to claim 1, wherein an axial chief ray incident on said objective optical system is parallel, or substantially parallel, with an axial chief ray emerging from said eyepiece optical system.

49. The real image type zoom finder according to claim 48, where an angle that the incident axial chief ray makes with the emerging axial chief ray satisfies the following condition:

$$0° \leq \phi < 20° \tag{15}$$

where φ is the angle that the incident axial chief ray makes with the emerging axial chief ray.

50. The real image type zoom finder according to claim 1, wherein an angle that an axial chief ray incident on said objective optical system makes with an axial chief ray incident on said intermediate image-formation plane satisfies the following condition:

$$15° < \alpha < 75°, \ 105° < \alpha \leq 180° \tag{16}$$

where α is the angle that the axial chief ray incident on the objective optical system makes with the axial chief ray incident on the intermediate image-formation plane.

51. The real image type zoom finder according to claim 1, wherein said eyepiece optical system has a focal length satisfying the following condition:

$$9 \text{ mm} < f_{OC} < 19 \text{ mm} \tag{17}$$

where $f_{OC}$ is the focal length of the eyepiece optical system.

52. The real image type zoom finder according to claim 1, wherein only one image-formation action is provided by said objective optical system.

53. The real image type zoom finder according to claim 1, wherein diopter is controlled by moving a prism located on a pupil side with respect to the intermediate image-formation plane.

54. The real image type zoom finder according to claim 1, wherein diopter is controlled by moving a refracting lens located on a pupil side with respect to the intermediate image-formation plane.

55. The real image type zoom finder according to claim 1, wherein diopter is controlled by moving a refracting lens located on an object side with respect to the intermediate image-formation plane.

56. The real image type zoom finder according to claim 1, wherein a spacing from an exit surface of the objective optical system to the intermediate image-formation plane or a spacing from the intermediate image-formation plane to an entrance surface of the eyepiece optical system satisfies the following condition:

$$2 < (d \cdot 1000)/f_{OC}^2 < 50 \tag{18}$$

where $f_{OC}$ is a focal length of the eyepiece optical system, and d is a distance as measured along an axial chief ray from the exit surface of the objective optical system to the intermediate image-formation plane or from the intermediate image-formation plane to the entrance surface of the eyepiece optical system with the proviso that 1000 must be 1,000 mm.

57. The real image type zoom finder according to claim 3, which satisfies the following condition:

$$1.25 < d_{EP}/f_{OC} < 2.0 \tag{1}$$

where $d_{EP}$ is a distance as measured along an axial chief ray from a final surface to an eye point of the eyepiece optical system, and $f_{OC}$ is a focal length of the eyepiece optical system.

58. The real image type zoom finder according to claim 3, which satisfies the following condition:

$$0.5 < l_{OC}/f_{OC} < 1.3 \tag{2}$$

where $l_{OC}$ is a length as calculated on an air basis and along an axial chief ray from the intermediate image-formation plane to the final surface of the eyepiece optical system, and $f_{OC}$ is a focal length of the eyepiece optical system.

59. The real image type zoom finder according to claim 1, which satisfies the following condition:

$$0.1 < Ih/f_{OC} < 0.7 \quad (19)$$

where Ih is a half of a diagonal length of a field stop located near the intermediate image-formation plane, and $f_{OC}$ is a focal length of the eyepiece optical system.

60. The real image type zoom finder according to claim 1, which satisfies the following condition:

$$0.25 < Ih/f_{OC} < 1.0 \quad (4)$$

where Ih is a half of a diagonal length of a field stop located near the intermediate image-formation plane, and $f_{OC}$ is a focal length of the eyepiece optical system.

61. The real image type zoom finder according to claim 4, which satisfies the following condition:

$$0.2 < f_W/f_{OC} < 1.0 \quad (3)$$

where $f_W$ is a focal length of the objective optical system at a wide-angle end, and $f_{OC}$ is a focal length of the eyepiece optical system.

62. The real image type zoom finder according to claim 4, which satisfies the following condition:

$$0.3 < f_W/f_{OC} < 1.2 \quad (5)$$

where $f_W$ is a focal length of the objective optical system at a wide-angle end, and $f_{OC}$ is a focal length of the eyepiece optical system.

63. The real image type zoom finder according to claim 1, wherein said eyepiece optical system comprises a prism, a first transmitting surface of which satisfies the following condition:

$$0.3 < Ex1/Ey1 < 1 \quad (20)$$

where Ex1 is a maximum value of a length of the first transmitting surface in a direction vertical to a reference plane, and Ey1 is a length of a chord of a line where the first transmitting surface intersects the reference plane with the proviso that the reference plane is defined by a plane including a chief ray incident on the first transmitting surface and a chief ray emerging from the first transmitting surface.

64. The real image type zoom finder according to claim 1, wherein said eyepiece optical system should comprise a prism, a first reflecting surface of which satisfies the following condition:

$$0.3 < Ex2/Ey2 < 1 \quad (21)$$

where Ex2 is a maximum value of a length of the first reflecting surface in a direction vertical to a reference plane, and Ey2 is a length of a chord of a line where the first reflecting surface intersects the reference plane with the proviso that the reference plane is defined by a plane including a chief ray incident on the first reflecting surface and a chief ray emerging from the first reflecting surface.

65. The real image type zoom finder according to claim 1, wherein said eyepiece optical system should comprise a prism, a second transmitting surface of which satisfies the following condition:

$$0.1 < Ex3/Ey3 < 0.8 \quad (22)$$

where Ex3 is a maximum value of a length of the second transmitting surface in a direction vertical to a reference plane, and Ey3 is the length of a chord of a line where the second transmitting surface intersects the reference plane with the proviso that the reference plane is defined by a plane including a chief ray incident on the first reflecting surface and a chief ray emerging from the second transmitting surface.

66. The real image type zoom finder according to claim 1, wherein said eyepiece optical system comprises a prism, a first transmitting surface of which satisfies:

$$1\ mm < Ex1 < 15\ mm \quad (23)$$

where Ex1 is a maximum value in mm of a length of the first transmitting surface in a direction vertical to a reference plane, with the proviso that the reference plane is defined by a plane including a chief ray incident on the first transmitting surface and a chief ray emerging from the first transmitting surface.

67. The real image type zoom finder according to claim 1, wherein said eyepiece optical system comprises a prism, a first transmitting surface of which satisfies the following condition:

$$1\ mm < Ey1 < 30\ mm \quad (24)$$

where Ey1 is a length in mm of a chord of a line where the first transmitting surface intersects a reference plane with the proviso that the reference plane is defined by a plane including a chief ray incident on the first transmitting surface and a chief ray emerging from the first transmitting surface.

68. The real image type zoom finder according to claim 1, wherein said eyepiece optical system comprises a prism, a first reflecting surface of which satisfies the following condition:

$$2\ mm < Ex2 < 15\ mm \quad (25)$$

where Ex2 is a maximum value in mm of a length of the first reflecting surface in a direction vertical to a reference plane, with the proviso that the reference plane is defined by a plane including a chief ray incident on the first reflecting surface and a chief ray emerging from the first reflecting surface.

69. The real image type zoom finder according to claim 1, wherein said eyepiece optical system comprises a prism, a first reflecting surface of which satisfies the following condition:

$$3\ mm < Ey2 < 30\ mm \quad (26)$$

where Ey2 is a length in mm of a chord of a line where the first reflecting surface intersects a reference plane with the proviso that the reference plane is defined by a plane including a chief ray incident on the first reflecting surface and a chief ray emerging from the first transmitting surface.

70. The real image type zoom finder according to claim 1, wherein said eyepiece optical system comprises a prism, a second transmitting surface of which satisfies the following condition:

$$2\ mm < Ex3 < 25\ mm \quad (27)$$

where Ex3 is a maximum value in mm of a length of the second transmitting surface in a direction vertical to a reference plane, with the proviso that the reference plane is defined by a plane including a chief ray incident on the second transmitting surface and a chief ray emerging from the second transmitting surface.

71. The real image type zoom finder according to claim 1, wherein said eyepiece optical system comprises a prism, a second transmitting surface of which satisfies the following condition:

$$5 \text{ mm} < Ey3 < 40 \text{ mm} \tag{28}$$

where Ey2 is a length in mm of a chord of a line where the second transmitting surface intersects a reference plane with the proviso that the reference plane is defined by a plane including a chief ray incident on the second transmitting surface and a chief ray emerging from the second transmitting surface.

72. An image pickup system comprising a real image type zoom finder separately from an phototaking optical system, wherein an axial chief ray nearly parallel with an axial chief ray incident on the phototaking optical system is entered into the real image type zoom finder, said real image type zoom finder being a real image type zoom finder as claimed in claim 1.

73. A real image type zoom finder comprising, in order from an object side thereof, a positive objective optical system and a negative eyepiece optical system and further including an image-inverting means comprising a plurality of reflecting surfaces for erecting a real image formed by the objective optical system, wherein:

said objective optical system comprises a plurality of moving lens groups and one prism acting as an image-inverting means, said one prism comprises, in ray propagation order from an object side thereof, an entrance surface, a first reflecting surface, a second reflecting surface, a third reflecting surface and an exit surface wherein any of said first reflecting surface, second reflecting surface and third reflecting surface is defined by a roof surface provided that when an axial chief ray is projected onto a plane defined by three points on an axial chief ray at said entrance surface, said first reflecting surface and said second reflecting surface, said axial chief ray takes an optical path which, on the basis of the direction of propagation of a light ray, turns in the same direction at the first and second reflecting surfaces and turns in a direction different from said direction at the third reflecting surface.

74. The real image type zoom finder according to claim 73, wherein:

said eyepiece optical system comprises a second prism as an image-inverting optical system, and said second prism comprises, in ray propagation order from an object side thereof, an entrance surface, a first reflecting surface, a second reflecting surface, and an exit surface provided that when an axial chief ray is projected onto a plane defined by three points on an axial chief ray at said entrance surface, said first reflecting surface and said second reflecting surface, said axial chief ray takes an optical path which, on the basis of the direction of propagation of a light ray, turns in different directions at the first and second reflecting surfaces, and the second reflecting surface and exit surface are defined by the same surface.

* * * * *